United States Patent [19]
Ogawa et al.

[11] Patent Number: 6,052,357
[45] Date of Patent: Apr. 18, 2000

[54] COMPACT OPTICAL DISK APPARATUS HAVING A SWING-MOTION OPTICAL HEAD

[75] Inventors: Koichi Ogawa; Junichi Ichihara; Akihiko Makita, all of Kawasaki, Japan

[73] Assignee: Fujitsu Limited, Kawasaki, Japan

[21] Appl. No.: 08/966,841

[22] Filed: Nov. 7, 1997

Related U.S. Application Data

[63] Continuation of application No. 08/390,824, Feb. 17, 1995, abandoned, which is a continuation of application No. 07/981,337, Nov. 25, 1992, abandoned.

[30] Foreign Application Priority Data

Jan. 21, 1992 [JP] Japan ................................ 4-008611
Jan. 22, 1992 [JP] Japan ................................ 4-009338

[51] Int. Cl.$^7$ .................................................. G11B 17/30
[52] U.S. Cl. ............................................................ 369/215
[58] Field of Search .................................... 369/215, 222, 369/224, 250, 244, 44.17, 112, 44.37; 360/105, 106

[56] References Cited

U.S. PATENT DOCUMENTS

| | | | |
|---|---|---|---|
| 4,004,081 | 1/1977 | Zorn ........................................ | 358/128 |
| 4,408,311 | 10/1983 | Suzuki et al. ............................ | 369/222 |
| 4,434,483 | 2/1984 | Vinogradov .............................. | 369/244 |
| 4,472,024 | 9/1984 | Konomura et al. ...................... | 350/247 |
| 4,761,774 | 8/1988 | Ishibashi et al. ........................ | 369/222 |
| 4,794,586 | 12/1988 | Kortix ...................................... | 369/215 |
| 4,855,853 | 8/1989 | Matsushita et al. ..................... | 360/106 |
| 4,977,549 | 12/1990 | Berg ......................................... | 369/13 |
| 5,027,241 | 6/1991 | Hatch et al. ............................. | 360/903 |
| 5,117,413 | 5/1992 | Van Rosmalen et al. ............... | 369/215 |
| 5,189,577 | 2/1993 | Nishida et al. .......................... | 360/106 |
| 5,315,464 | 5/1994 | Tsujino .................................. | 360/99.08 |
| 5,315,466 | 5/1994 | Nishimoto et al. ...................... | 360/106 |

FOREIGN PATENT DOCUMENTS

| | | |
|---|---|---|
| 0 400 570 | 12/1990 | European Pat. Off. . |
| 0 405 604 | 1/1991 | European Pat. Off. . |
| 0 415 543 | 3/1991 | European Pat. Off. . |

(List continued on next page.)

OTHER PUBLICATIONS

Computer Technology Review Special Winter Issue, vol. 11, No. 16, Feb. 16, 1992, Los Angeles, CA. pp. 35–38.
Journal of Electronic Engineering, Jun. 1991, pp 66–69, "Today's Hard Disk Drives Outperform Larger Counterparts".
Patent Abstracts of Japan, vol. 6, No. 206, Oct. 29, 1982.
Patent Abstracts of Japan, vol. 15, No. 162, Apr. 23, 1991.
PC User, Feb. 10, 1993, Boxer "Hitting the High Note", Toshiba.
Markt & Technik, No. 50, Dec. 11, 1992, p. 58.

*Primary Examiner*—David D. Davis
*Attorney, Agent, or Firm*—Nikaido, Marmelstein, Murray & Oram, LLP

[57] ABSTRACT

An optical disk apparatus includes a spindle motor for rotating a mounted optical disk, and a swing-motion type optical head apparatus. The swing-motion type optical head apparatus scans the optical disk in a radial direction of the optical disk by moving the objective lens. The head apparatus is made to swing about a swing axis in a plane parallel to a recording surface of the mounted optical disk. The swing-motion type optical head apparatus includes an arm carrying the objective lens thereupon, and provided at the first side of the mounted optical disk. A supporting member is provided for supporting the arm so as to enable the arm to swing about the axis. Driving device are provided for causing the arm to swing. The supporting member and the driving device are provided at a location outside the optical disk when viewed in a direction perpendicular to the recording surface. The mounted optical disk has a level within a height of the supporting member and the driving device, such that the supporting member and the driving device extend from the first side of the mounted optical disk to a second, opposite side of the mounted optical disk.

9 Claims, 51 Drawing Sheets

FOREIGN PATENT DOCUMENTS

| | | |
|---|---|---|
| 0 427 490 | 5/1991 | European Pat. Off. . |
| 63-20732 | 1/1963 | Japan . |
| 5597001 | 7/1980 | Japan ..................................... 369/244 |
| 60-115053 | 6/1985 | Japan . |
| 61-264563 | 11/1986 | Japan . |
| 63-23278 | 1/1988 | Japan . |
| 2-50891 | 4/1990 | Japan . |
| 2156425 | 6/1990 | Japan ..................................... 369/244 |
| 2-310825 | 12/1990 | Japan . |
| 4-129078 | 4/1992 | Japan . |
| 4-195987 | 7/1992 | Japan . |
| WO 93/05504 | 3/1993 | WIPO . |

FIG. I

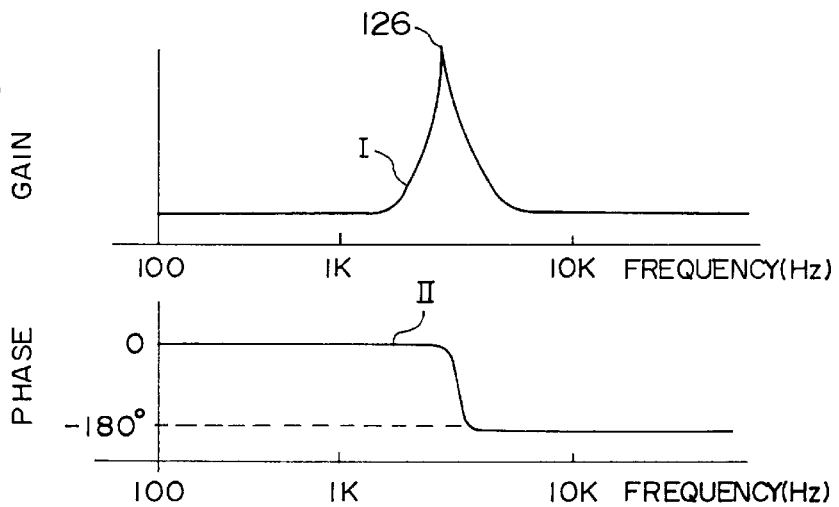
FIG.15(A)
FIG.15(B)
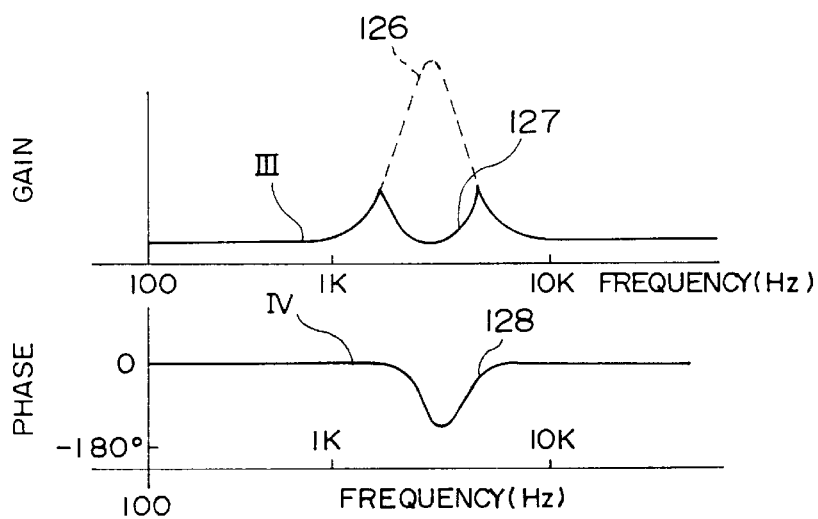
FIG.16(A)
FIG.16(B)

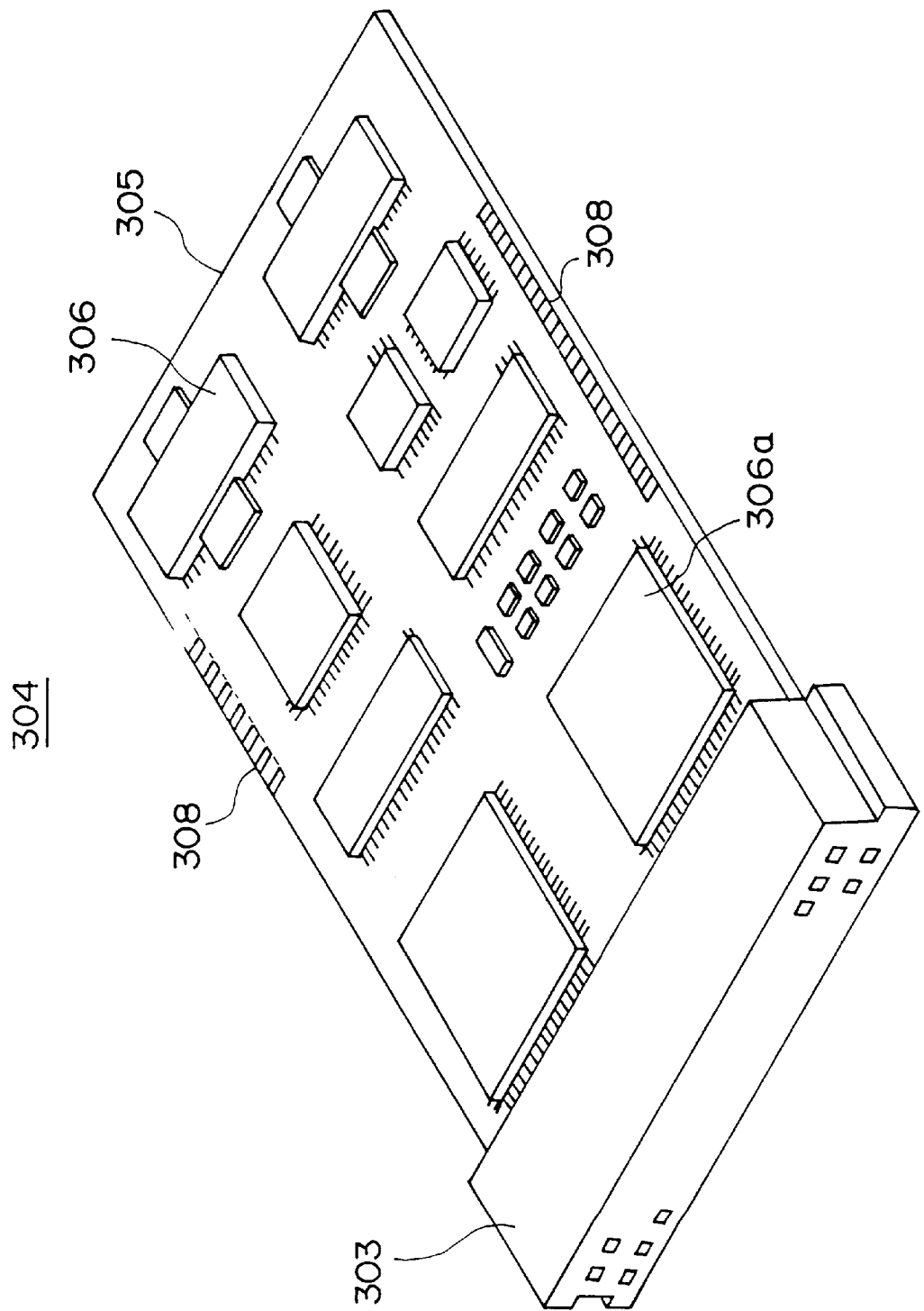

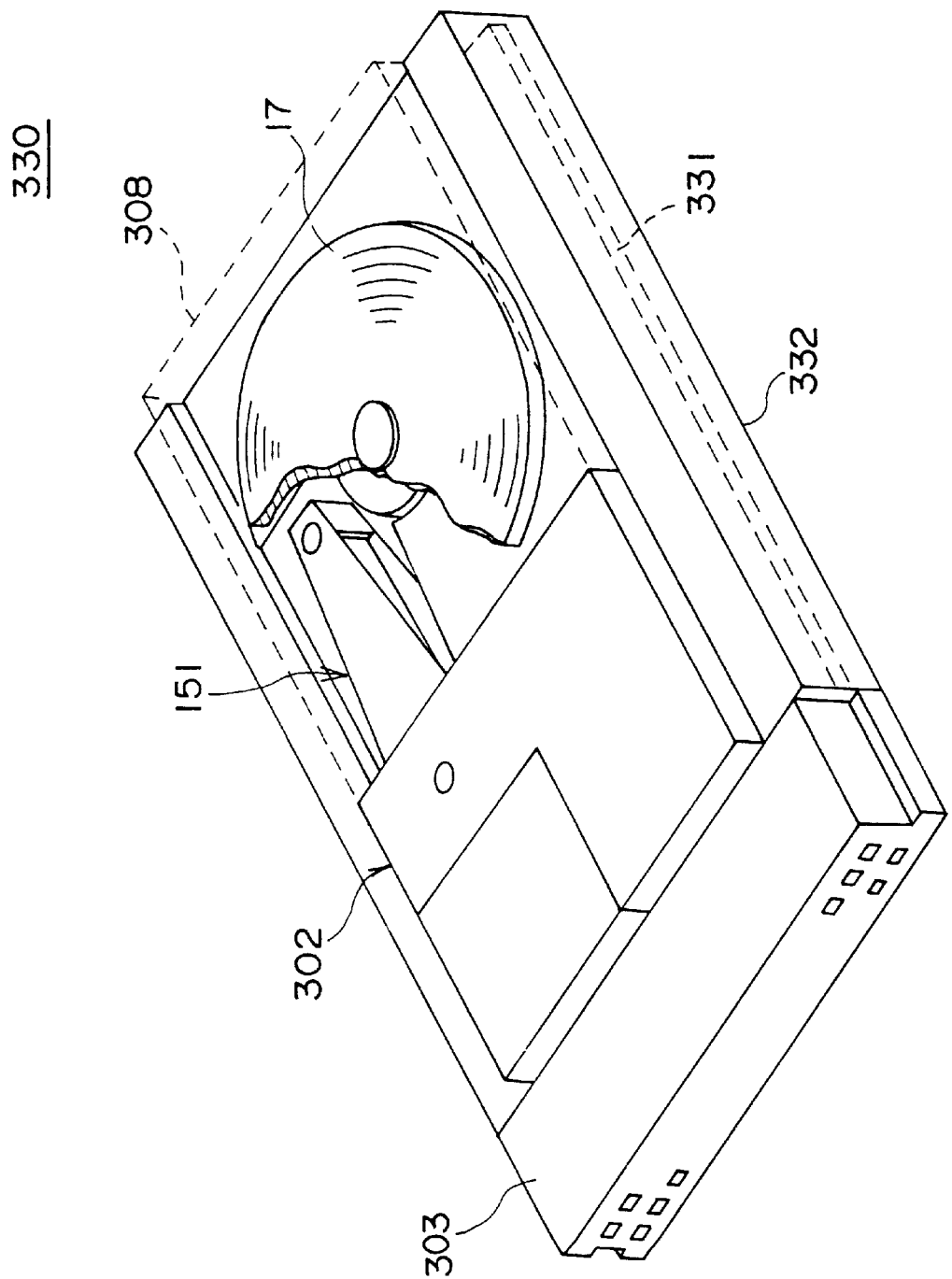

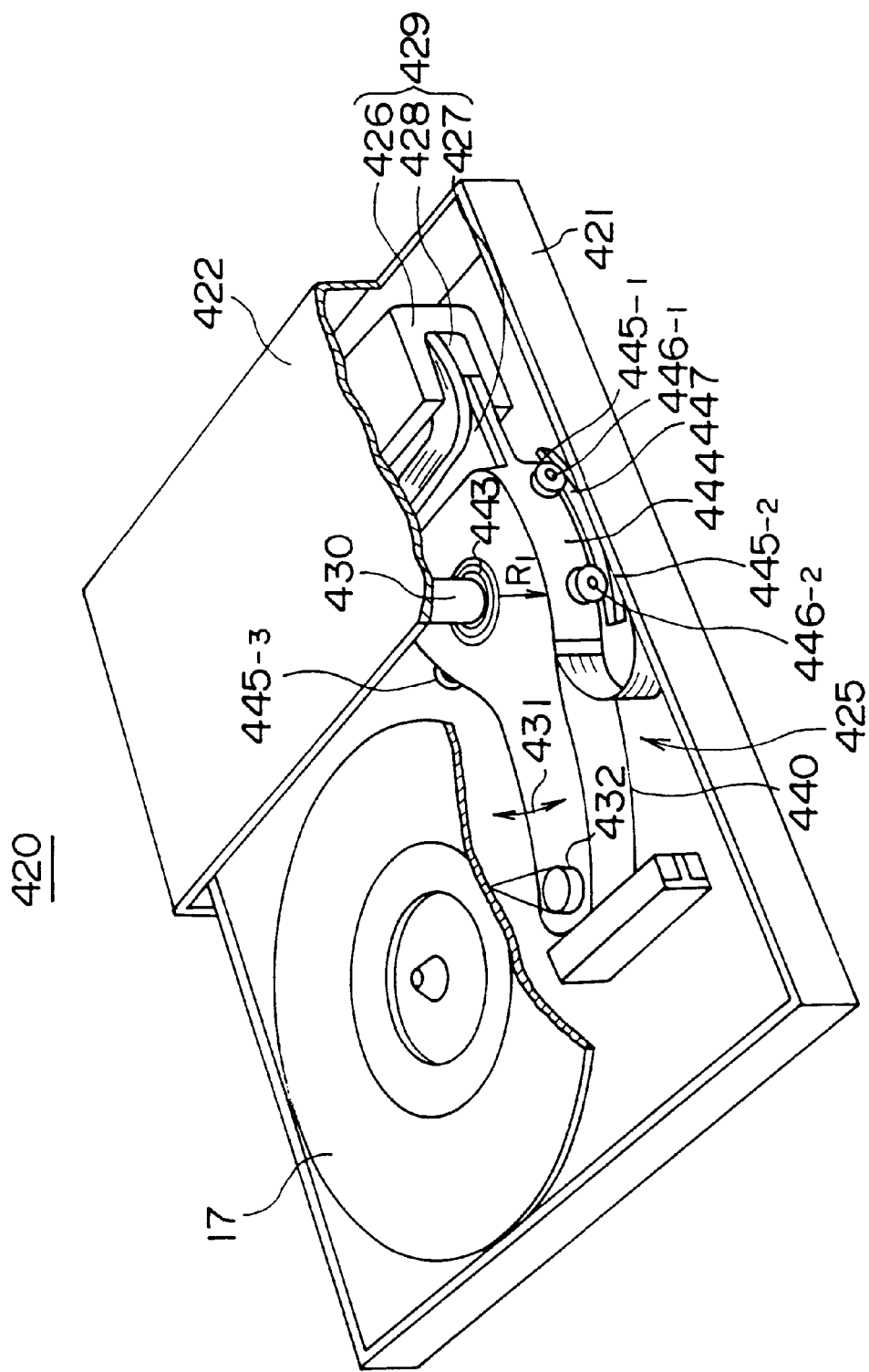

COMPACT OPTICAL DISK APPARATUS HAVING A SWING-MOTION OPTICAL HEAD

This application is a continuation of application Ser. No. 08/390,824 filed Feb. 17, 1995, now abandoned, which in turn is a continuation of application Ser. No. 07/981,337 filed Nov. 25, 1992 now abandoned.

BACKGROUND OF THE INVENTION

The present invention generally relates to optical storage of information, and more particularly to an optical disk apparatus that uses a flexible and removable recording medium for recording information.

In the information storage devices for storing information, there has been a continuous demand for reducing the size of the device. In addition, there is a persisting demand for an increased storage capacity of information in any types of optical storage devices.

Conventionally, various storage devices are proposed and used for storing information. For example, use of a semiconductor memory device configured such as a so-called IC card device is proposed. In the IC card devices, one can form the device with a very small size particularly with respect to the thickness. However, the IC card devices generally has a drawback of small storage capacity of information. As the means for storing information, floppy disk devices are used also commonly. Particularly, compact floppy disk devices of the 3.5 inch size are used commonly. However, the device is still bulky and provides only a limited storage capacity.

Under such a situation, there is a proposal to construct an optical disk device that is capable of replacing the recording medium. According to the optical disk device of such a construction, a large storage capacity is guaranteed as a result of use of the optical recording and reproducing technique.

For example, Japanese Laid-Open Patent Publication 63-20732 describes a compact optical disk device that uses a detachable rotary optical recording disk and an optical head held on a swing arm, wherein the swing arm swings about an axis such that the optical head held at a tip end of the swing arm scans the recording surface of the rotary optical disk with the swinging motion of the arm.

More specifically, the swing arm provides a hollow passage of optical beam, and the optical head provided at the tip end of the arm includes a mirror for deflecting the optical beam in the direction perpendicular to the recording surface of the optical beam and a lens for focusing the optical beam thus deflected on the recording surface of the optical beam. In addition, there is provided an optical device in the swing arm in correspondence to the swing axis of the arm.

In order to accommodate the optical device in alignment with the axis of the swinging motion, the arm is held rotatably to the base of the optical disk device by upper and lower shafts separated from each other by a gap, and the detection device is accommodated into a space that is formed in correspondence to such a gap. In other words, the swing arm accommodates therein the optical device at the end that is opposite to the end at which the optical head is provided.

According to the construction of the device of the reference, one can record and reproduce information signals on and from the rotary optical recording medium by means of the optical head while swinging the arm about the axis.

On the other hand, the device has a problem, associated with the feature of providing the optical device at the space formed in correspondence to the gap between the upper and lower shafts, that a substantial part of the arm as well as a substantial part of the electromagnetic driving mechanism are located under the region that is covered by the optical disk when viewed in the direction perpendicular to the optical disk. Thereby, because of the thickness of the axial part of the arm as well as the thickness of the electromagnetic driving mechanism, the optical disk has to be mounted at a level above these bulky portions of the arm and the electromagnetic driving mechanism. Thereby, the device of the reference inevitably becomes thick and bulky, contrary to the requirement to reduce the size of the device.

Further, the device of the reference has a problem, associated with the fact that the arm is formed to be elastic for effecting the focusing control and the fact the mirror for deflecting the optical beam is fixed on the elastic arm, in that the focusing adjustment of the lens tends to invite various aberrations and decrease of luminosity due to the deviation of the optical path.

SUMMARY OF THE INVENTION

Accordingly, a general object of the present invention is to provide a novel and useful optical disk apparatus in which the above disadvantages are eliminated.

A more specific object of the present invention in to provide an optical disk apparatus configured such that it is provided with a swing-motion type optical head apparatus for moving an objective lens in a radial direction of a mounted optical disk by the head apparatus being made to swing on a plane parallel to the mounted optical disk.

Another object of the present invention is to provide an optical disk apparatus characterized in that it is provided with:
- a spindle motor (14) for rotating a mounted optical disk (17); and
- a swing-motion type optical head apparatus (15) for moving an objective lens (50) in a radial direction of the optical disk, by the head apparatus being made to swing on a plane parallel to a recording face (17a) of the mounted optical disk (17),
- the swing-motion type optical head apparatus comprising: a head main body (20) supported by bearings (23) so as to be enabled to swings and an electromagnetic driving means (40) for making the head main body swing, wherein
- the bearings are provided at a distance from the mounted optical disk, and the electromagnetic driving means is provided, at a distance from the mounted optical disk, approximately opposite to the objective lens (50) across the bearings (23), so that the thickness of the mounted optical disk does not add to the height of the bearings (23) or electromagnetic driving means (40).

According to the present invention, since the vertical position of the optical disk is not dependent on the bearings or the electromagnetic driving means, the thickness of the optical disk does not add to the height of the swing-motion type optical head apparatus. This way the height of the optical disk apparatus is not determined by the result of an addition of the height of the optical head to the thickness of the optical disk but essentially by the height of the optical head only. Thereby the apparatus can be made thinner than the conventional apparatus.

Still another object of the present invention is to provide an optical disk apparatus characterized in that it is provided with:
- a spindle motor (14) for rotating a mounted optical disk (17); and a swing-motion type optical head apparatus (151) for moving an objective lens (50) in a radial direction of the optical disk, by the head apparatus being made to swing on a plane parallel to a recording face (17a) of the mounted optical disk (17), the swing-motion type optical head apparatus comprising:

a head main body (152) consisting of a main body portion (156) and an arm portion (157) extending from the main body portion, the arm portion comprising, at the end thereof, an objective lens (50);

swing-motion support means (153) provided at a distance from the mounted optical disk and consisting of a swing motion center stationary axle (162) piercing the center of the main body portion and bearings (168, 170) engaged with the stationary axle, said support means supporting the head main body in such a manner that the main body is enabled to swing; and electromagnetic driving means (154) provided approximately opposite to the objective lens across the swing motion support means, so as to make the head main body swing, the apparatus being further characterized in that there are provided in the main body portion: a semiconductor laser chip (196); first optical parts (197, 200) for causing a laser light emitted from the semiconductor laser chip to travel toward the objective lens; and second optical parts (200, 205, 206) for leading a laser light reflected by and returning from the optical disk to photodetectors (207, 208), the first and second optical parts being provided such that a) an optical path (211) of a laser light (210) emitted from the semiconductor laser chip and traveling toward the objective lens, and b) optical paths (216, 217, 218) of a laser light reflected by and returning from the optical disk and reaching the photodetectors (207, 208), are arranged so as to surround the stationary axle, and in that the thickness of the mounted optical disk does not add to the height of the swing-motion support means (153) or electromagnetic driving means (154).

According to the present invention, since the vertical position of the mounted optical disk is not dependent on the bearings or the electromagnetic driving means, the thickness of the optical disk can be included in the height of the optical head apparatus. This way the height of the optical disk apparatus is not determined by the height of the optical head being added to the thickness of the optical disk but essentially by the height of the optical head only, the optical disk not causing the height of the apparatus to increase. Thereby the apparatus, can be made thinner than the conventional apparatus. Further, since the swing motion center stationary axle pierces the main body portion, the rigidity of the head main body is improved Further, since the optical parts are disposed such that the optical paths are formed to surround the swing motion center axle, the main body portion into which the optical parts are built can be made small. As a result of this, a higher-speed, higher-precision access can be achieved.

Still another object of the present invention is to provide an optical disk apparatus characterized in that it is provided with:

an optical disk apparatus mechanism portion (302) comprising: a spindle motor (14) for rotating a detachable optical disk (17) mounted thereon; a head main body (152) supported by swing-motion support means (153) so as to be enabled to swings and electromagnetic driving means (154) for making the main body sting, the thickness of the mounted optical disk not adding to the height of the swing motion support means;

a printed board composite (304) electrically connected to the optical disk apparatus mechanism portion and provides so as not to extend vertically beyond the height or the optical disk apparatus mechanism portion, or provided below the optical disk apparatus mechanism portion, said printed board being equipped with electronic circuits for controlling operations of the optical disk apparatus; and a socket connector (303) electrically connected to the electronic circuits and provided in an exposed form.

According to the present invention, the apparatus is made operable by inserting the socket connector into a socket provided in an information equipment unit and does not require any cable connections, thus improving operability of the apparatus at the time of setting it up.

Still another object of the present invention is to provide an optical disk apparatus characterized in that there are provided:

an optical disk apparatus mechanism portion (302) comprising: a spindle motor (14) for rotating a detachable optical disk (17) mounted thereon; a head main body (152) supported by swing-motion support means (153) so as to be enabled to swing; and electromagnetic driving means (154) for making the main body swing, the height of the swing motion support means including the thickness of the mounted optical disk;

a printed board composite (304) electrically connected to the optical disk apparatus mechanism portion, provided below the optical disk apparatus mechanism portion, and equipped with electronic circuits for controlling operations of the optical disk apparatus; and a socket connector (303) electrically connected to the electronic circuits, and provided in an exposed form, the dimensions of the optical disk apparatus being such that the length is 85.6 mm, the width is 54.0 mm, and the thickness is 10.5 mm, and the socket connector being configured such that the connector fulfills socket connector specifications proposed by the PERSONAL COMPUTER MEMORY CARD INTERNATIONAL ASSOCIATION.

According to the present invention, the optical disk apparatus may be handled in the same manner as an IC memory card type III, That is, the apparatus may be used by inserting it into an IC memory card type III slot provided in an information equipment unit.

Still another object of the present invention is to provide an optical disk apparatus characterized in that there are provided:

an optical disk apparatus mechanism portion (302) comprising: a spindle motor (14) for rotating a detachable optical disk (17) mounted thereon; a head main body (152) supported by swing-motion support means (153) so as to be enabled to swing; and electromagnetic driving means (154) for making the main body swing, the height of the swing motion support means including the thickness of the mounted optical disk;

a printed board composite (304) electrically connected to the optical disk apparatus mechanism portion, provided below the optical disk apparatus mechanism portion, and equipped with electronic circuits for controlling operations of the optical disk apparatus; and a socket connector (303) electrically connected to the electronic circuits, and provided in an exposed form, the dimension of the optical disk apparatus being such that the length is 85.6 mm, the width is 54.0 mm, and the thickness is 5.0 mm, and the socket connector being configured such that the connector fulfills socket connector specifications proposed by the PERSONAL COMPUTER MEMORY CARD INTERNATIONAL ASSOCIATION.

According to the present invention, the optical disk apparatus may be handled in the same manner as an IC memory card type II. That is, the apparatus may be used by inserting it into an IC memory card type II slot provided in an information equipment unit. Further, since the optical disk is detachable, the optical disk apparatus of the present invention costs less than that of the conventional art.

That is, in the case of an IC memory card, a plurality of expensive IC memory cards, each costing several tens of thousands of yen, needs to be made available. In this invention, however, a plurality of optical disks needs to be made available, and, essentially, only one optical disk apparatus needs to be made available. The cost of the optical disk is on the order of several thousand yen, and is thus substantially less expensive than the IC memory card. Further, the storage capacity of one optical disk is several hundred MB, which capacity is a hundred times larger than that of the IC memory card.

Therefore the number of optical disks that needs to be made available is smaller than the number of IC memory cards that needs to be made available.

Other objects and characteristics of the present invention will become apparent from the following detailed description of the preferred embodiments given with reference to the accompanying drawings.

BRIEF DESCRIPTION OF THE DRAWINGS

FIGS. 15(A) and 15(B) illustrate characteristics of the focusing actuator when it is fitted with dynamic vibration absorbers;

FIGS. 16(A) and 16(B) illustrate characteristics of the focusing actuator having the configuration of FIG. 12;

FIG. 37 is a perspective view of the printed board composite and the socket;

FIG. 40 illustrates a fourth embodiment of the optical disk apparatus of the present invention with the cover removed;

FIG. 57 is a partially removed perspective view of a seventh embodiment of the optical disk apparatus of the present invention;

DETAILED DESCRIPTION OF THE PREFERRED EMBODIMENTS

[First embodiment]

Figure 1:
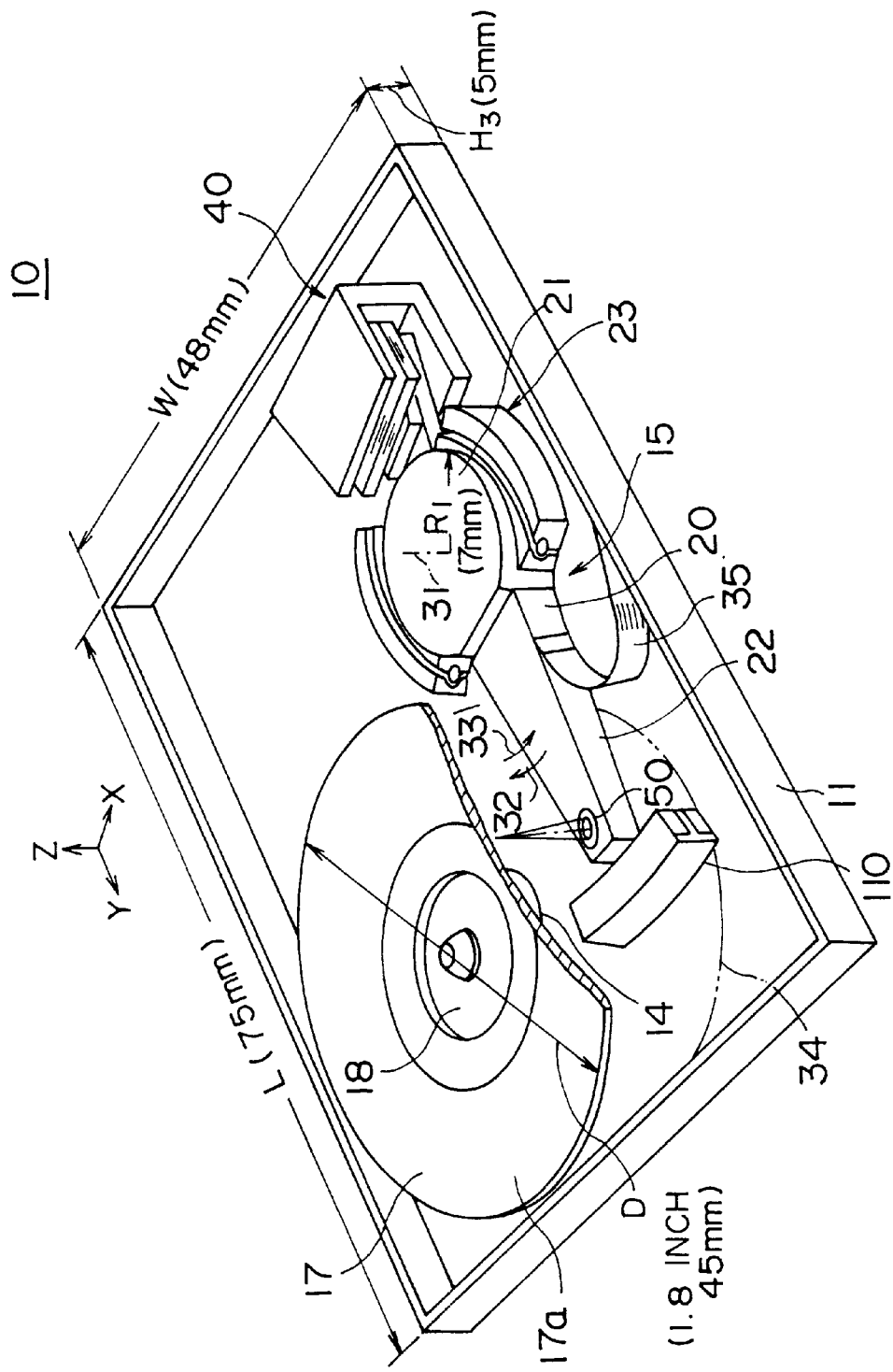
FIG. 1 is a perspective view illustrating, with the top cover removed, a first embodiment of the optical disk apparatus of the present invention.
Figure 2:
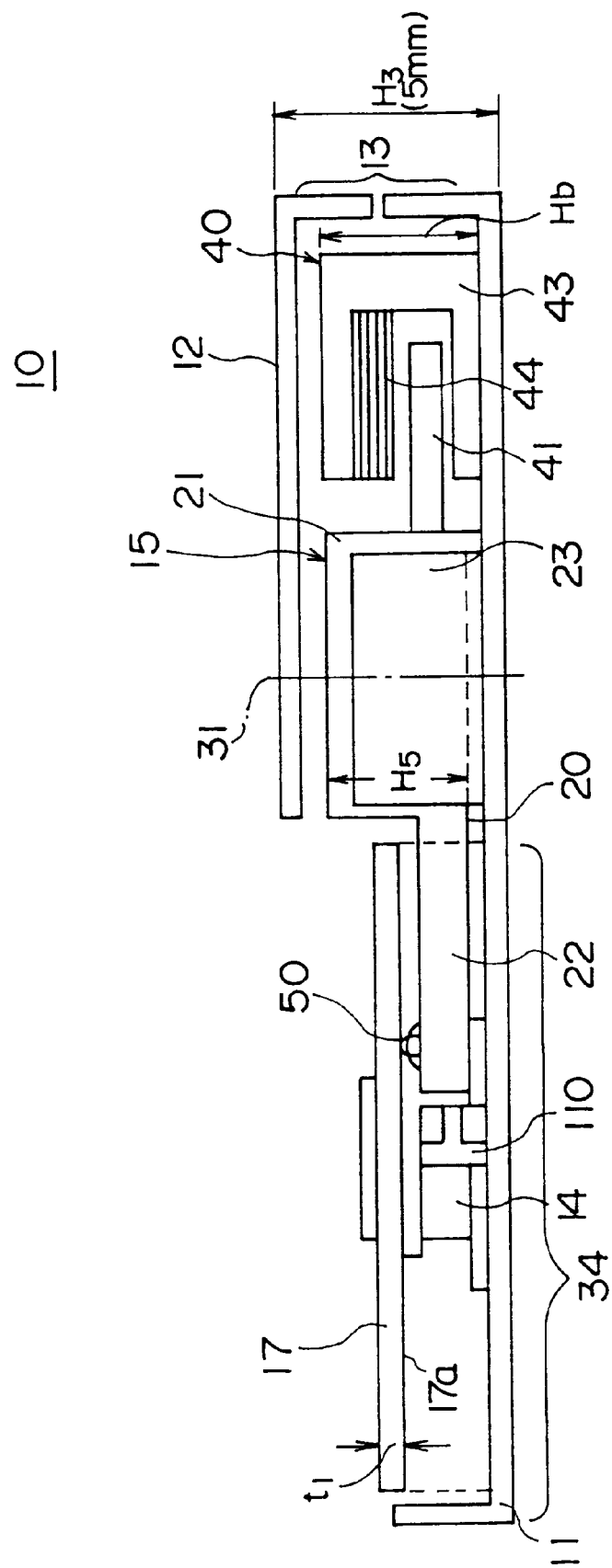
FIG. 2 is a side view of the optical disk apparatus of FIG. 1.

FIGS. 1 and 2 illustrate an overall configuration of an optical disk apparatus 10 according to the first embodiment of the present invention.

The optical disk apparatus 10 is configured such that a spindle motor 14 and a swing motion type optical head apparatus 15 are assembled in a frame 13 consisting of a bottom cover 11 and a top cover 12. A write-enabled phase-transition type optical disk 17 is attracted, at a metal hub 18 portion thereof, by a permanent magnet provided on a turntable so that the disk is detachably mounted on the turntable. This optical disk 17 has a diameter D of 1.8 inches and a thickness t of 0.3 mm. Alternatively two of such disks are adhesively attached to each other, resulting in a thickness of 0.6 mm. The diameter of the disk or disks can be smaller than 1.8 inches.

This small and thin optical disk apparatus 10 has a length L of 75 mm, a width W of 48 mm, and a height $H_3$ of 5 mm, meaning that it is substantially smaller than an IC memory card.

A description will be given next of the swing motion type optical head apparatus 15, which contributes to realizing a thin-type optical disk apparatus 10.

Figure 3:
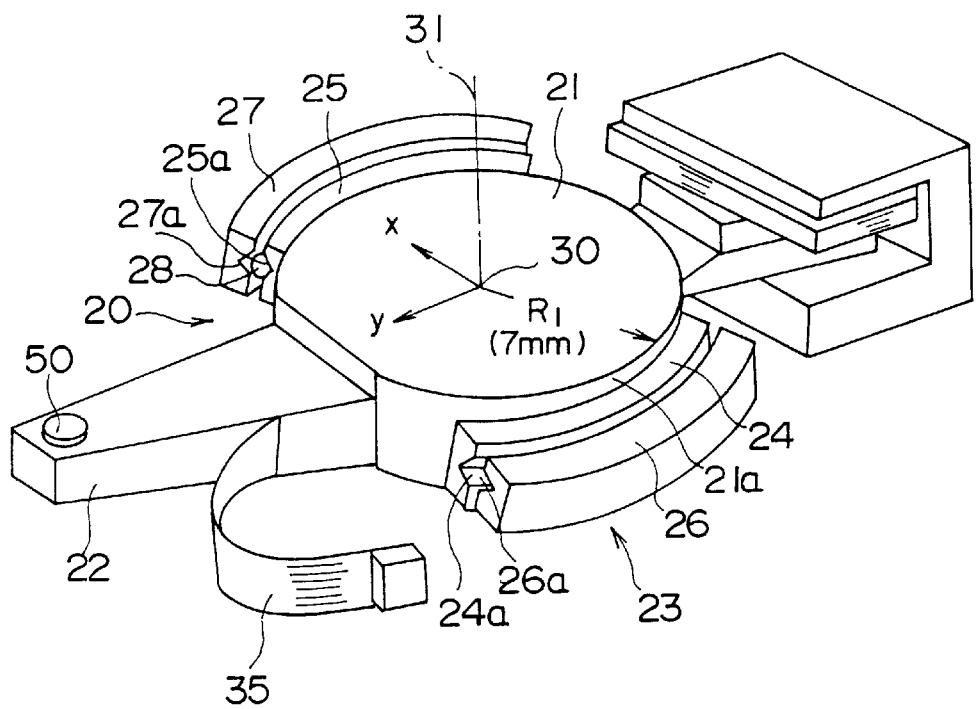
FIG. 3 is a perspective view of the swing-motion type optical head apparatus of FIG. 1.

As shown in FIG. 3, 20 indicates a head main body, which main body consists of a disk portion 21 having a radius $R_1$ (about 7 mm) and an arm portion 22 that extends therefrom. The head main body is made of a hollow and hermetically-sealed structure.

This head main body 20 is supported, in a way described below, by a bearing 23 at a side 21a of the disk portion 21, so that the main body can swing.

The side 21a is fitted with arc-shaped rails 24 and 25 each having a V-shaped groove, which rails serve as a movable inner ring portion of the bearing 23.

The bottom cover 11 is fitted, in positions opposite to the above-mentioned rails 24 and 25, with respective arc-shaped rails 26 and 27 each having a V-shaped groove, which rails serve as a stationary outer ring portion of the bearing 23.

Figure 4:
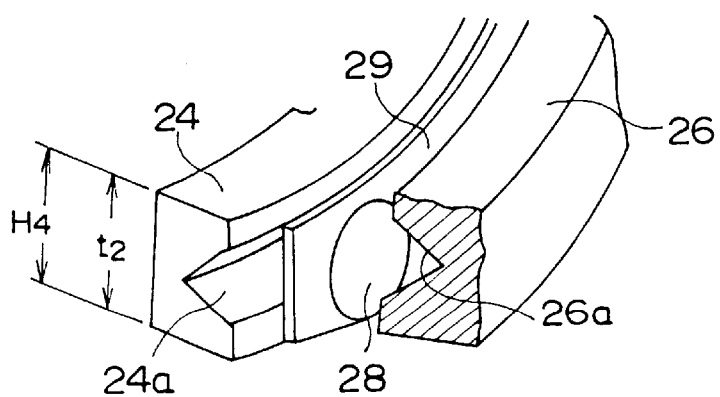
FIG. 4 illustrates the bearing structure in FIG. 3.

As shown in FIG. 4, a plurality of steel balls 28 each having a small diameter and being separated from each other by retainers 29 placed between them are engaged to V-shaped grooves 24a and 26a provided opposite to each other in the rails 24 and 26, respectively. Likewise, balls 28 are engaged to V-shaped grooves 25a and 27a provided opposite to each other in the rails 25 and 27, respectively.

The head main body 20 is thus supported by the above-mentioned bearing structure 23, so that the body is capable of swinging in directions 32 and 33 shown by arrows in FIG. 1 on a swing motion center axle 31, which is designated as a Z axis passing through a center 30 of the disk portion 21.

The head main body 20 swings on a plane parallel to a recording face 17a of the mounted optical disk 17; an objective lens 50 described later moves in a radial direction of the mounted optical disk 17.

As shown in FIG. 4, the bearing 23 is of a thin type where a height $H_4$ thereof has a dimension corresponding to a thickness $t_2$ of the rail 24.

Since the aforementioned radius $R_1$ of the disk portion is as large as about 7 mm, angular rigidity of the bearing 23 is great, so that a precise positioning of the optical head apparatus 15 is possible.

Further, the bearing 23 is located at a certain horizontal distance from the mounted optical disk 17; and the whole of the disk portion 21 is located at a distance from a region 34 created when the mounted optical disk 17 is projected on the bottom cover 11.

As shown in FIG. 2, the disk portion 21 and the optical disk 17 are disposed such that the optical disk 17 has a height from the bottom of the apparatus shorter than a height $H_5$ of the disk portion 21.

Since a height $H_3$ of the optical disk apparatus 10 is determined by the height $H_5$ of the disk portion 21 and not by a thickness $t_1$ of the optical disk 17, the optical disk apparatus 10 is thinner than conventional apparatuses.

The above-mentioned rails 24 and 25 can be provided in one block integral with the lateral face of the disk portion 21. This arrangement can decrease the radial size of the bearing 23, and can further contribute to a downsizing of the optical disk apparatus 10.

As described later, a plurality of optical parts are built inside the above-mentioned disk portion 21.

The arm portion 22 is provided to extend from the disk portion 21 of the main body 20 and underneath the mounted optical disk 17.

35 indicates a flexible cable, which is provided in order to prevent a swinging motion of the head main body 20 from being suppressed.

Figure 5:
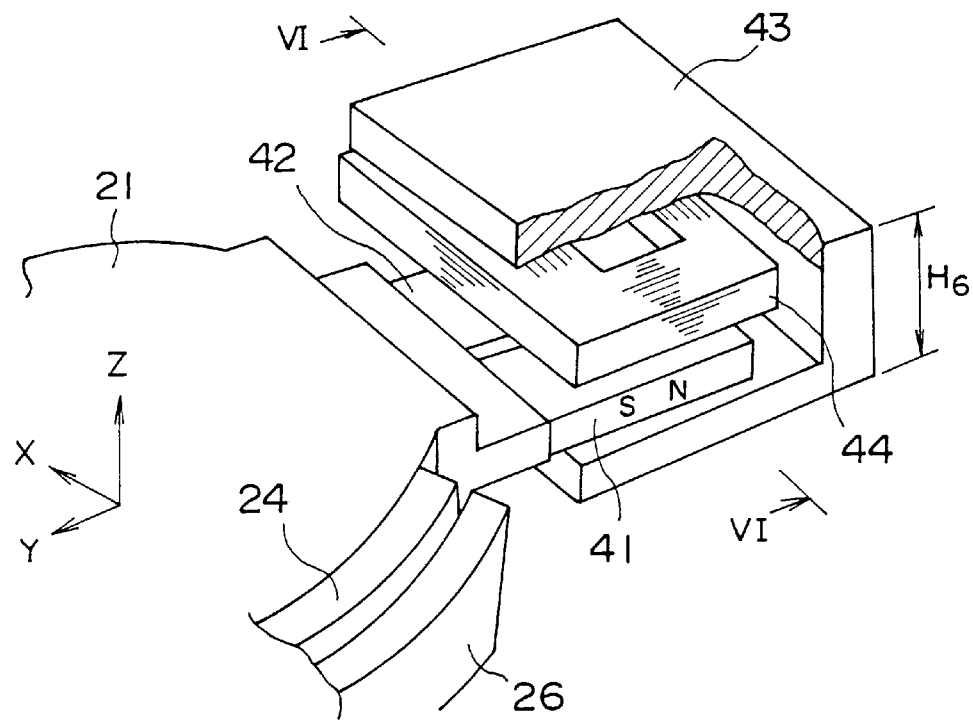
FIG. 5 illustrates the electromagnetic driving apparatus for making the head main body swing with a part of the driving apparatus broken away.

A description of an electromagnetic driving apparatus 40 for making the head main body 20 swing is given below with reference to FIGS. 5 and 6.

The electromagnetic driving apparatus 40 in a permanent magnet motor provided, across the swing motion center axle 31, opposite to the objective lens 50 described later, and positioned at a distance from the region 34 as in the case of the above-mentioned disk portion 21.

41 and 42 indicate permanent magnet plates adhesively attached to the disk portion 21. The magnet plates extend away from the arm portion 22, and are arranged along a peripheral direction of the disk portion 21.

The permanent magnet plate 41 is polarized in the positive direction of the Z axis, while the permanent magnet plate 42 is polarized in the negative direction thereof.

43 indicates a stationary yoke, which is fixed to the bottom cover 11.

44 indicates a driving coil, which is adhesively attached inside the stationary yoke 43, and is opposite to the permanent magnet plates 41 and 42.

Figure 6:
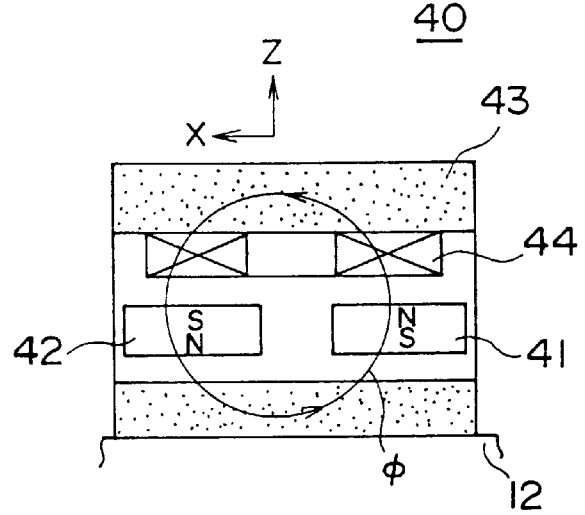
FIG. 6 is a cross sectional view taken along the line VI—VI of FIG. 5.

As shown in FIG. 6, a magnetic flux $\phi$ flows through a magnetic circuit consisting of the permanent magnet plates 41 and 42, and the stationary yoke 43.

When the driving coil 44 conducts, a force acts, in an X direction shown by an arrow, on the permanent magnet plates 41 and 42, due to interaction between magnetic flux and electric current. This action makes the head main body 20 swing, and causes the objective lens, described later, to be positioned above a desired track on the optical disk 17.

The electromagnetic driving apparatus 40 is not provided underneath the optical disk 17 but at a distance from the optical disk 17, with the result that a height $H_6$ of the driving apparatus can be determined irrespective of thickness of the optical disk 17, and that the height $H_6$ can be great enough for the electromagnetic driving apparatus 40 to be installed, which apparatus generates satisfactory driving force and has an excellent driving characteristic.

The above apparatus 40 is of a structure such that the permanent magnet plates 41 and 42 are movable and the driving coil 44 is stationary. This structure has an advantage in that the apparatus can be made thinner as compared with a structure where permanent magnets are stationary and a driving coil is movable.

A description will be given next of an inside structure of the head main body 20 with reference to FIGS. 7, 8, and 9.

The head main body 20 is configured such that a case 49 accommodates a variety of optical parts built therein, as described below, the case consisting of: a case main body 47 composed of a bottom plate 45 and a peripheral wall 46 rising from a periphery of the bottom plate; and a top board 48 covering the case main body 47.

The case main body 47 and the top board 48 may be made of an aluminum alloy, a ceramic, or a fiber reinforced resin, and are both light.

50 indicates an objective lens and 63 indicates a perpendicularly reflecting mirror. Both are provided at an end 12 of the arm portion 22.

The objective lens 50 is a single lens having non-spherical surfaces, and is thinner than a conventional objective lens assembly consisting of a plurality of lenses.

As will be described later, optical parts other than the objective lens 50 and the reflecting mirror 63 are all accommodated in the disk portion 21, and are provided near the swing motion center axle 31.

51 indicates a semiconductor laser chip adhesively attached to a silicon substrate 52. This silicon substrate 52 is mounted on a copper heat sink 53, and the heat sink 53 is adhesively attached to the bottom plate 45.

The semiconductor laser chip 51 is not packaged. A height from the substrate 54 to the semiconductor chip 51 is adjusted to be smaller, than a height when the chip is packaged.

55 indicates a collimator lens embodied by a single lens having non-spherical surfaces.

56 indicates a complex optical element having a structure where a beam shaping prism 57, a deflected beam-splitter 58, a prism 59, and a ¼ wavelength plate 60 are integrated.

61 and 62 indicate photodetectors.

65 is a tracking actuator disposed in a base portion of the arm portion 22. A reflecting mirror 66 having the shape of a triangular pole is supported by a blade spring 67. A detailed description of the actuator will be given later.

Figure 9:
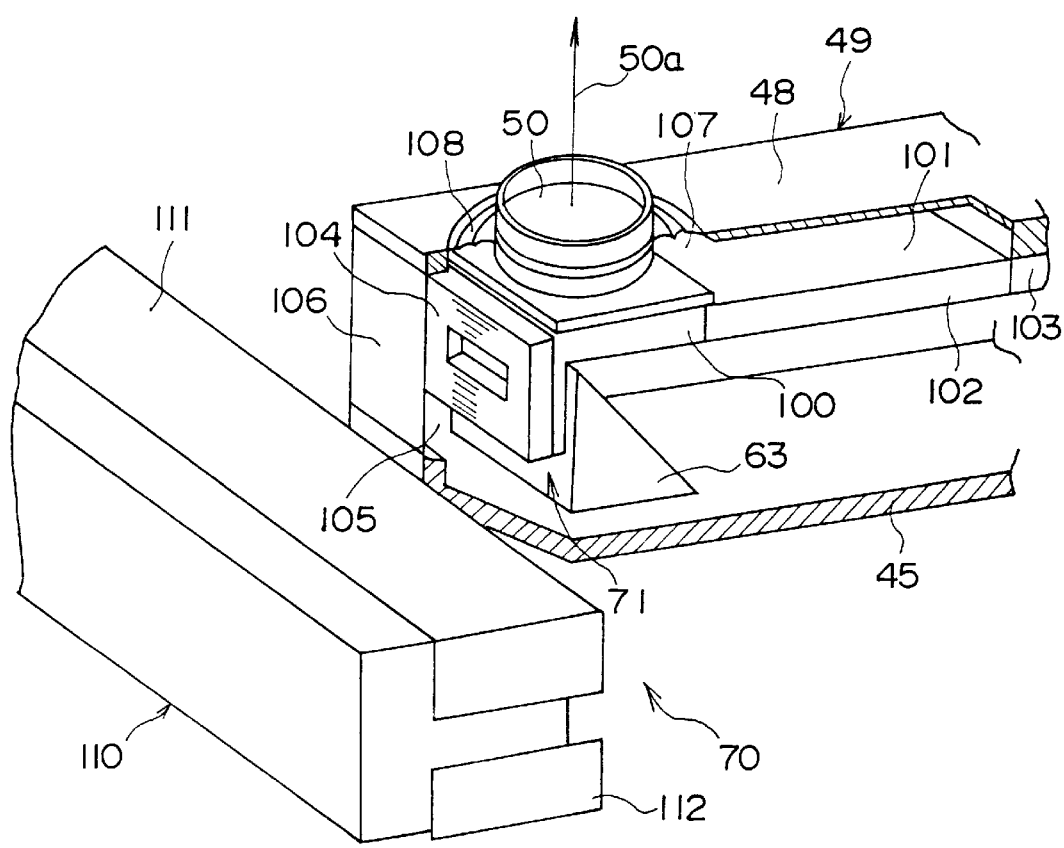
FIG. 9 showing the focusing actuator.

As shown in FIG. 9, a movable portion 71 of a focusing actuator 70 is provided at the end of the arm portion 22.

Figure 7:
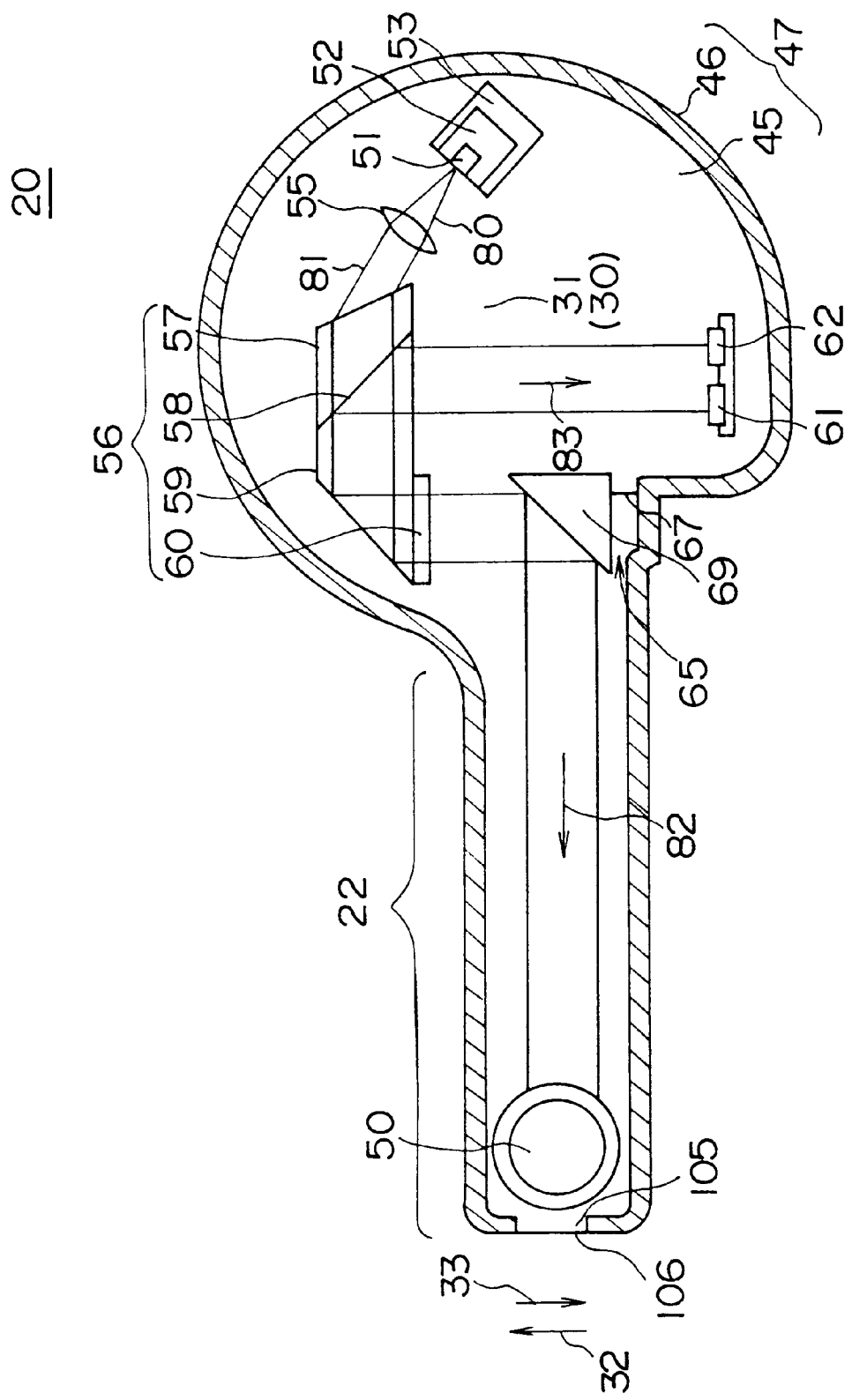
FIG. 7 illustrates the internal structure of the head main body.
Figure 8:
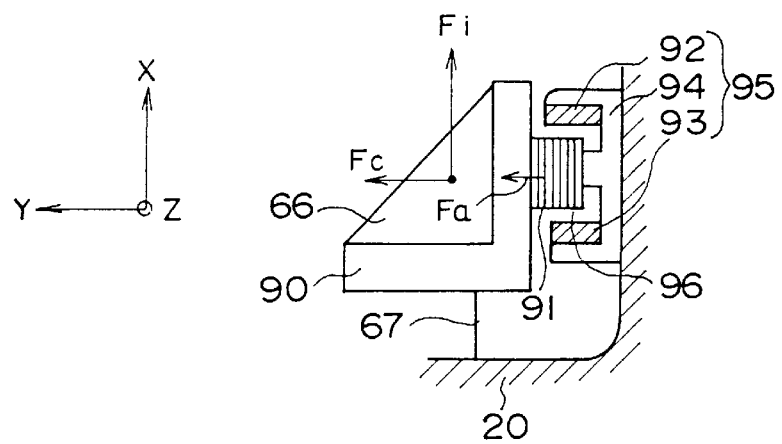
FIG. 8 illustrates the tracking actuator.

Referring to FIG. 7, a laser light 80 emitted from the semiconductor laser chip 51 is allowed to pass through the lens 55 so as to be turned into a parallel light 81, which parallel light is then allowed to enter the prism 57 so as to be shaped into a completely round shape. Thereafter, the light is allowed to pass through the deflecting beam-splitter 58 and the ¼ wavelength plate 60 before reaching the tracking actuator 65, is reflected by the reflecting mirror 66, and advances toward the end of the arm portion 22, as indicated by an arrow 82. As shown in FIG. 9, the light is then reflected perpendicularly by the reflecting mirror 63, converged by the objective lens 50, and then converged on the optical disk 17.

The laser light reflected by the optical disk 17 and returned to the deflecting beam-splitter 58 follows the same path as the light converged on the disk, but it is then reflected by the deflecting beam-splitter 58 and reaches the photodetectors 61 and 62 as shown by an arrow 83.

Outputs from the photodetectors 61 and 62 are subjected to logical operations, so that a reproduction signal, a tracking control signal, and a focus control signal are obtained.

Since, as shown in FIG. 7, the heat sink 53, the complex optical element 56, and the tracking actuator 65 are disposed near the swing motion center axle 31, a moment of inertia of the head main body 21 is small, the moment of inertia being measured around the swing motion center axle 31, so that an access to the desired track is achieved at a high speed.

Moreover, since there is no axle piercing the disk portion, a high flexibility in the arrangement of parts, including the above-mentioned complex optical element 56, in made possible. Parts including the complex optical element 56 are arranged such that they are close to the swing motion center axle 31.

This arrangement also ensures that a moment of inertia of the head main body 21 around the swing motion center axle 31 is maintained to be small, so that an access can be achieved at a high speed.

Although the semiconductor chip 51 is not packaged but is instead a bare part, the reliability of the semiconductor chip 51 is guaranteed because the head main body 20 is made of a hermetically sealed structure.

Although the head main body 20 is made of a hermetically sealed structure, heat generated by the semiconductor chip 51 is conducted through the heat sink 54 to the bottom plate 45 so as to be effectively radiated out of the head main body 20.

A description will be given next of the above-mentioned tracking actuator 65 with reference to FIG. 8, particularly.

An L-shaped holder 90 is fitted with the reflecting mirror 66 having a shape of a triangular pole, and with the driving coil 91.

The holder 90 is supported by the wall of the head main body 20 through the blade spring 67.

The head main body 20 is fitted with a magnetic circuit structure 95 consisting of permanent magnets 92 and 93 and a yoke 94. The driving coil 91 is provided with a gap 96 for this magnetic circuit structure 95.

When a tracking control current is fed to the driving coil 91, a force Fa in a Y direction is generated in the coil 91; the reflecting mirror 66 then rotates on a Z axis, causing a deflection of the blade spring 67, so that the light is deflected on an X-Y plane.

Tracking control is achieved in the hollowing manner: a spot, on the optical disk 17, limited by the objective lens 50 follows a minute displacement of a track.

The tracking actuator 65 is configured such that the above-mentioned force Fa operates on a node of a secondary-deflection-mode resonance of the blade spring 67, by positioning the driving coil 91.

The above arrangement ensures that the secondary-deflection-mode resonance of the blade spring 67 is suppressed, and that the tracking actuator 64 has an excellent mechanical oscillation characteristic.

In correspondence with a swinging motion of the head main body 21, two forces operate in a movable portion of the tracking actuator 65: a centrifugal force Fc; and an inertia force Fi along a circumference of a circle created by a swinging motion of the head main body 21. These forces Fc and Fi act as disturbance. In the case of a swinging motion, generally, Fi>Fc.

The blade spring 67 is disposed such that its longitudinal direction, along which direction its rigidity is great, is aligned with circumferential directions 32 and 33 of the head main body 21 swinging motion.

This arrangement ensures that even when the force Fi operates, a deformation of the blade spring 67 is small. Therefore the tracking actuator 65 operates normally and a tracking control is effected with precision.

A description will be given next of the focusing actuator 70 with reference to FIGS. 9 and 10.

Figure 10A:
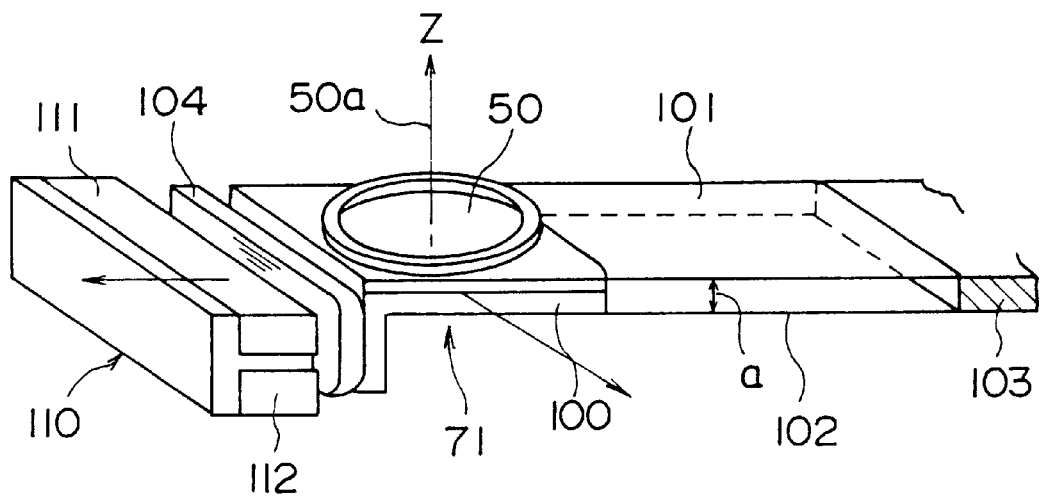
FIG. 10(A) and FIG. 10(B) specifically illustrate the focusing actuator of FIG. 9.

As shown in FIGS. 9 and 10(A), the objective lens 50 is attached to an L-shaped holder 100.

The holder 100 is fixed at ends of two blade springs 101 and 102 having the same shapes, which springs are disposed parallel to each other.

Figure 10B:
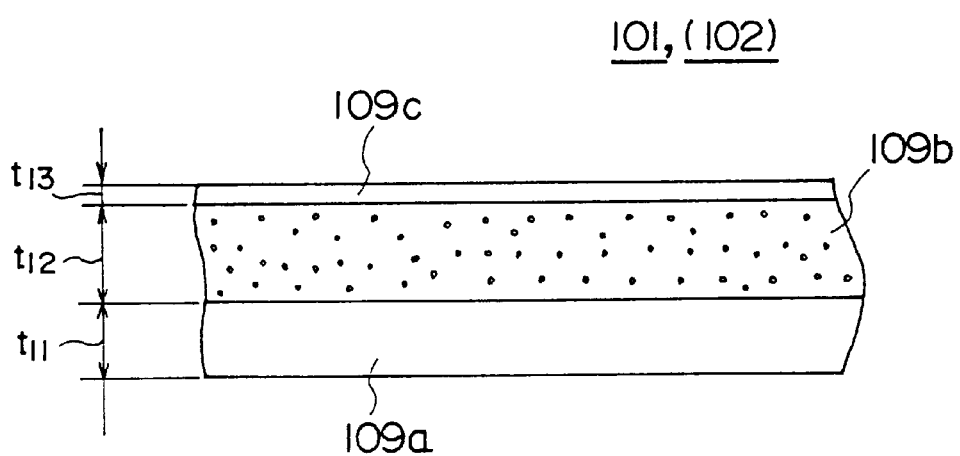

As shown in FIG. 10(B), the blade springs 101 and 102 are both constituted such that one of the two sides of a spring metal plate 109a has, on its entire surface, a damper 109b made of a silicon-gum visco-elastic body, the damper having thereon a thin, soft resin film 109c.

Referring to the same figure, $t_{11}$ is 30 μm, $t_{12}$ is 50 μm, and $t_{13}$ is 10 μm.

In this structure, the damper 109b suppresses sharp main mechanical resonance generated with a frequency on the order of 10 to 100 Hz, which range is characteristic of a metal blade spring. The damper also acts to suppress a peak value of higher mechanical resonance.

The resin film 109c prevents adherence or dust due to the viscosity of the damper 109b.

Base portions or the blade springs 101 and 102 are fixed to a portion 103 of the arm portion 22 of the head main body 21.

An interval a between the blade springs 101 and 102 is adjusted to be smaller than a thickness of the objective lens 50.

The driving coil 104 is fixed to a perpendicular portion of the holder 100, and is opposite to an opening 105 at the end of the arm portion 22.

106 indicates a thin resin film that covers an opening 105 at the end of the arm portion 22. As will be described later, this resin film 106 allows magnetic flux to pass through but does not allow dust to pass through it.

An opening 107 surrounding the objective lens 50 is covered by a soft resin film 108. The soft resin film 108 does not limit a displacement of the objective lens 50, which lens is provided for focus control, but it does prevent invasion of dust.

Figure 11:
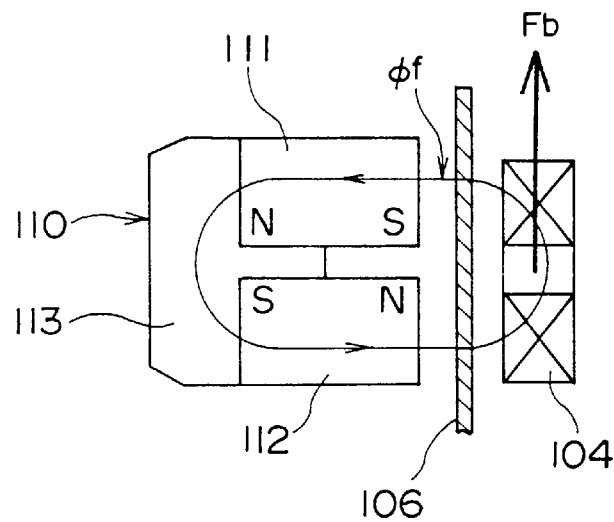
FIG. 11 illustrates the relationship between the stationary magnetic circuit and the driving coil of FIG. 9.

110 indicates a stationary magnetic circuit having a long and narrow shape assembled onto the bottom cover 11 in such a manner that the magnetic circuit extends, at a short distance from the end of the arm portion 22, along the movement track of the end of the arm portion 22, the track being created when the head main body 20 is made to swing, As shown in FIG. 11, the stationary magnetic circuit 110 consists of two permanent magnets 111 and 112 and a yoke 113.

The permanent magnets 111 and 112 are disposed such that their polarities are opposite to each other, and such that a magnetic flux $\phi f$ lows as shown in FIG. 11. The magnetic flux $\phi f$ passes through the resin film 106 and reaches the driving coil 104.

The magnetic flux $\phi f$ flows out from the entire front face of the stationary magnetic circuit 110, and exerts itself on the driving coil 104 no matter what position the head main body 20 is at during its rotation.

When the driving coil 104 is supplied with a focus control current, this current interacts With the magnetic flux $\phi f$ and a force Fb in the Z axis direction is generated in the driving coil 104.

This way the objective lens 50 is displaced in the Z axis direction while causing the blade springs 101 and 102 to deflect, so that a focus control is achieved.

Since the magnetic circuit 110, having a comparatively heavy weight, is assembled onto the bottom cover 11, the end of the arm portion 22 is small by comparison, so that a moment of inertia of the head main body 20 measured around the swing motion center axle 31 is small.

Figure 12:
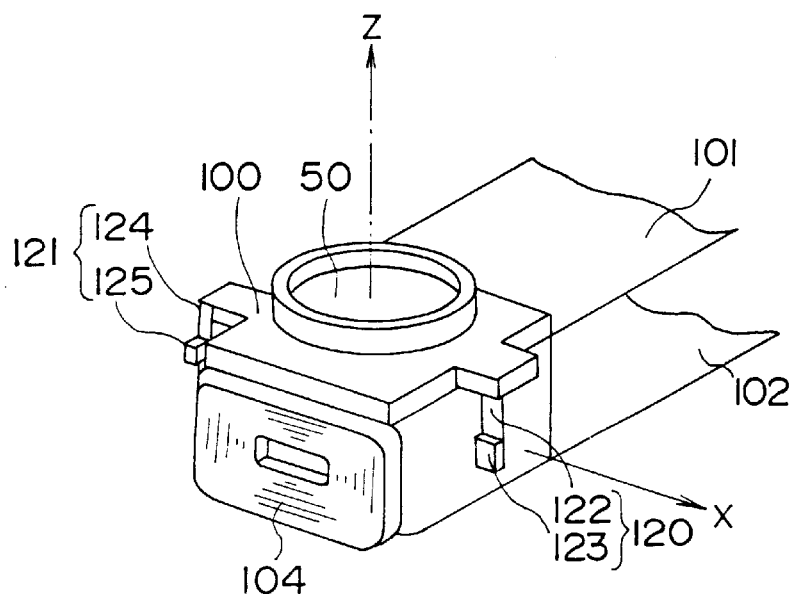
FIG. 12 illustrates the configuration of the end portion of the focusing actuator.

The focusing actuator 70 is provided with dynamic vibration absorbers 120 and 121, as shown in FIG. 12.

The dynamic vibration absorber 120 consists of a blade spring 122, which extends in the Z direction so that its upper end is fixed onto a part of the holder 100, and a minute movable weight 123 fixed to a free lower end of the blade spring 122.

The other dynamic vibration absorber 121 also consists of a blade spring 124 and a minute movable weight 125.

The dynamic vibration absorbers 120 and 121 are provided on both sides of the holder 100.

The main resonance frequency of each of these dynamic vibration absorbers is set to be the same as the higher mechanical vibration frequency, described later, of the movable part of the focus actuator 70.

A description will be given next of the operation and effect of the above-mentioned dynamic vibration absorbers 120 and 121.

Figure 13:
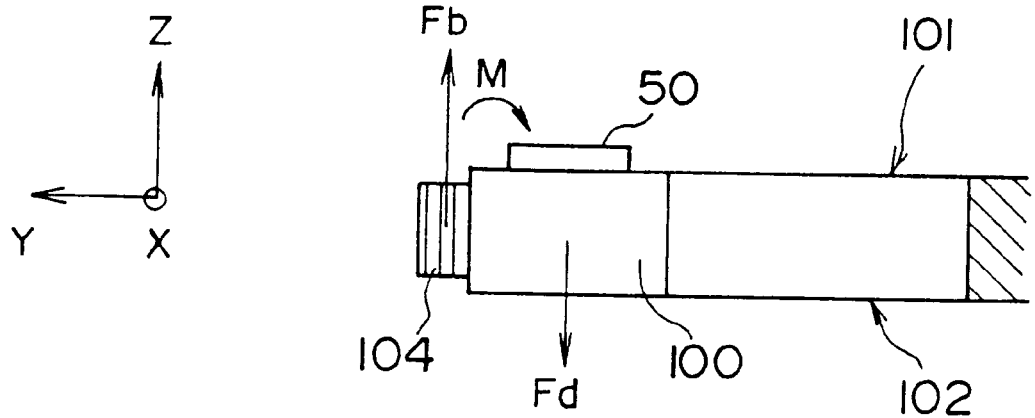
FIG. 13 illustrates how forces act on the focusing actuator.

As shown in FIG. 13, the center of gravity of the movable part of the focusing actuator 70 resides approximately on the optical axis of the objective lens 50. An inertia force Fd caused by the movement of the movable part acts along the optical axis 50a of the objective lens 50. The driving force Fb, on the other hand, acts on the coil 104, meaning that the driving force Fb and the inertia force Fd acts on points that are horizontally apart.

Figure 14:
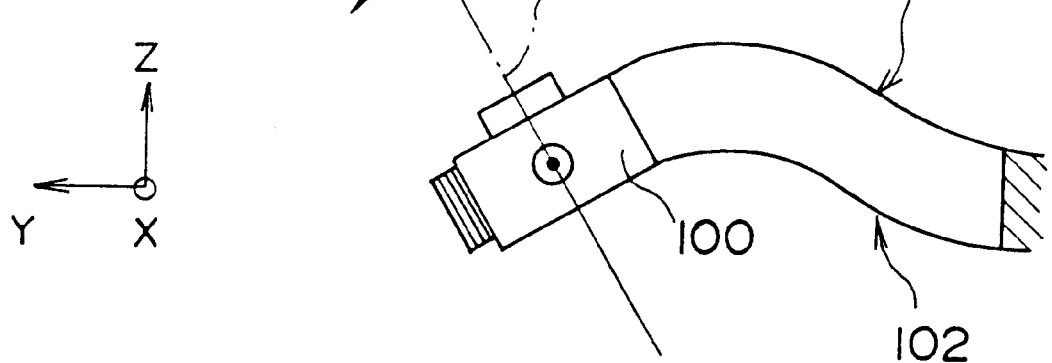
FIG. 14 illustrates the oscillation mode when the focusing actuator is in mechanical resonance.

This way a couple of force M around the X axis acts on the holder 100, generating a higher mechanical resonance in the focusing actuator 70. This resonance mode is manifested as a rotational mode oscillation around the X axis, as shown in FIG. 14. When the above-mentioned higher mechanical resonance occurs, an inclination oscillation of the optical axis of the objective lens is generated, so that a focus control is disturbed.

A measurement was made of a characteristic of an oscillation, around the X axis, of the optical axis 50a of the objective lens 50 of a focusing actuator not equipped with dynamic vibration absorbers, in which measurement angular displacement, around the X axis, caused by the driving force Fb was measured. The gain obtained is indicated by a line I in FIG. 15(A), and the phase obtained is indicated by a line II in FIG. 15(B). A peak 126 of the gain occurred at a frequency of about 3 kHz, at which frequency a 180 degree phase shift is seen. This means that a focus control beyond the frequency of 3 kHz is rendered impossible.

However, when the actuator is equipped with the dynamic vibration absorbers 120 and 121 as shown in FIG. 12, a higher resonance generated in the movable part of the focusing actuator 70 is suppressed because the dynamic vibration absorbers 120 and 121 resonate in a phase opposite to the phase of the higher resonance.

A line III in FIG. 16(A) shows a gain of oscillation, around the X axis, of the optical axis 50a of the objective lens 50.

As can be seen from the same figure, the peak 126, which occurred at the frequency of 3 kHz, is suppressed, as shown by a line 127.

The phase obtained is shown by a line IV in FIG. 16(B).

As can be seen from the same figure, phase variation is small as shown by a line 128, and no phase reversal is observed.

This way a focus control is effected in a stable manner across a satisfactorily wide frequency range.

Finally, in order to facilitate an understanding of the invention, configurations incorporated in the optical disk apparatus 10 will be listed, such as configurations which make it possible to make an apparatus thin, and main configurations which make it possible to decrease, for speedy access, a moment of inertia around the swing motion center axle 31 of the head main body 20.

(1) Configurations which make it possible to make an apparatus thin.

a) A configuration in which the optical head apparatus 15 is of a swing motion type, and in which the disk portion 21 and the electromagnetic driving apparatus 40 are disposed at a distance from the projection region 34 of the optical disk. (FIGS. 1 and 2)

b) The bearing 23 supporting the circumference of the disk portion 21. (FIG. 3)

c) A single-lens configuration of the objective lens 50. (FIG. 9)

d) A packageless configuration of the semiconductor laser. (FIG. 7)

(2) Configurations which make it possible to decrease a moment of inertia of the head main body.

a) A configuration in which the swing motion center resides on the disk portion 21, in which portion are provided optical parts. (FIG. 7)

b) The magnetic circuit 110 of the focusing actuator 70 is fixed to the bottom cover 11, and is not mounted on the head main body 20. (FIG. 1)

[Second embodiment]

A description will be given next of the second embodiment of the optical disk apparatus of the present invention.

Figure 17:
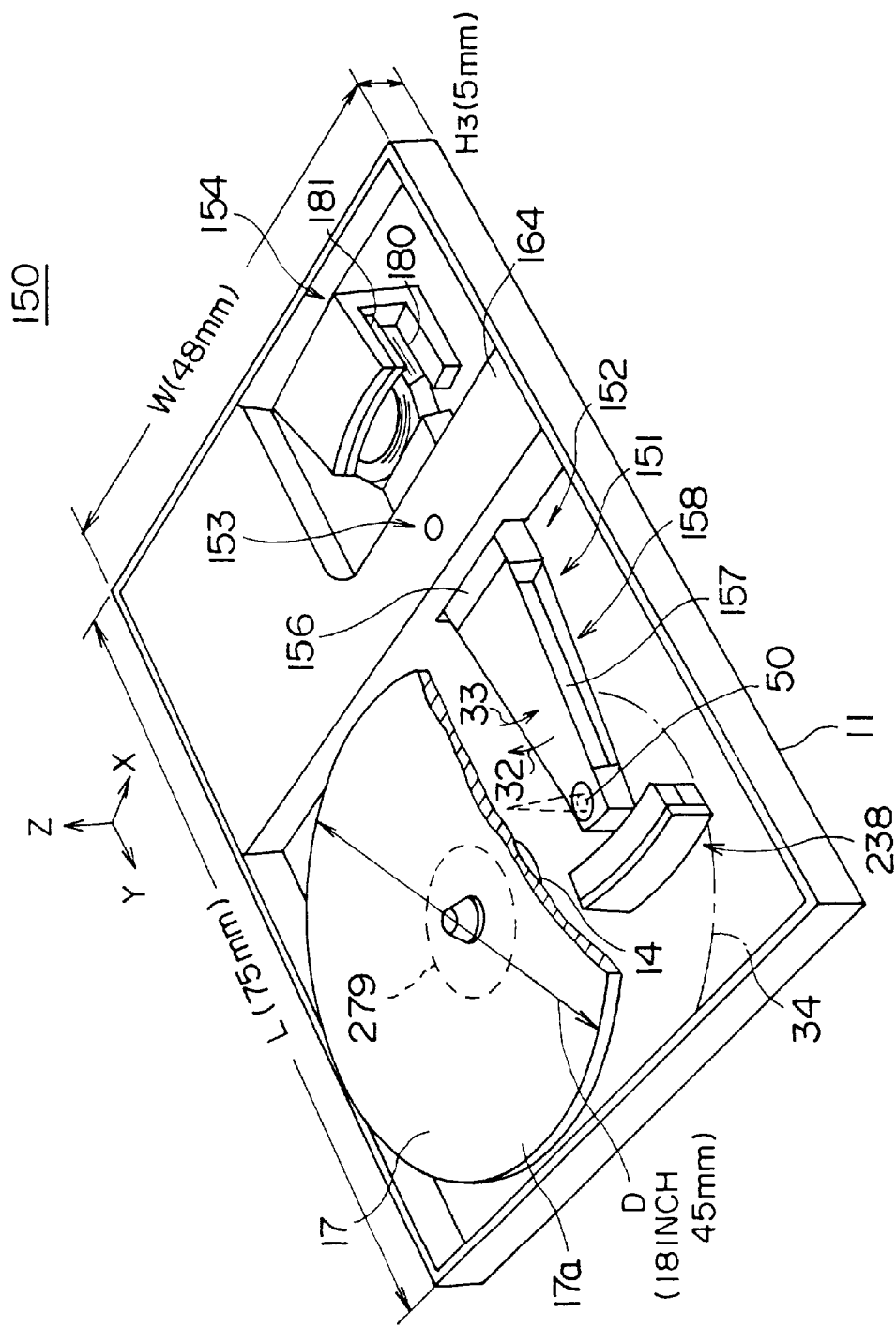
FIG. 17 is a perspective view illustrating, with the top cover removed, another embodiment of the optical disk apparatus of the present invention.
Figure 18:
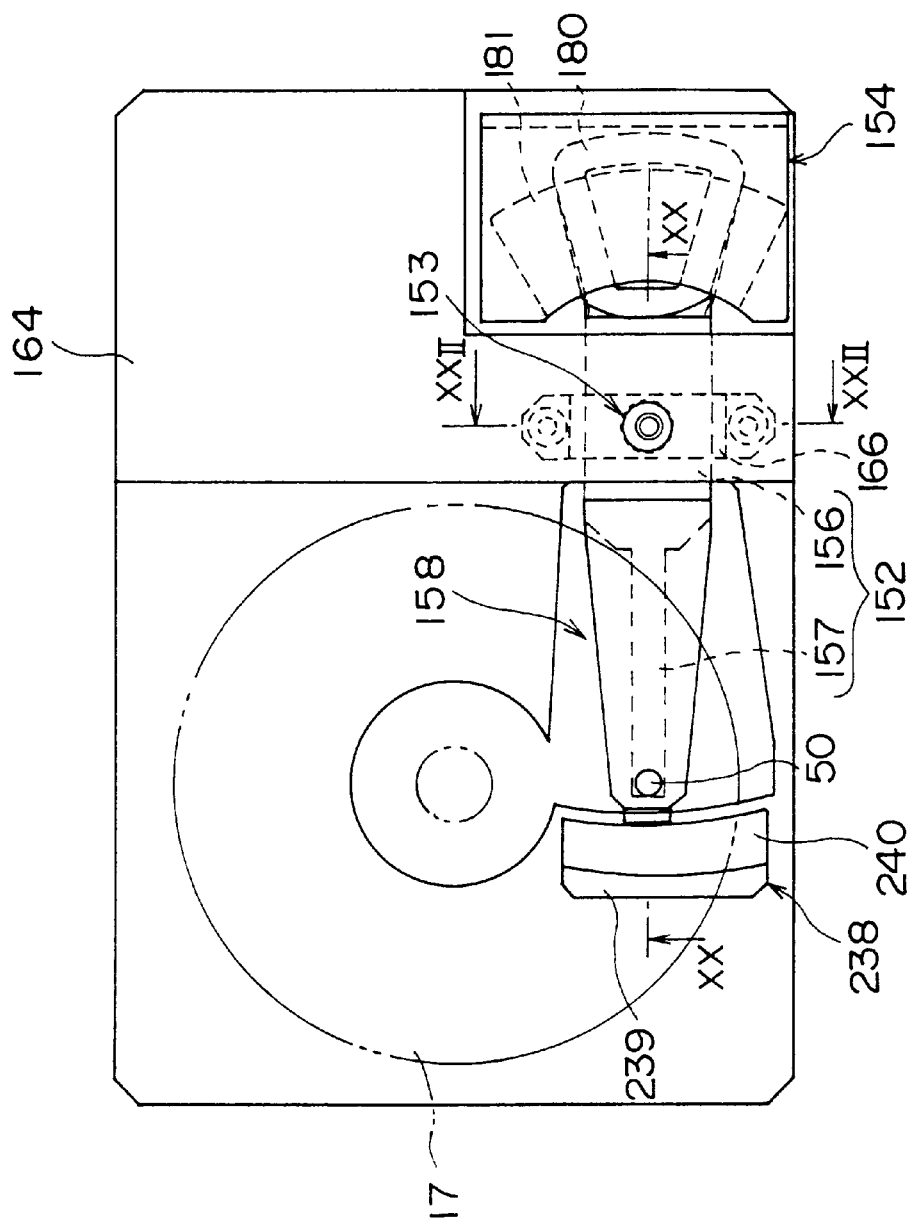
FIG. 18 is a top view of the apparatus of FIG. 17.

FIGS. 17 and 18 illustrate an overall configuration of an optical disk apparatus 150.

In the figures, components that correspond to components shown in FIG. 1 are given the same reference numerals.

The size of the optical disk apparatus 150 is the same as the size of the optical disk apparatus 10 shown in FIG. 1.

A description will first be given of a swing motion type optical head apparatus 151 built into the apparatus 150.

Figure 19:
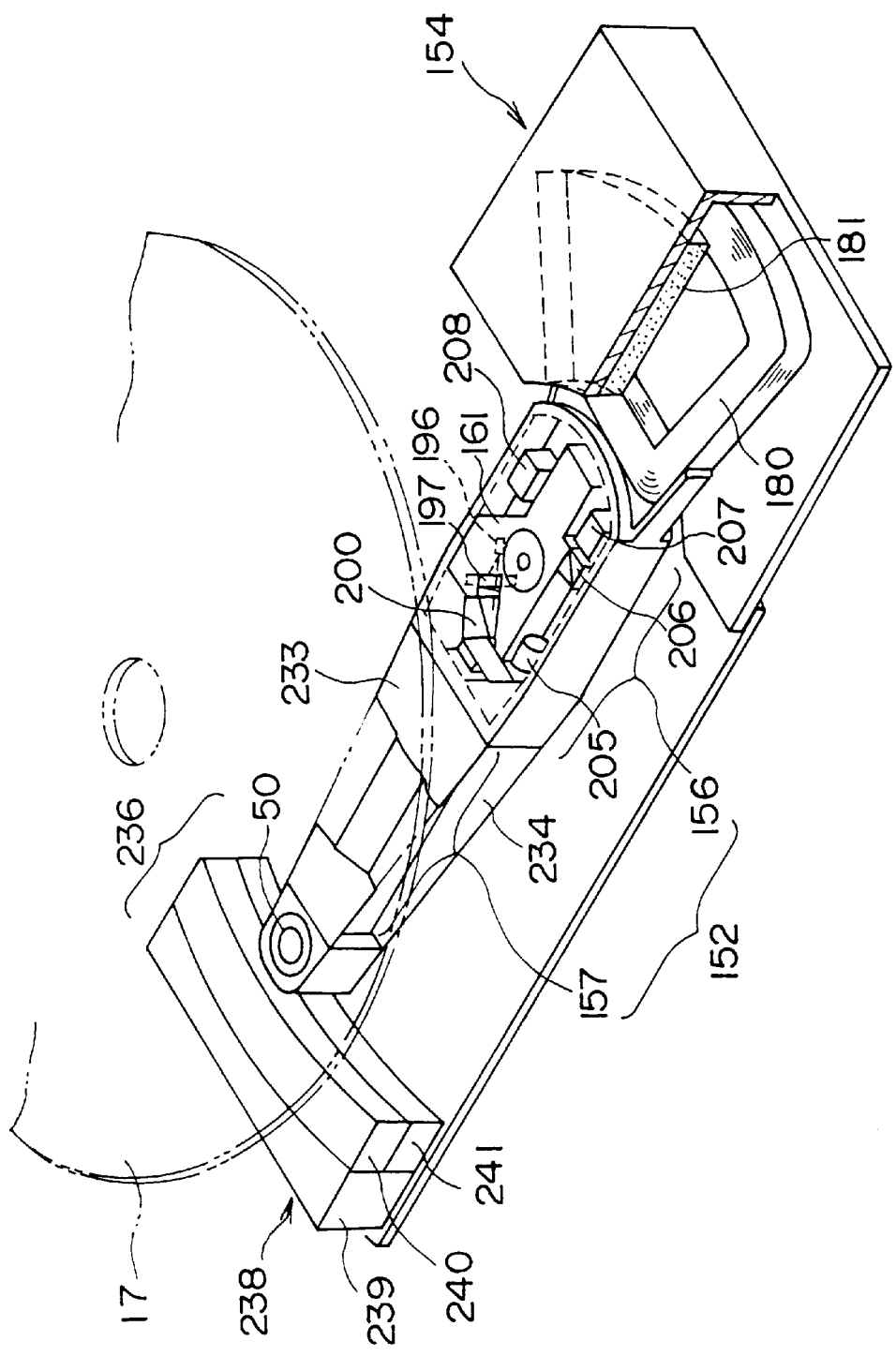
FIG. 19 is a partially removed perspective view of the swing-motion type optical head apparatus of FIG. 17.
Figure 20:
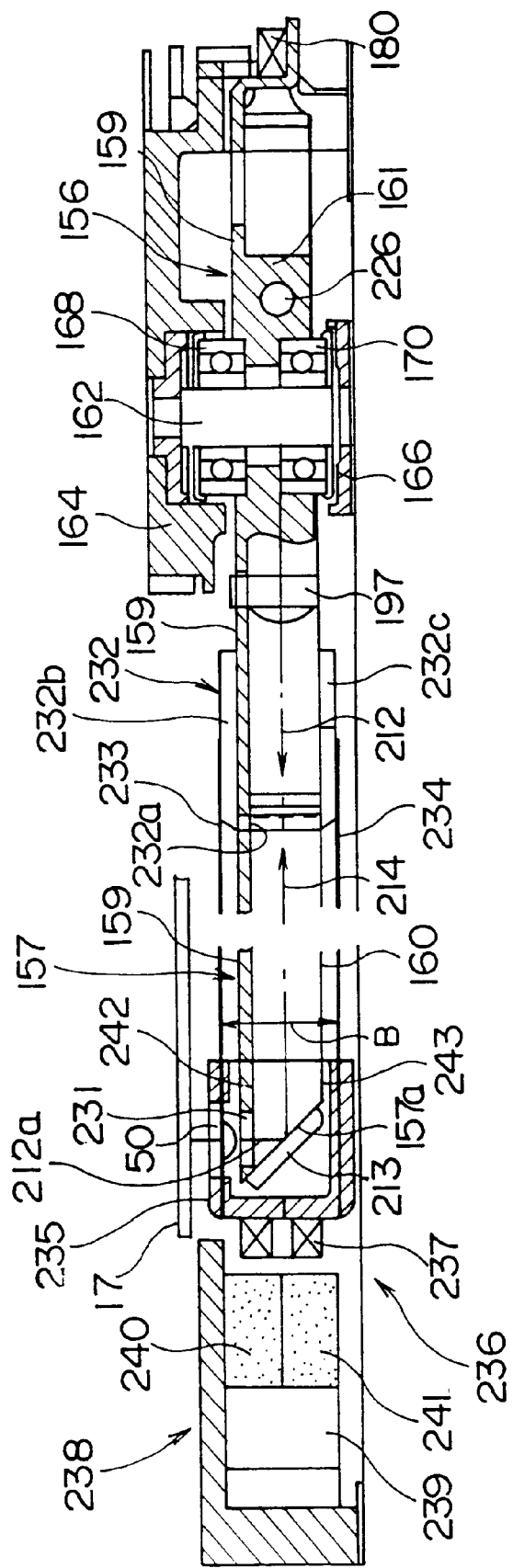
FIG. 20 is a cross sectional view taken along the line XX—XX of FIG. 18.

As shown in FIGS. 19 and 20, the swing motion type optical head apparatus 151 consists of a head main body 152, a swing motion support mechanism 153, and an electromagnetic driving apparatus 154, and is configured such that the head main body 152 is supported by the swing motion support mechanism 153 so as to be enabled to swing, the head main body being made to swing in directions 32 and 33 by means of the electromagnetic driving apparatus 154.

The heed main body 152 consists of a thin main body portion 156 of an approximately rectangular shape, an arm 157 extending from this main body portion 156, and a parallel blade spring mechanism 158.

Figure 22:
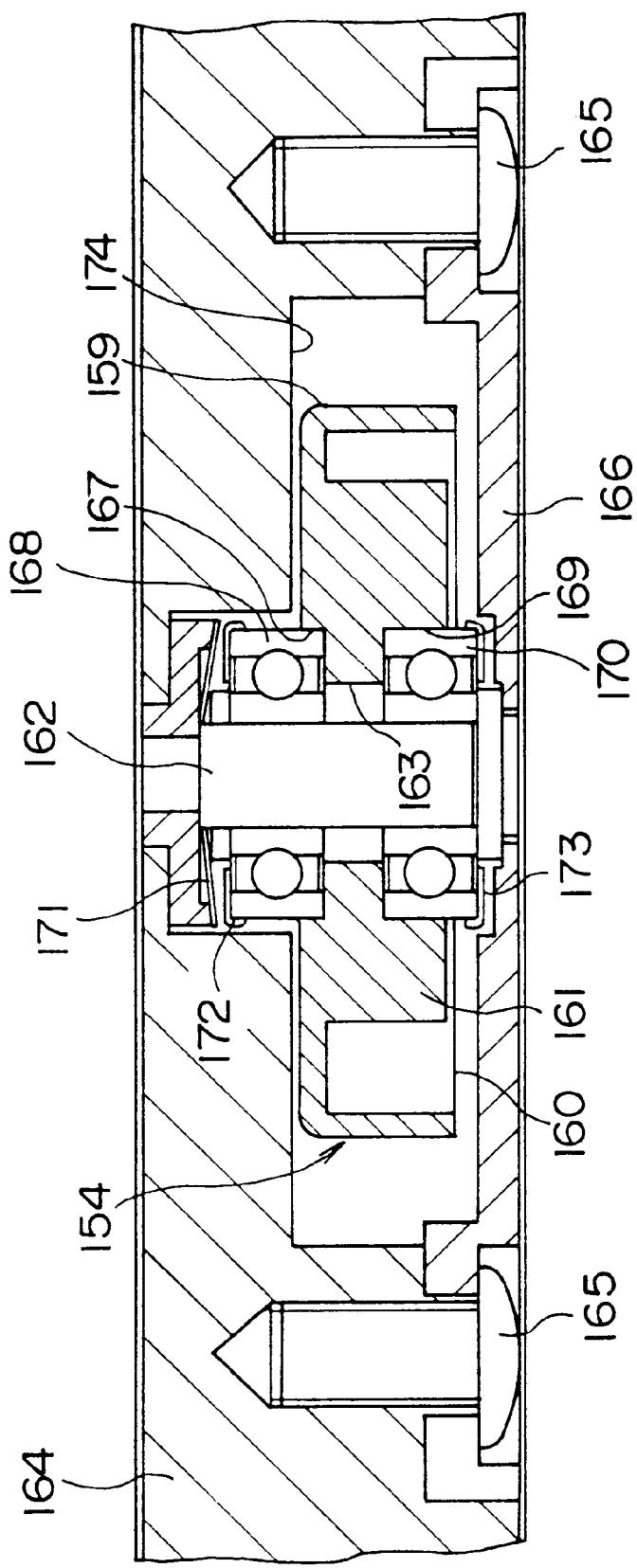
FIG. 22 is an enlarged cross sectional view taken along the line XXII—XXII of FIG. 18 showing the swing motion support mechanism.
Figure 27:
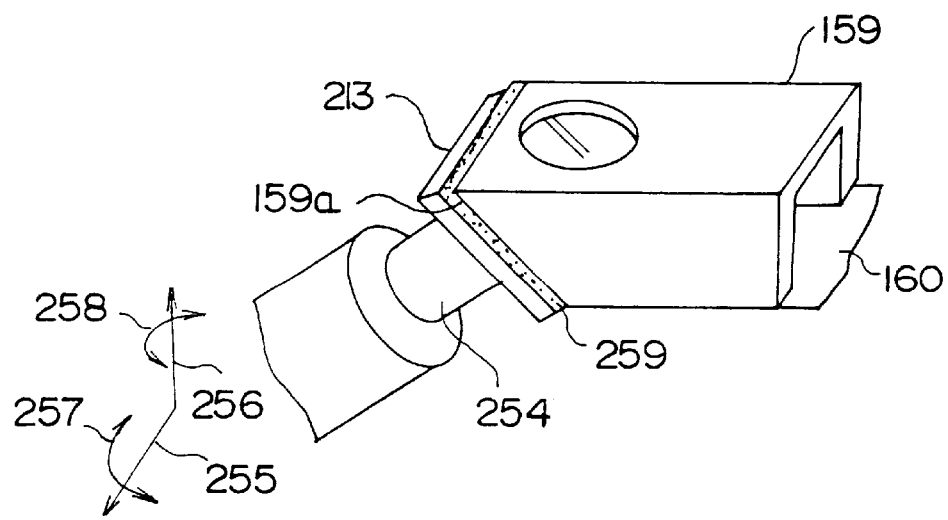
FIG. 27 is an enlarged view of the mirror mounting position in FIG. 26.

As shown in FIGS. 22 and 27, the main body portion 156 and the arm portion 157 are made of a hollow hermetically sealed structure consisting of a frame 159 having the shape of an inverse letter U and comprising a top plate portion and lateral portions, and a seat 160 that covers the underside of the frame.

Figure 21:
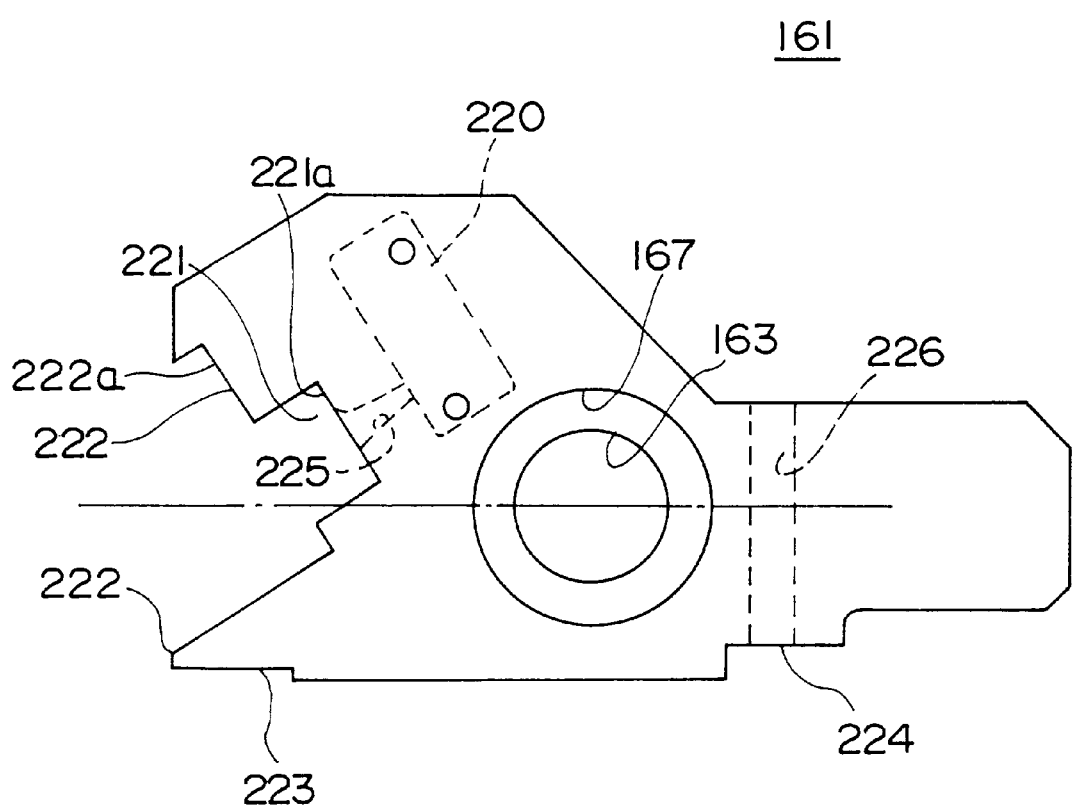
FIG. 21 specifically illustrates the block portion of FIG. 19.

The main body portion 156 contains a block portion 161 shown in FIG. 21 and a frame 159, which are integrated with each other.

For the sake of convenience, a description will now be given of the swing motion support mechanism 153 with reference to FIG. 22.

162 indicates a swing motion center stationary axle disposed at a certain horizontal distance from the mounted optical disk 17.

This stationary axle 162 passes through a through hole 163 of a main body portion 156 (the block portion 161) with its upper end being fixed onto a chassis 164 and its lower end being fixed by a support member 166 screwed onto a bottom of the chassis 164 by means of a screw 165, with the result that the axle is fixed onto both the topside and the underside of the main body 156.

The main body portion 156 is supported by a ball bearing 168 engaged in a hole 167 provided in the topside of the portion 156, and a ball bearing 170 engaged in a hole 169 provided in the underside thereof, so that the main body portion 156 is made to swing around the stationary axle 162.

171 indicates a pressure spring elastically deformed into a shape of an umbrella and presses the ball bearings 168 and 170.

172 and 173 indicate oil seals.

174 indicates a depression formed on the bottom of the chassis 164. The main body portion 156 rests in this depression.

As described above, the main body portion 156 is supported to embrace the stationary axle 162 whose upper and lower ends are fixed onto the chassis 164, the supporting being effected by means of the ball bearings 168 and 170 which press both the topside and the underside of the main body portion 156.

Thus it is ensured that the rigidity of the head main body 152 with respect to the chassis 164 is great, that the head main body 152 is stable during a mechanical disturbance, and that the position of the head main body 152 can be adjusted by making it swing with precision.

Since the stationary axle 162 is configured to pierce the main body portion 156, optical parts are disposed in such a manner as to surround the stationary axle 162.

As shown in FIG. 17, the entire main body 156 is located at a distance from the region 34 created when the mounted optical disk 17 is projected on the bottom cover 11.

A description will be given next of the electromagnetic driving apparatus 154 with reference to FIGS. 17, 18, and 19.

The electromagnetic driving apparatus 154 is embodied by a voice-coil motor, and is disposed opposite to the arm portion 157 across the stationary axle 162.

This apparatus 154 comprises a driving coil 180 fixed onto the main body portion 156, and a permanent magnet 181 provided opposite thereto.

The head main body 152 is made to be small and light thanks to the frame 159 having a shape of an inverse letter U. Since a moment of inertia of the head main body is small and a rigidity thereof in comparison to the chassis 164 is great, tracking without the use of a tracking actuator is possible, meaning that use of the electromagnetic driving apparatus 154 only is sufficient for an effective tracking to be conducted.

The electromagnetic driving apparatus can be of a moving magnet type, as in the aforementioned embodiment.

A description will be given next of the head main body 152.

The optical system thereof will be described first.

Figure 23:
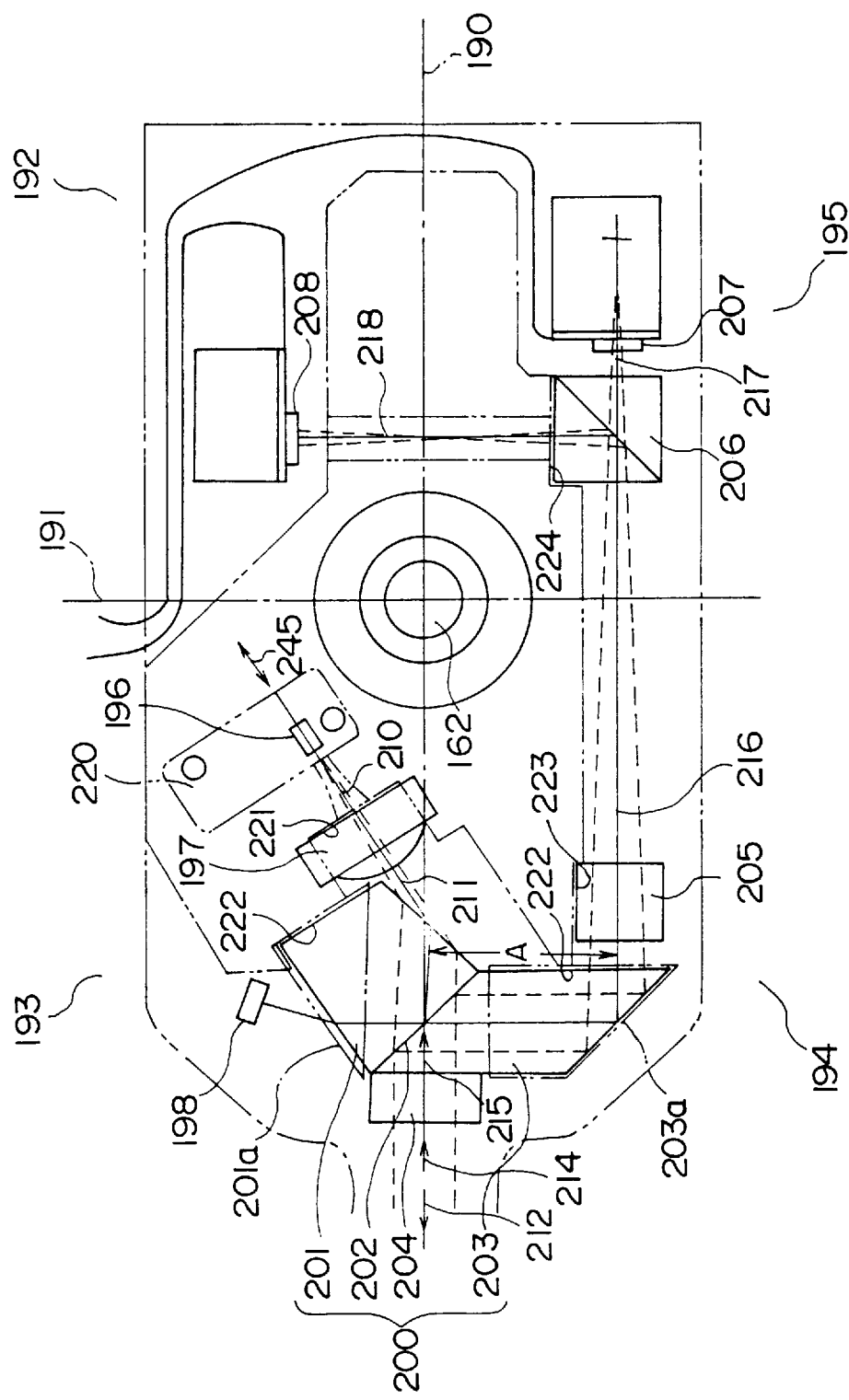
FIG. 23 illustrates the disposition of the optical parts in the main body portion.

In FIG. 23, a line 190 is a central line along the longitudinal direction of the head main body 152, which central line passes through the center of the stationary axle 1621 a line 191 passes through the center of the stationary axle 162 and crosses at right angles to the line 190.

192 indicates a first quadrant; 193 indicates a second quadrant; 194 indicates a third quadrant; and 195 indicates a fourth quadrant.

196 indicates a semiconductor laser chip, 197 indicates a collimator lens, and 198 indicates a monitoring detector, which are all provided in the second quadrant 193.

200 indicates a complex optical element provided across the second region 193 and the third region 194.

This complex optical element 200 has a configuration in which a beam shaping prism 201, a deflecting beam-splitter 202, a return optical path deflecting prism 203, and a ¼ wavelength plate 204 are integrated.

205 indicates a plano-convex converging lens provided in the third region 194.

206 indicates a beam splitter (half mirror) and 207 indicates a first photodetector, which are both provided in the fourth region 195.

208 indicates a second photodetector provided in the first region 192.

An optical path 211, traced by a P-polarized laser light 210 emitted from the semiconductor laser chip 196 as the light is incident on the beam shaping prism 201 via the collimator lens 197, is formed in such a way that the path cuts across the second region 193 diagonally.

A laser light 212 outgoing from the ¼ wavelength plate 204 and traveling toward the end of the arm portion 157, is, as shown in FIG. 20, reflected by a perpendicularly reflecting mirror 213, caused to converge by the objective lens 50, and converged on the optical disk 17.

The laser light reflected by the optical disk 17 is allowed to pass through the objective lens 50, is reflected by the mirror 213, and travels backward in the arm portion 157, A laser light 214, after returning to the complex optical element 200, is allowed to pass through the ¼ wavelength plate 204 so as to become a S-polarized laser light 215. The light is then reflected by the deflecting beam-splitter 202, is reflected again by the prism 203, outgoes from the element 200, and travels toward the beam splitter 206 while being caused to converge by passing through the lens 205.

An optical path 216, traced by the laser light 215 as the light is reflected by the deflecting beam-splitter 202 and travels toward the beam splitter 206, is formed in the third region 193.

An optical path 217, traced by the laser light 215 as the light passes through the beam splitter 206 and reaches the first photodetector 207, is formed in the fourth region 195.

An optical path 218, traced by the laser light as the light is reflected by the beam splitter 206 and travels toward the second photodetector 208, is formed across the fourth region 195 and the first region 192.

This way the optical paths 211, 216, 217, and 218 are formed so as to surround the stationary axle 162 and not to cut across the stationary axle 162.

Accordingly, although the structure of this embodiment allows the stationary axle to pierce the main body portion 156, the optical paths are formed in a normal manner.

Since the semiconductor laser chip 196, the collimator lens 197, the complex optical element 200, the converging lens 205, the beam splitter 206, the first photodetector 207, and the second photodetector 208 are disposed around the swing motion center stationary axle 162 with due consideration to the weight balance thereof, a good balance of primary moments around the axle is achieved.

Consequently, there is no need for the addition of a weight balancer. The optical head apparatus 151 becomes less heavy due to the lack of balancers.

The above-mentioned optical parts are disposed close together around the stationary axle 162, so that a moment of inertia, around the stationary axle 162, of the head main body 152 is small, and an access by the optical head apparatus 151 is performed at a high speed.

A complementary spot size detection method is adopted for focus error signal detection; a push-pull method is adopted for tracking error signal detection; a reflecting light quantity variation method is adopted for RF signal detection.

A portion 203a, indicated by an alternate long and two short dashe line, of the above-mentioned prism 203 is provided such that the optical path 216 is formed at a distance A from the line 190 so as to avoid the stationary axle 162.

A portion 201a, indicated by an alternate long and two short dashe line, of the prism 201 is provided for mounting purposes.

A description will be given next of a mounting structure of the above-mentioned optical parts.

The block 161 shown in FIG. 21 is provided, on its bottom, with a semiconductor laser chip mounting portion 220 in the form of a depression. At the periphery of the block, a collimator lens mounting portion 221, a complex optical element mounting portion 222, a converging lens mounting portion 223, and a beam splitter mounting portion 224 are provided in approximately depression forms.

As shown in FIG. 23, the semiconductor laser chip 196 is mounted on the mounting portion 220 in accordance with a structure shown in the Japanese Patent Application No.4-276305 "A Semiconductor Laser Apparatus" proposed by the present applicant.

The collimator lens 197 is mounted at its position on the block by being engaged to the mounting portion 221.

The converging lens 205 is mounted at its position on the block by being engaged to the mounting portion 223.

The beam splitter 206 is mounted at its position on the block by being engaged to the mounting portion 224.

Thus it can be seen that relatively easy mounting operations can mount each of the above-mentioned parts 196, 197, 200, 205, and 206 in its respective position with precision.

A face 221a of the mounting portion 221 and a face 222a of the mounting portion 222 are formed parallel to each other. It is comparatively easy to form the face 222a parallel to the face 221a with precision. Neighboring faces 201b and 201c, of the prism 201 constituting the complex optical element 200, are disposed so as to form an angle α (see FIG. 29). It is also comparatively easy to form this angle α with precision.

The collimator lens 197 is positioned by the face 221a; the complex optical element 200 is positioned by the face 222a. The collimator lens 197 and the face 201c, on which face the laser outgoing from the collimator lens is incident, are positioned with precision.

As shown in FIG. 21, tunnels 225 and 226 are formed in the above-mentioned block portion 161.

The tunnel 225 is provided in order to lead the laser light 210. The other tunnel 226 is provided in order to form the optical path 218.

A description will be given next of configurations of the arm portion 157 and the parallel blade spring mechanism 158 mainly with reference to FIGS. 1 and 20.

An end 230 of the frame 159 is inclined at angle of 45 degrees. As mentioned later, the perpendicularly reflecting mirror 213 is adhesively attached to this end at a properly adjusted position.

231 indicates a hole through which a laser light 212a reflected perpendicularly by the mirror 213 passes.

Figure 24:
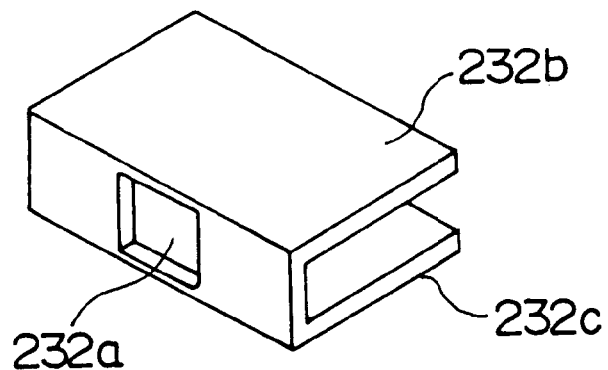
FIG. 24 illustrates the focus actuator holder of FIG. 20.

A focus actuator holder 232 shown in FIG. 24 and having a cross section of a flat-shaped cup is secured on the main body portion 156 in the following manner. The arm portion 157 is engaged with a hole 232a, and an upper extension 232b and a lower extension 232c sandwich the main body portion 156.

233 is a upper blade spring and 234 is a lower blade spring, both of which are of an approximately triangular shape. These springs are fixed, at their bases, to the upper extension 232b and the lower extension 232c of the holder 232, respectively, and extend along the topside and the underside of the arm portion 157, respectively, toward the end of the arm portion 157.

Figure 25:
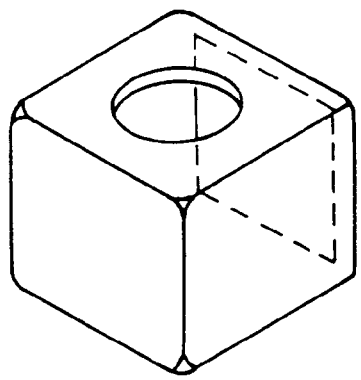
FIG. 25 illustrates the objective lens holder of FIG. 20.

An objective lens holder 235 shown in FIG. 25 is attached to the ends of the blade springs 233 and 234, respectively.

The ends of the blade springs 233 and 234 are firmly held by the objective lens holder 235.

The blade springs 233 and 234 and the objective lens holder 235 constitute the parallel blade spring 158.

The objective lens 50 is fixed to this holder 235.

A focusing actuator 236 is provided on the end of the arm portion 157.

The focusing actuator 236 in this embodiment is approximately the same as the one in the aforementioned embodiment, and comprises a driving coil 237 fixed on the end of the holder 235 and a stationary magnetic circuit 238 fixed on the chassis 164.

The stationary magnetic circuit 238 has a structure in which two permanent magnets 240 and 241 are fixed on a yoke 239.

Since an interval B between the blade springs 233 and 234 is as wide as several millimeters, the objective lens 50 can be moved up and down, while the perpendicular optical axis is maintained, so that a focus control is performed in a stable manner.

There are a top gap 242 and a bottom gap 243 between the holder 235 and the arm portion 157. These gaps 242 and 243 can be as small as 0.3 mm, so the swing motion type optical head apparatus 151 does not become troublesomely thick.

The hermetically sealed structure of the above-mentioned head main body 152 can be maintained even after the hole 231 is bored by providing, in the gap 242, approximately the same soft resin film 108 as in the aforementioned embodiment shown in FIG. 9, and by attaching the film to the holder 235 and the arm portion 157. The film does not limit displacement for a focus control of the objective lens 50, while at the same it prevents invasion of dust.

Positional adjustment of optical parts in the head apparatus 151 is performed at two parts, i.e. at the semiconductor laser chip 196 and at the perpendicularly reflecting mirror 213.

The semiconductor laser chip 196 is configured such that it can be adjusted, by being finely controlled for movement in the optical axis direction shown by an arrow 245 in FIG. 23, for an optimum position at which a laser light is properly focused on the recording face of the optical disk 17.

Figure 26:
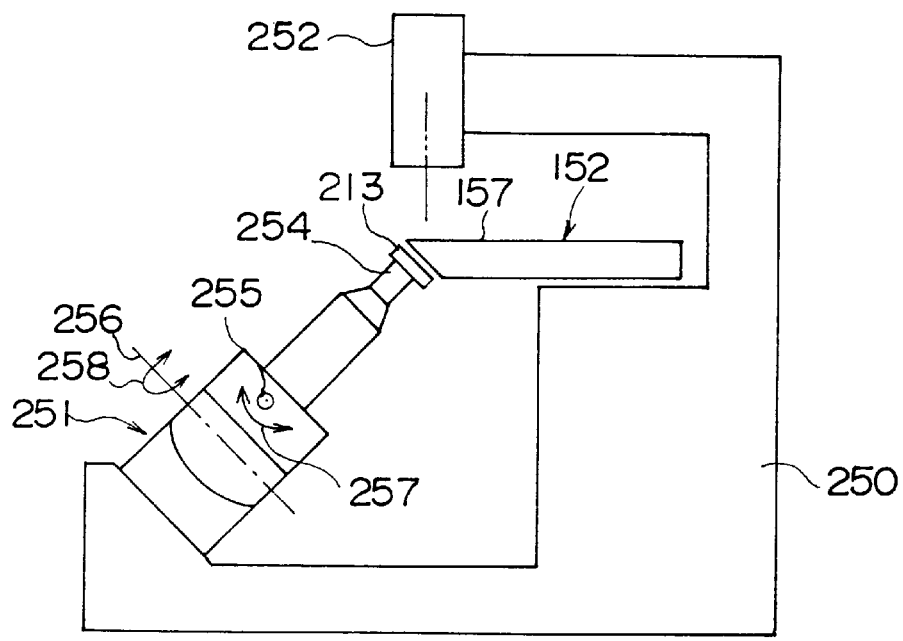
FIG. 26 describes how the mounting position of the perpendicularly reflecting mirror is adjusted.

Adjustment, for controlling an objective lens 50 incident angle drift to be within 0.1 degree, is performed by using an adjusting apparatus 253, shown in FIG. 26, consisting of a hand mechanism 251 fixed on a mount 250 shown in FIG. 26, and an autocollizator 252 integrated into the mount 250.

The hand mechanism 251 is configured such that a hand 254 can be rotated in two directions shown by arrows 257 and 258, the rotation being around axes 255 and 256 that are at right angles to each other.

Adjustment is carried out in the following manner. That is, the head main body 152 is placed on the mount 250; the perpendicularly reflecting mirror is supported by the hand 2541 and the autocollimator 252 is inspected; the mounting angle of the mirror 213, to which mirror is applied an adhesive 259 of a ultraviolet hardening type, is adjusted by moving the hand mechanism 251 as appropriate; and the hand mechanism 251 is caused to stop when an error as observed by means of the autocollimator 252 is found to be nil, after which a ultraviolet light is irradiated so as to harden the adhesive 259, with the result that the mirror 213 is adhesively attached to the end of the arm portion 157.

The above adjustment manner ensures that adjustment of the semiconductor laser chip 196 needs to be carried out only in one direction, and that adjustment is done with ease and precision.

Figure 28:
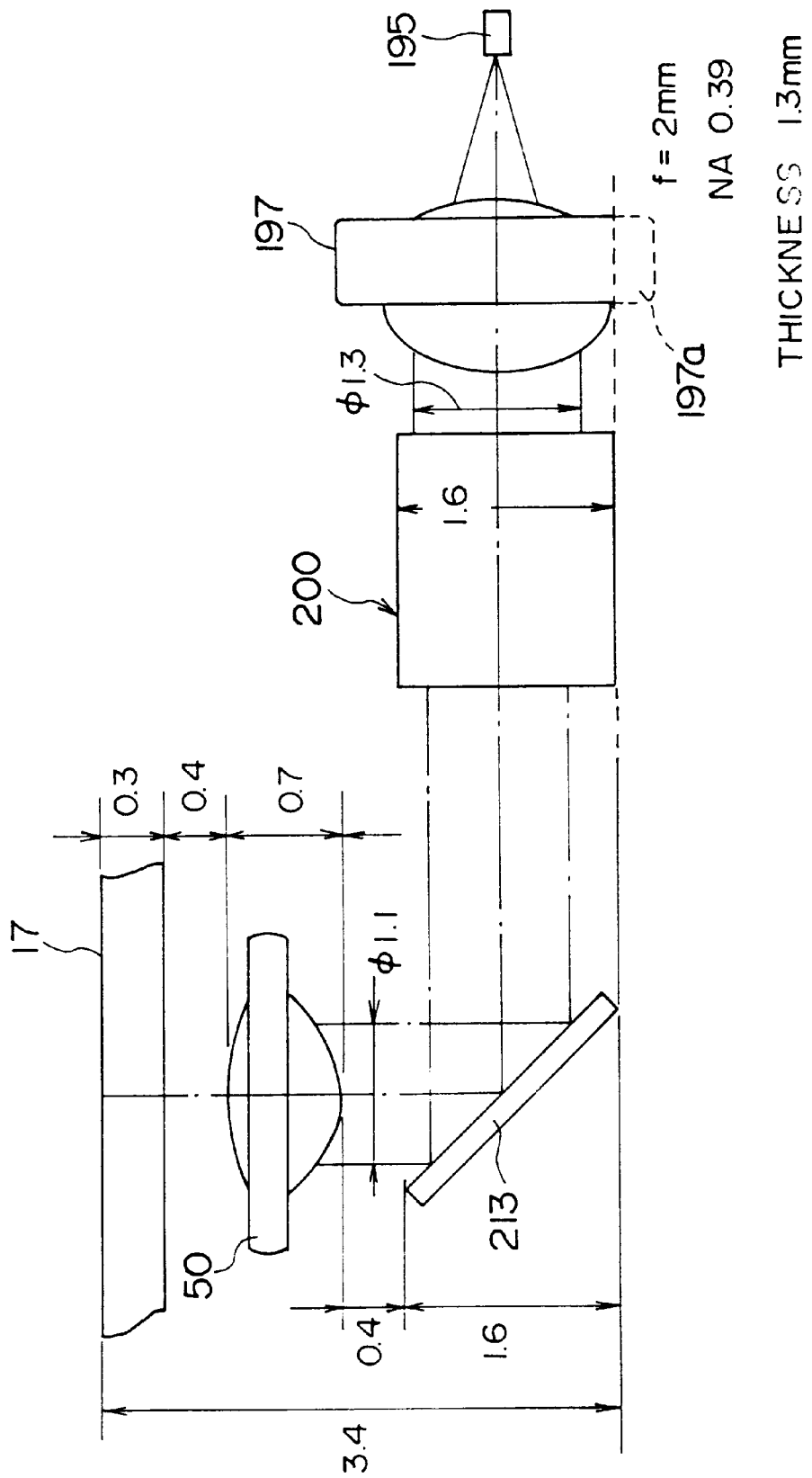
FIG. 28 is a side view of the optical parts disposed in the opt cal path from the semiconductor laser chip to the objective lens.
Figure 29:
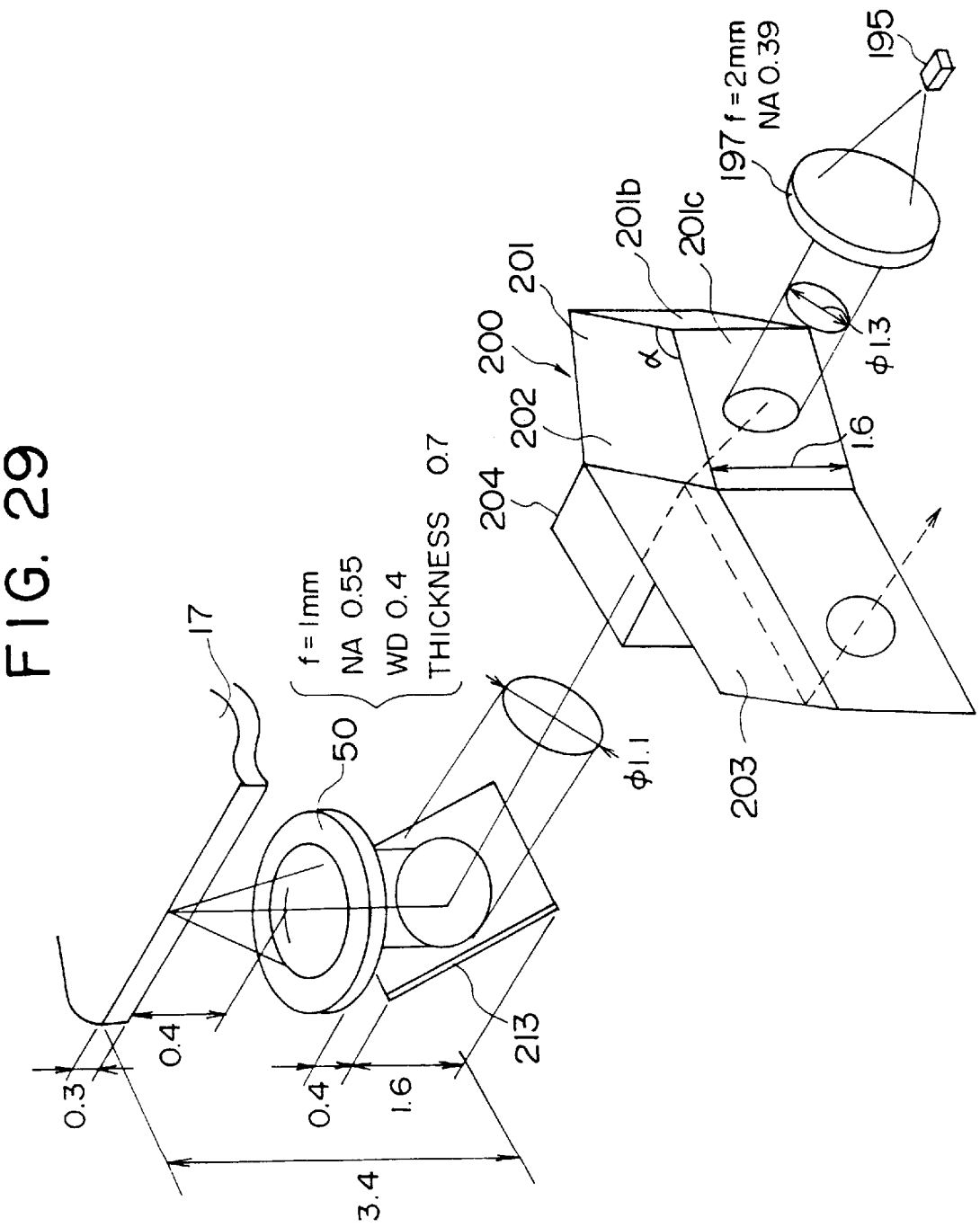
FIG. 29 is a perspective view of the optical parts of FIG. 28.
Figure 30:
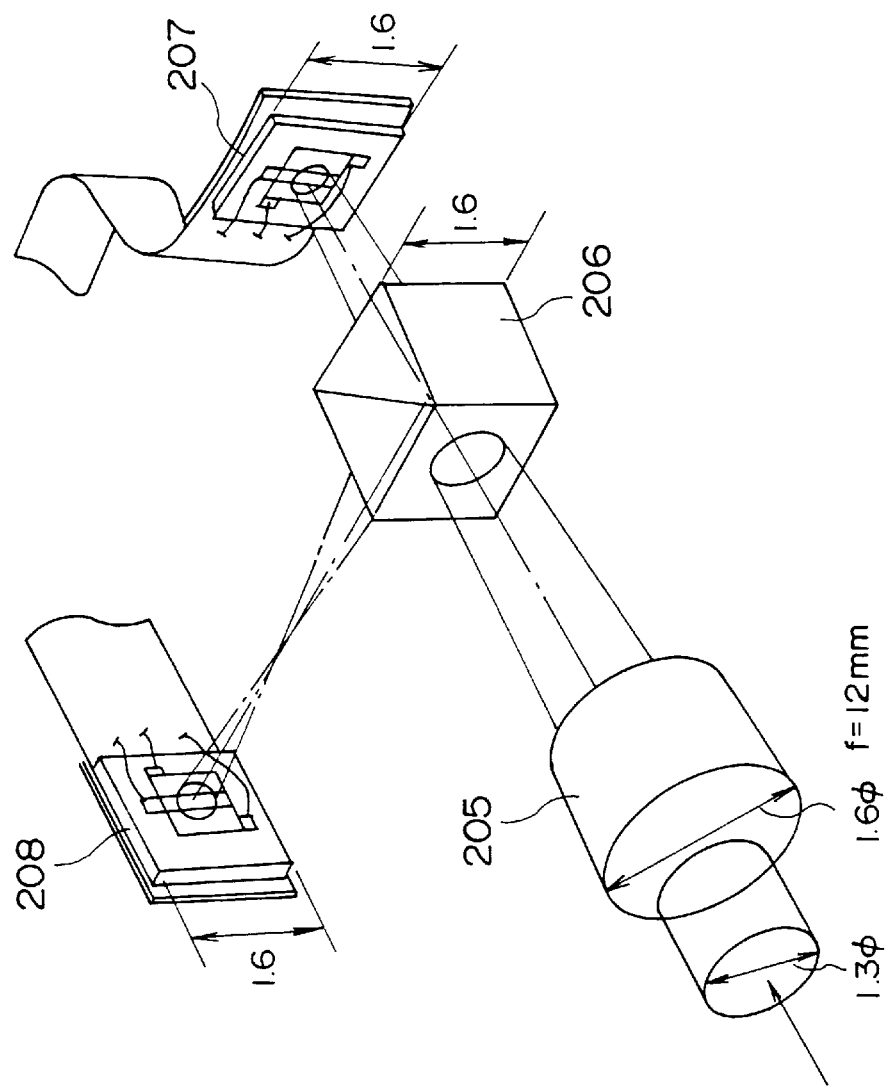
FIG. 30 is a perspective view of the optical parts in the optical path from the converging lens to the photodetector.

FIGS. 28, 29, 30 mainly illustrate heights, in mm, of optical parts built into the head main body 152, and heights, in mm, between these parts.

Referring to FIG. 28, a portion of the collimator lens 197, indicated by a reference numeral 197a, is a portion which is not used optically, and it is therefore removed so as to decrease the height of the apparatus 150.

As can be seen from FIG. 28, the height from the complex optical element 200 to the optical disk 17 is as small as 3.4 mm.

Figure 31:
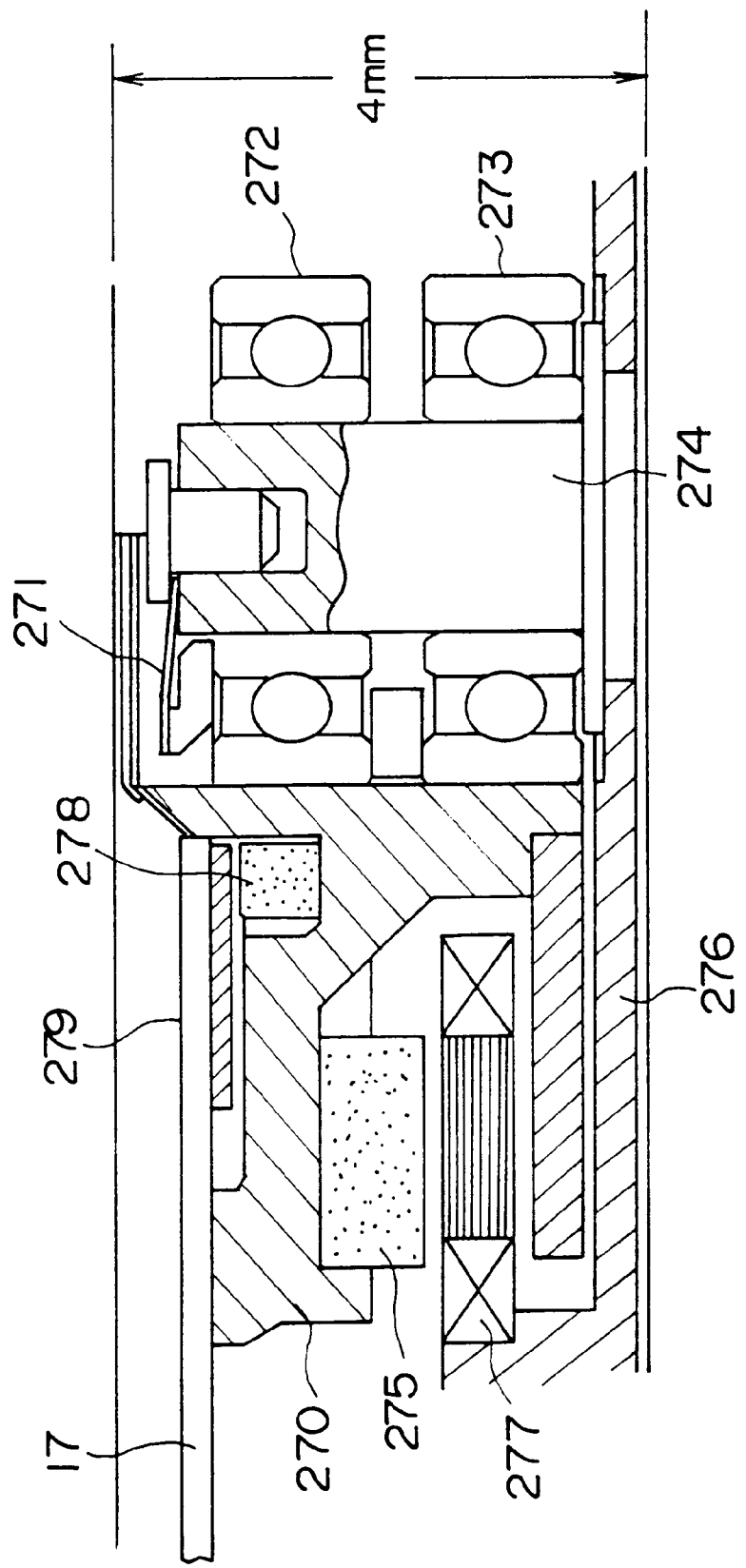
FIG. 31 is a cross sectional view of the spindle motor of FIG. 17.

A description will be given next of a structure of the spindle motor 14 with reference to FIG. 31.

A turntable 270 is supported by ball bearings 272 and 273 on an axis 274, the bearings being pressed by a spring 271.

275 indicates a rotor magnet, 276 a rotor yoke, 277 a stator coil.

This spindle motor 14 has a height of 4 mm.

A clamp magnet 278 is fixed to the center of the turntable 270.

A clamp magnetic plate 279 of the optical disk 17 is attracted by the magnet 278 so that the disk is mounted on the turntable 270.

Figure 32:
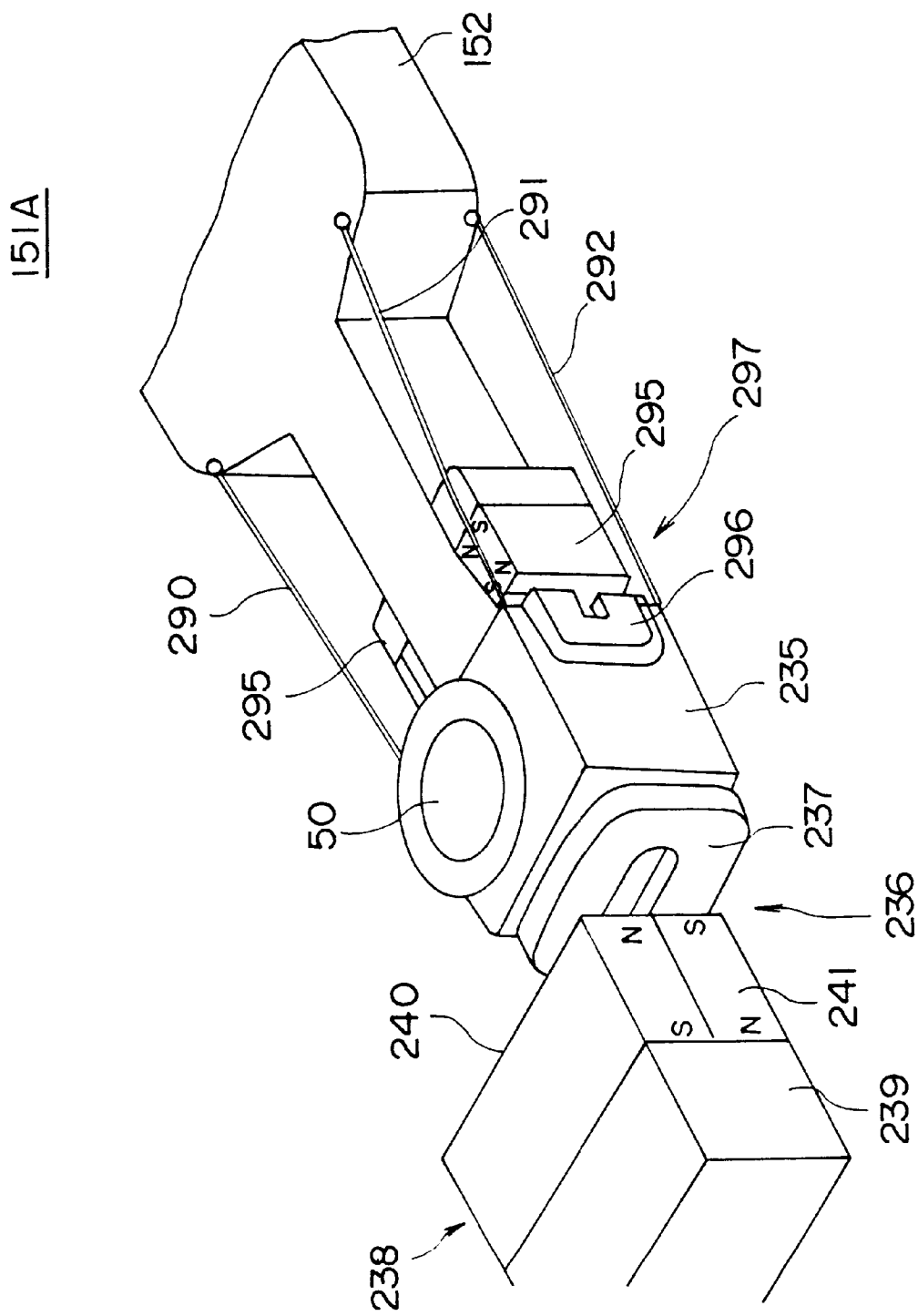
FIG. 32 illustrates a main portion of an variation of the swing-motion type optical head apparatus of FIG. 19.

FIG. 32 illustrates a swing-motion type optical head apparatus 151A, which is a variation of the swing-motion type optical head apparatus shown in FIG. 19.

In this apparatus, 4 wires, 290, 291, 292, and one other (not shown in the figure), which are disposed approximately parallel, support, in place of the parallel blade spring mechanism, the objective lens holder 235. The objective lens holder is movable right and left as well as up and down.

Track magnets 295 are fixed at the right and left of the arm portion 157.

The objective lens holder 235 is provided with a track coil 296 in such a way that the coil is opposite to the magnet 295.

The magnet 295 and the coil 296 constitute a racking actuator 297.

In this optical head apparatus 151A, the objective lens 50 is movable, independent of the head main body 152, right and left as well as up and down so as to effect a focus control and a tracking control.

[Third embodiment]

The third embodiment, as well as the fourth through sixth embodiments described later, each have a configuration compatible with the PCMCIA (JEIDA) IC memory card type III or the PCMCIA (JEIDA) IC memory card type II specified in the PCMCIA (PERSONAL COMPUTER MEMORY CARD INTERNATIONAL ASSOCIATION) or JEIDA (JAPAN ELECTRONIC INDUSTRY DEVELOPMENT ASSOCIATION) specifications. The PCMCIA specifications are available from PERSONAL COMPUTER MEMORY CARD INTERNATIONAL ASSOCIATION 1030B East Duane Avenue Sunnyvale, Calif. 94086.

Hereinafter, the PCMCIA (JEIDA) IC memory card type III and the PCMCIA (JEIDA) IC memory card type II are abbreviated as the IC memory card type III and IC memory card type II, respectively.

Figure 33:
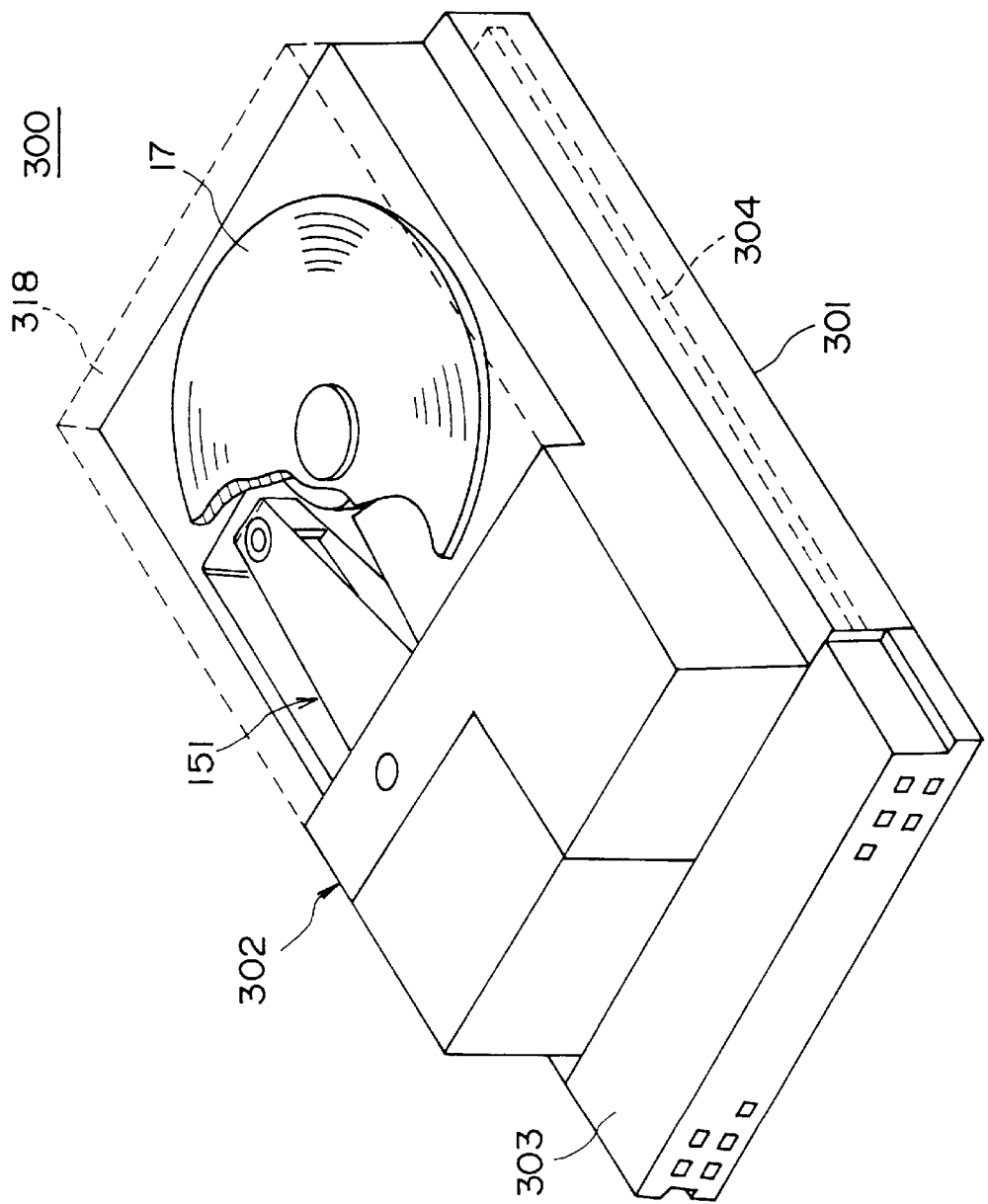
FIG. 33 is a perspective view illustrating, with the cover removed, a third embodiment of the optical disk apparatus of the present invention.
Figure 35:
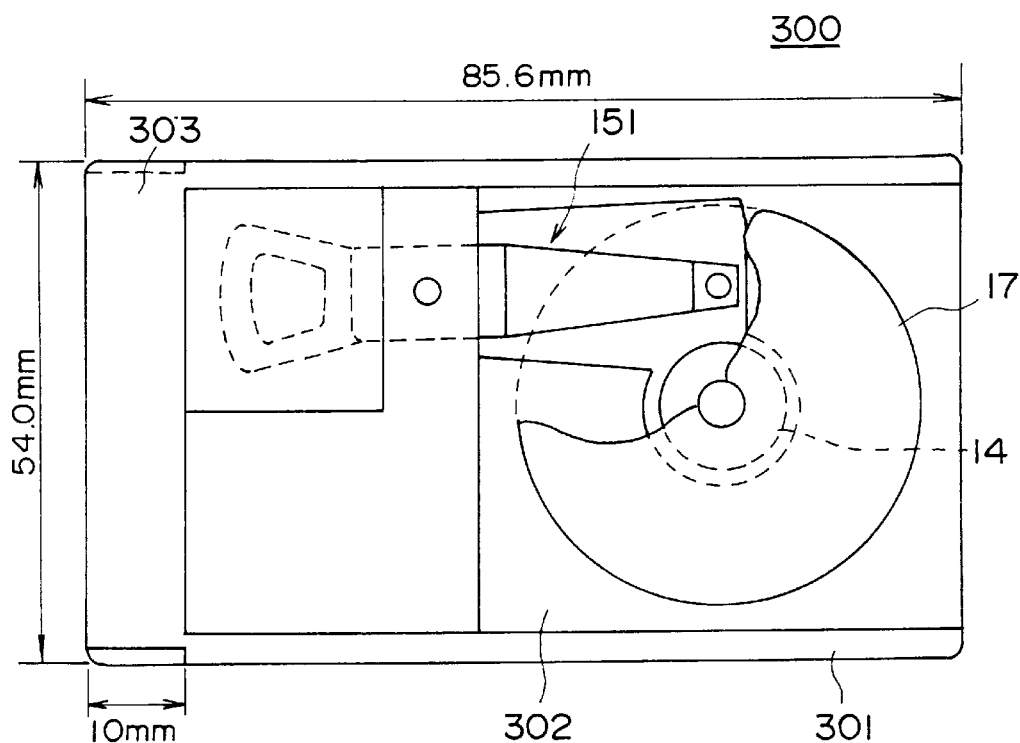
FIG. 35 is a top view of the optical disk apparatus of FIG. 33.
Figure 36:
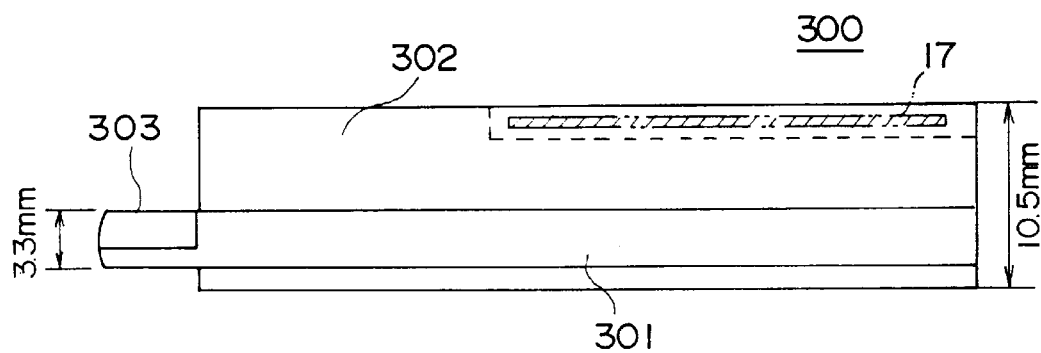
FIG. 36 is a side view of the optical disk apparatus of FIG. 33.

As shown in FIGS. 33, 35, and 36, an optical disk apparatus 300 according to the third embodiment has a housing 301 on its bottom, on which housing is assembled an optical disk apparatus mechanism portion 302. An exposed socket connector 303 is provided at a longitudinal end of the housing 301.

Although it is invisible and therefore not shown in FIG. 33, the bottom of the housing 301 protrudes beyond the underside of the socket connector 303, an shown in the side view of FIG. 36, the thickness of the protuberance being within 2.5 mm from the center line that lies in the center of the thickness of the socket connector 303.

The horizontal dimensions of the protuberance are the same as those of the optical disk apparatus mechanism portion 302 above the protuberance.

The optical disk apparatus mechanism portion 302 is of essentially the same structure as the optical disk apparatus 150 shown in FIG. 17. Corresponding parts are given the same reference numerals, and the descriptions thereof are omitted.

The housing 301 houses a printed board composite 304 shown in FIG. 37.

The printed board composite 304 is configured such that a large number of resin-molded electronic parts 306 of a surface mount type are mounted on the topside and the underside of the printed board 305. A plurality of electronic parts 306 constitute the circuit of FIG. 34.

Figure 38A:
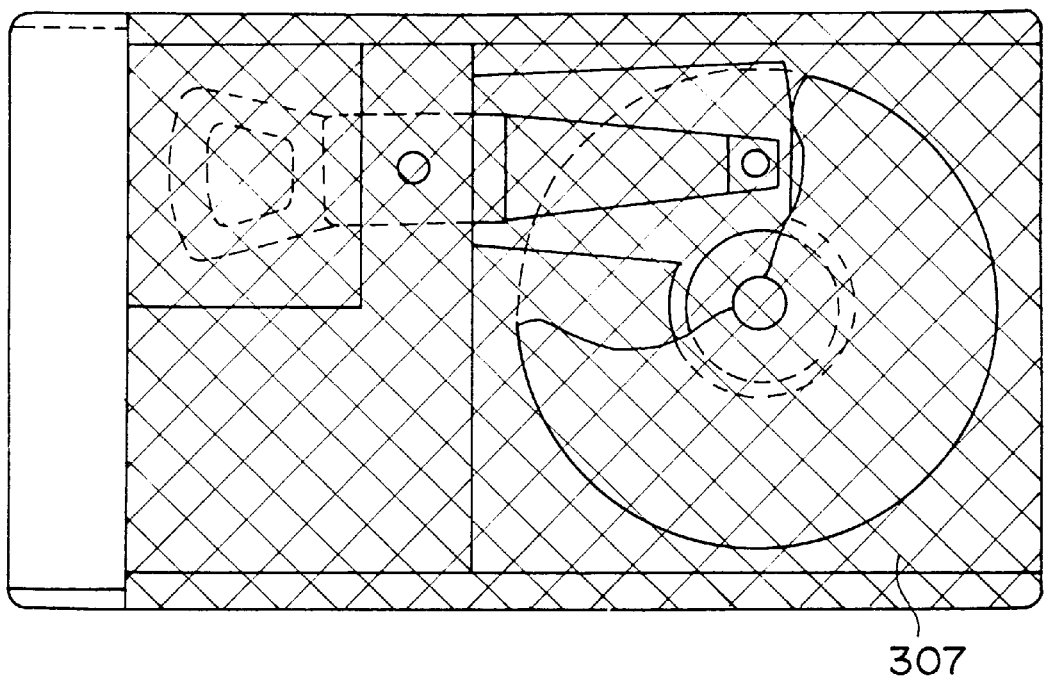
FIGS. 38(A) and 38(B) illustrate the area in the optical disk apparatus of FIG. 33 occupied by the printed board composite.
Figure 38B:
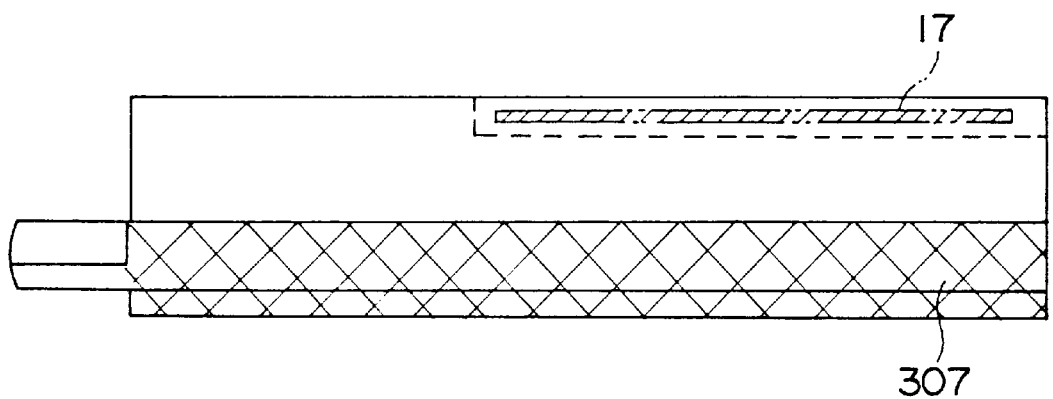

This printed board composite 304 occupies an area 307 in FIGS. 38(A) and 38(B) indicated by cross hatching.

Figure 34:
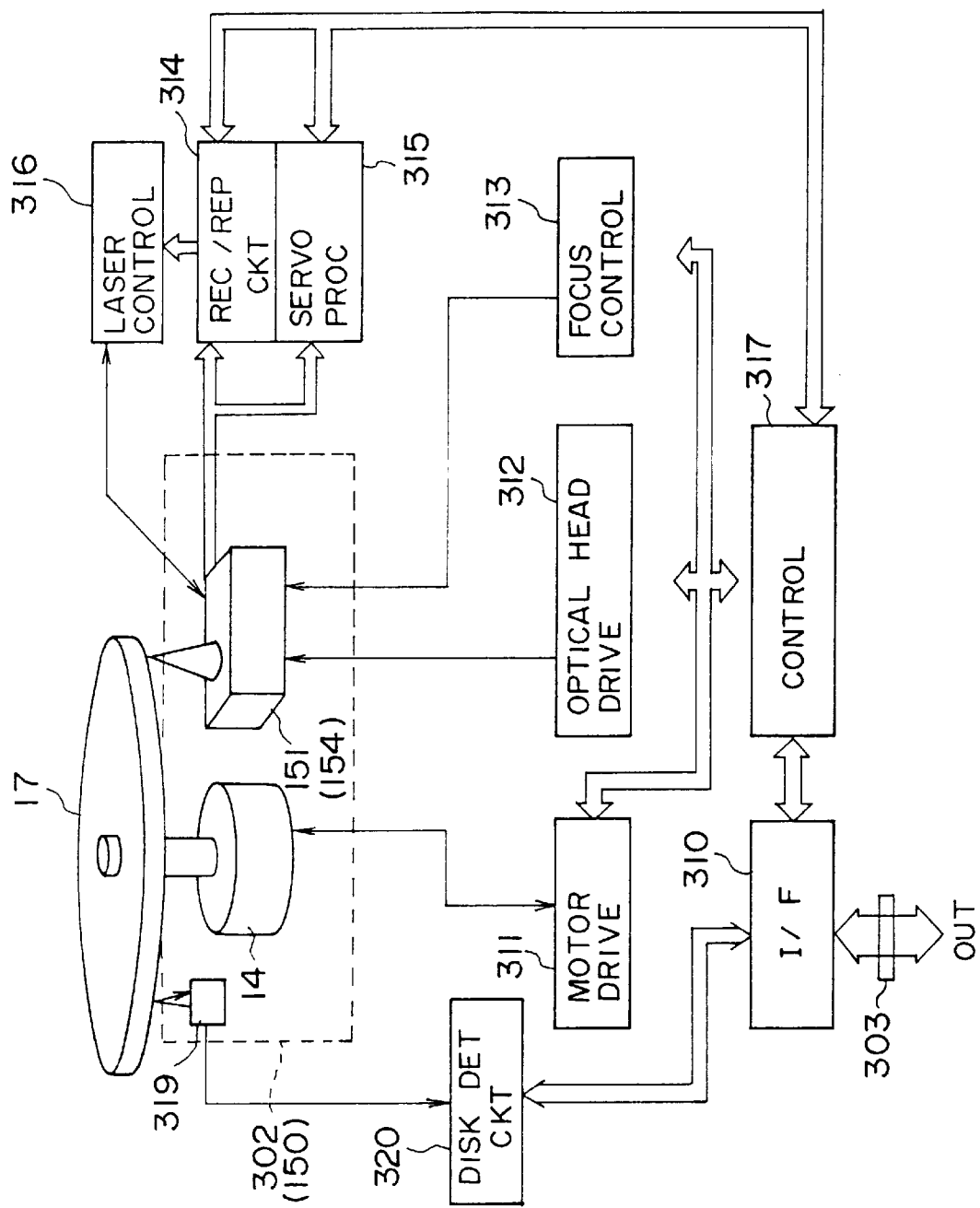
FIG. 34 is a block diagram of the circuits in the optical disk apparatus of FIG. 33.

Referring to FIG. 37, an electronic part indicated by a numeral 306a and disposed near the socket connector 303 constitutes an interface circuit 310 in FIG. 34.

The printed board composite 304 is positioned below the optical disk apparatus mechanism portion 302, the composite and the portion being electrically connected via a terminal portion 308 shown in FIG. 37.

The socket connector 303 is secured on the end of the printed board 305 in such a manner that the connector is electrically connected to the electronic part 306a.

A description will be given here of the circuit with reference to FIG. 34.

The interface circuit 310 transmits a record reproducing signal, a control signal, an address signal, power, and a status signal.

A spindle motor driving circuit 311 outputs driving power, and controls, upon receipt of a position signal, a driving of the spindle motor 14 in a closed loop.

An optical head driving circuit 312 outputs the driving power to the optical head apparatus 151 (the electromagnetic driving apparatus 154 shown in FIG. 17).

A focus actuator driving circuit 313 outputs driving power to the optical head apparatus 151 (the focusing actuator 236 in FIG. 17).

In addition to the optical head apparatus 151, a record reproduction circuit 314, a servo signal processing circuit 315, and a laser issue control circuit 316 are provided.

An optical disk control circuit 317 sends a control signal to each of the above circuits 311 to 315, and effects an overall control.

A description will be given next of characteristics of the optical disk apparatus 300.

① As shown in FIGS. 35 and 36, the dimensions of the optical disk apparatus are such that the height is 85.6 mm, the width is 54.0 mm, and the thickness is 10.5 mm.

② The socket connector 303 is of a configuration that fulfills the specifications provided in the IC memory card guideline proposed by JEIDA.

This means that the socket connector 303 fulfills the socket connector specifications proposed by PCMCIA also.

As shown in FIGS. 35 and 36, the dimensions of the socket connector 303 are such that the length is 10 mm, the width is 54.0 mm, and the thickness is 3.3 mm.

③ As shown in FIG. 33, as the optical disk 17 can be detached by removing a cover 318, it therefore could happen that the optical disk 17 may be removed from the optical disk apparatus 300 without it being replaced by the optical disk 17 to be mounted next.

Accordingly, as shown in FIG. 34, an optical disk detector 319 is provided in the optical disk apparatus mechanism portion 302. This optical disk detector 319 is a reflection-type light sensor and detects whether the optical disk 17 is mounted or not.

Also, an optical disk mounting determination circuit 320 is provided for determining, on the basis of a signal from the optical disk detector 319, whether the optical disk 17 is mounted or not.

④ The interface circuit 310 of FIG. 34 is of a configuration in which the electrical/interface specifications, which are specified in the IC memory card guideline proposed by JEIDA, are fulfilled (meaning that the IC memory card electrical/interface specifications proposed by PCMCIA are also fulfilled), and in which is provided a function for transmitting, to information equipment, a status signal from the above-mentioned circuit 320.

By comprising the above characteristics ① through ④, the optical disk apparatus 300 becomes the same as an IC memory card type III in terms of its dimensions and electrical specifications, and may be handled in the same manner as an IC memory card type III. That is, the apparatus may be inserted into an IC memory card type III slot in an information equipment unit; information exchange between equipment is also possible.

Accordingly, the apparatus can be used for recording and reproducing information by inserting, after a preparatory step of mounting the optical disk 17 and attaching the cover 318, the apparatus into an IC memory card type III slot of an information equipment unit, just like in the case of an IC memory card type III itself.

Also, due to the configurations ③ and ④ above, when the optical disk apparatus 300 is inserted into an IC memory card type III slot of an information equipment unit and, by mistake, the optical disk 17 happens not to be mounted in the apparatus, the apparatus is capable of informing a user of the fact that the optical disk is not mounted, and of preventing a malfunction.

Since the optical disk apparatus 300 may be used in the same manner as the IC memory card type III and the optical disk 17 is detachable, the apparatus 300 has an advantage in that optical disks are substantially less expensive than IC memory cards.

Figure 39A:
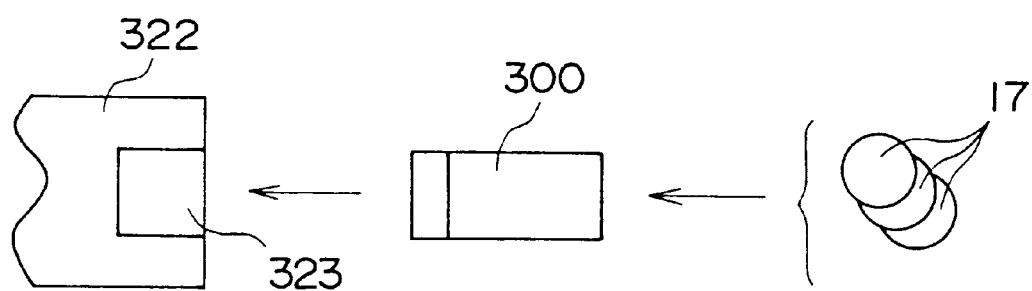
FIGS. 39(A) and 39(B) illustrate how cost-effective the optical disk apparatus is in comparison with the IC memory card.
Figure 39B:
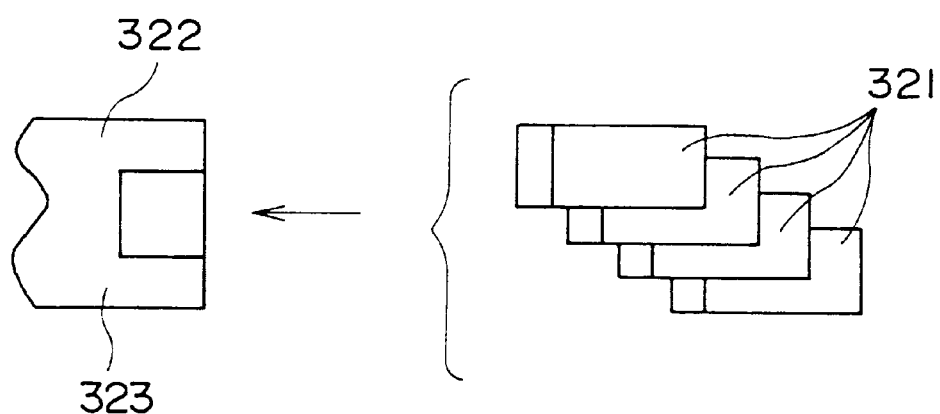

That is, in the case of an IC memory card type III, a sufficient number of IC memory cards III 321 are required to fulfill an information quantity need, as shown in FIG. 39(B). Since an IC memory card costs several tens of thousands of yen, a user must bear a heavy expense if he is to make a number of these cards available.

On the other hand, in the case of an optical disk apparatus 300, only one optical disk apparatus 300 needs to be available, the requirement being that a sufficient number of recording mediums in the form of optical disks 17 be available to fulfill an information quantity need.

The optical disk 17 costs several thousand yen, and has a storage capacity of about 100 MB, meaning a capacity several tens of times greater than that of an IC memory card. A smaller number of disks need to be available than in the case of IC memory cards. Accordingly, a user has to bear costs which are substantially less than in the case of IC memory cards.

In FIGS. 39(A) and 39(B), 322 indicates an information equipment unit, and 323 indicates an IC memory card type III slot.

[Fourth embodiment]

In the figures that illustrate the fourth and fifth embodiments, components that correspond to components shown in FIGS. 33 through 38 are given the same reference numerals, and the descriptions thereof are omitted.

Figure 41:
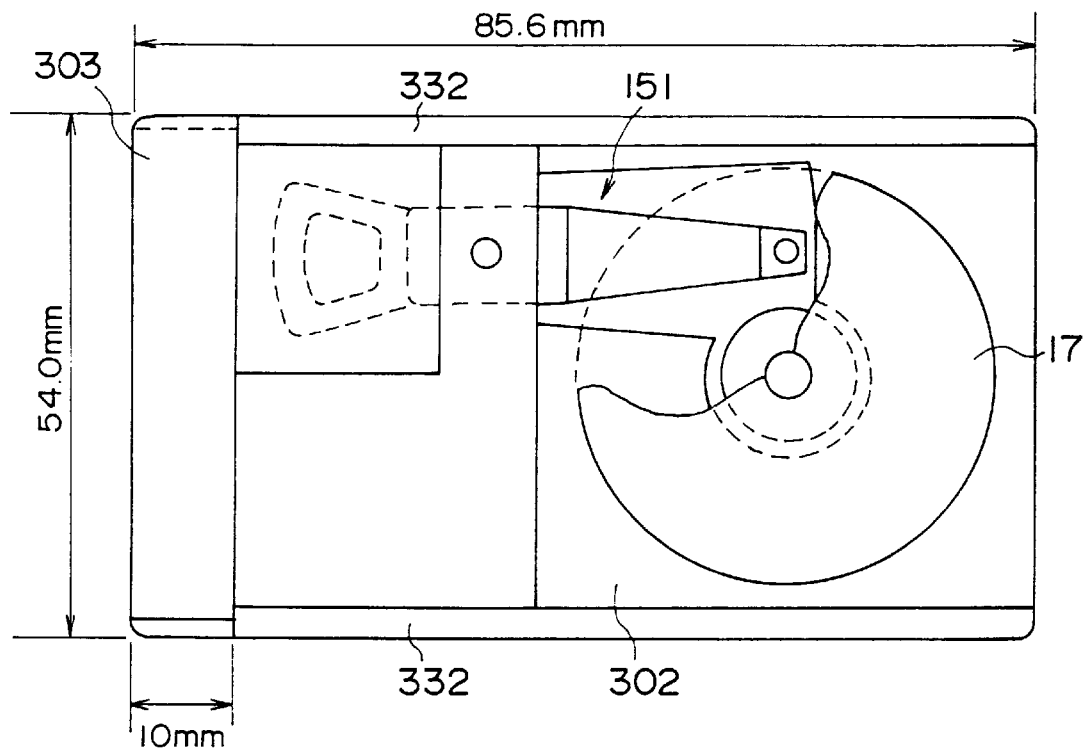
FIG. 41 is a top view of the optical disk apparatus of FIG. 40.
Figure 42:
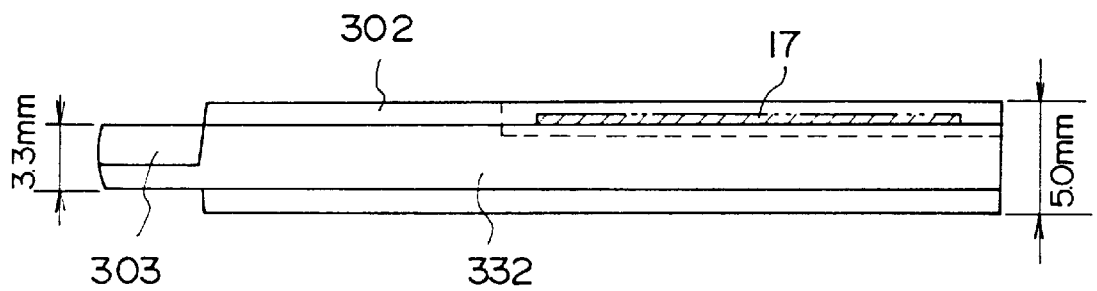
FIG. 42 is a side view of the optical disk apparatus of FIG. 40.
Figure 43:
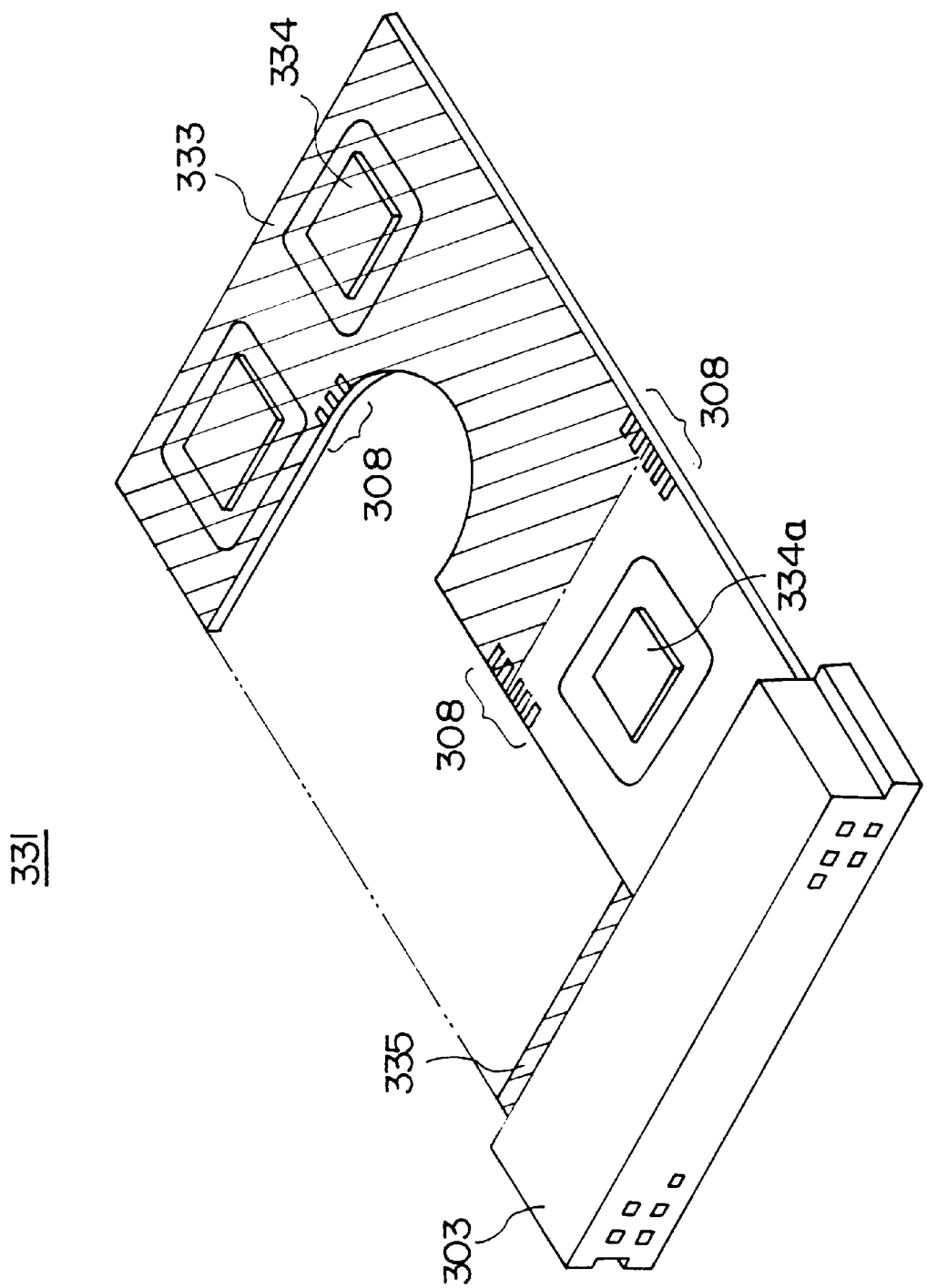
FIG. 43 is a perspective view of the printed board composite.

As shown in FIGS. 40, 41, and 42, an optical disk apparatus 330 is of such a configuration that a printed board composite 331 shown in FIG. 43 is provided so as not to add to the height of the optical disk apparatus mechanism portion 302; the above-mentioned mechanism 302 is provided with housings 332 that cover a part of the printed board composite 331 at the sides of the mechanism 302; the exposed socket connector 303 is provided at a longitudinal end of the printed board composite.

Although it is invisible and therefore not shown in FIG. 40, the bottom of the housings 332 protrudes beyond the underside of the socket connector 303, as shown in the side view of FIG. 42, the thickness of the protuberance measuring less than 2.5 mm from the center line that lies in the center of the thickness of the socket connector 303.

The dimensions of this protuberance are the same as the top portion of the housings 332, the protuberance and the top portion being symmetrical with each other with respect to the central plane that lies in the center of the thickness of the socket connector 303.

As shown in FIG. 43, the printed board composite 331 is of such a configuration that bare chips 334 are mounted on the topside and the underside of a printed board 333. Since the bare chips 334 are used, the printed board composite 331 is thinner than the printed board composite 304 shown in FIG. 33. Since the printed board composite 331 is thin and small, the composite does not add to the height of the mechanism portion 302 and fits in a space which the above-mentioned mechanism 302 does not fit in.

The bare chips constitute circuits shown in FIG. 34.

The interface circuit 310 is provided in the bare chip 334a.

335 indicates a cut-out of a roughly flat-based cup shape, the out-out being provided to provide space for the spindle motor 14 and the optical head apparatus 151.

Figure 44:
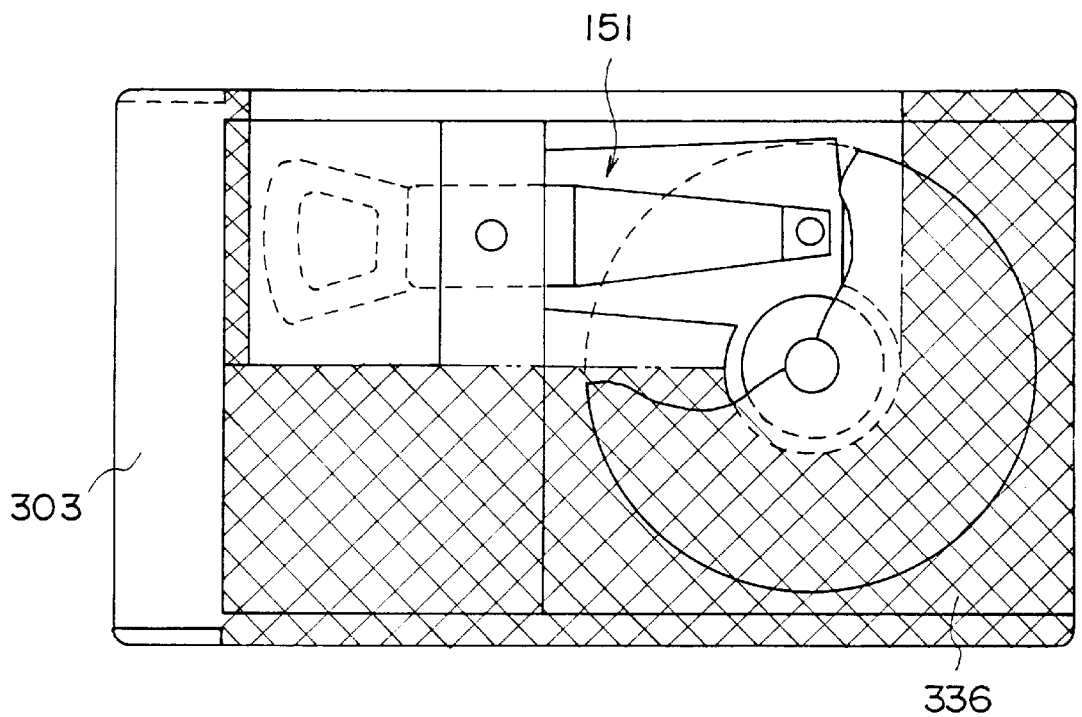
FIGS. 44(A) and 44(B) illustrate the area in the optical disk apparatus of FIG. 40 occupied by the printed board composite.
Figure 44:
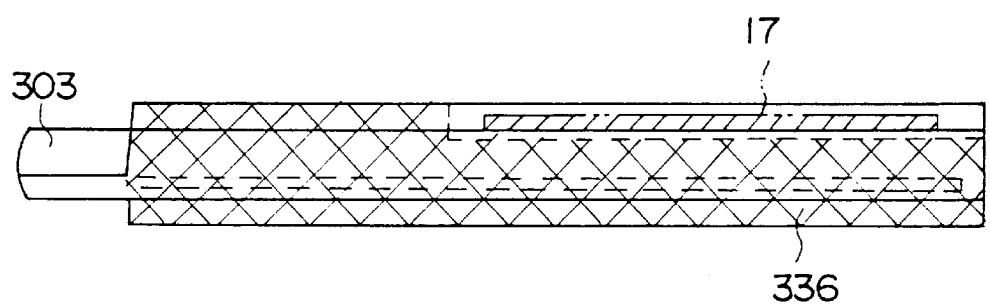

The above-mentioned printed board composite 331 occupies an area 336, in FIGS. 44(A) and 44(B), indicated by cross hatching.

An shown in FIGS. 41 and 42, the dimensions of the optical disk apparatus 330 are such that the length is 85.6 mm, the width is 54.0 mm, and the thickness is 5.0 mm. The socket connector 303 lies in the center of the thickness of the apparatus, the dimension of the connector being such that the length is 10 mm, the width is 54.0 mm, and the thickness is 3.3 mm.

Accordingly, the optical disk apparatus 330 is the same as an IC memory card type II in terms of its dimensions and electrical specifications, and may be handled in the same manner as is an IC memory card type II. That is, information transmission/reception between the optical disk apparatus 330 and a information equipment unit is made possible by inserting the apparatus into an IC memory card type II slot in an information equipment unit for the recording and reproducing of information.

As in the third embodiment, since the optical disk 17 are exchangeable, they are more cost effective than IC memory cards type II.

[Fifth embodiment]

Figure 45:
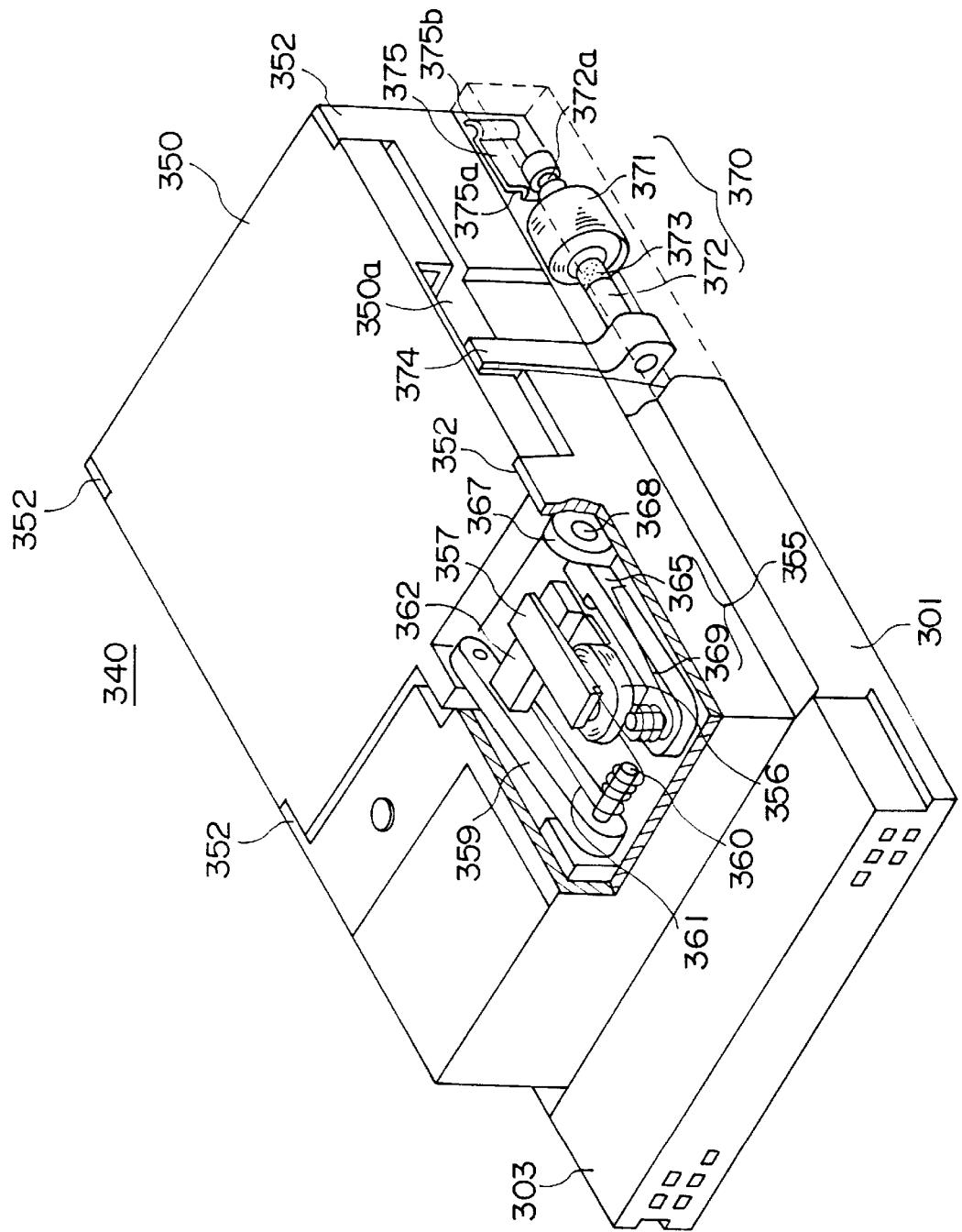
FIG. 45 is a partially removed perspective view of a fifth embodiment of the optical disk apparatus of the present invention.

An optical disk apparatus 340 shown in FIG. 45 is of a configuration in which a cartridge loading mechanism is added to the optical disk apparatus 300 shown in FIG. 33.

For the sake or convenience, a description will be given of an optical disk cartridge applicable to the above-mentioned optical disk apparatus 340, with reference to FIG. 46.

The optical disk cartridge 341 comprises a first cartridge half 342, which half is integrated with a frame portion 343, and a second cartridge half 344 engaged with this frame portion 343 so as to be slidable in $X_1$ and $X_2$ directions.

The optical disk 17 fits within an opening 345, of the frame portion 343, having a diameter of 46 mm, so that, in the radial direction, about ⅓ of the disk is housed in the first half 342 and the remaining portion is housed in the second half 344.

Figure 54A:
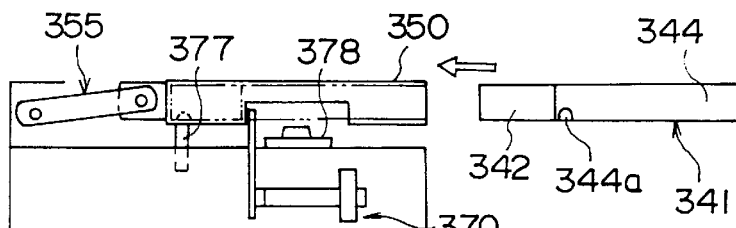
FIGS. 54(A), 54(B), 54(C), 54(D), 54(E), and 54(F) illustrate the mounting and detaching operation of the optical disk cartridge.

The cartridge is "closed" when this half 344 is in contact with the first half 342 (see FIG. 54(A)). The dimensions of the cartridge 341 then are such that the length is 50 mm, the width is 48 mm, and the thickness is 1.6 mm.

Figure 46:
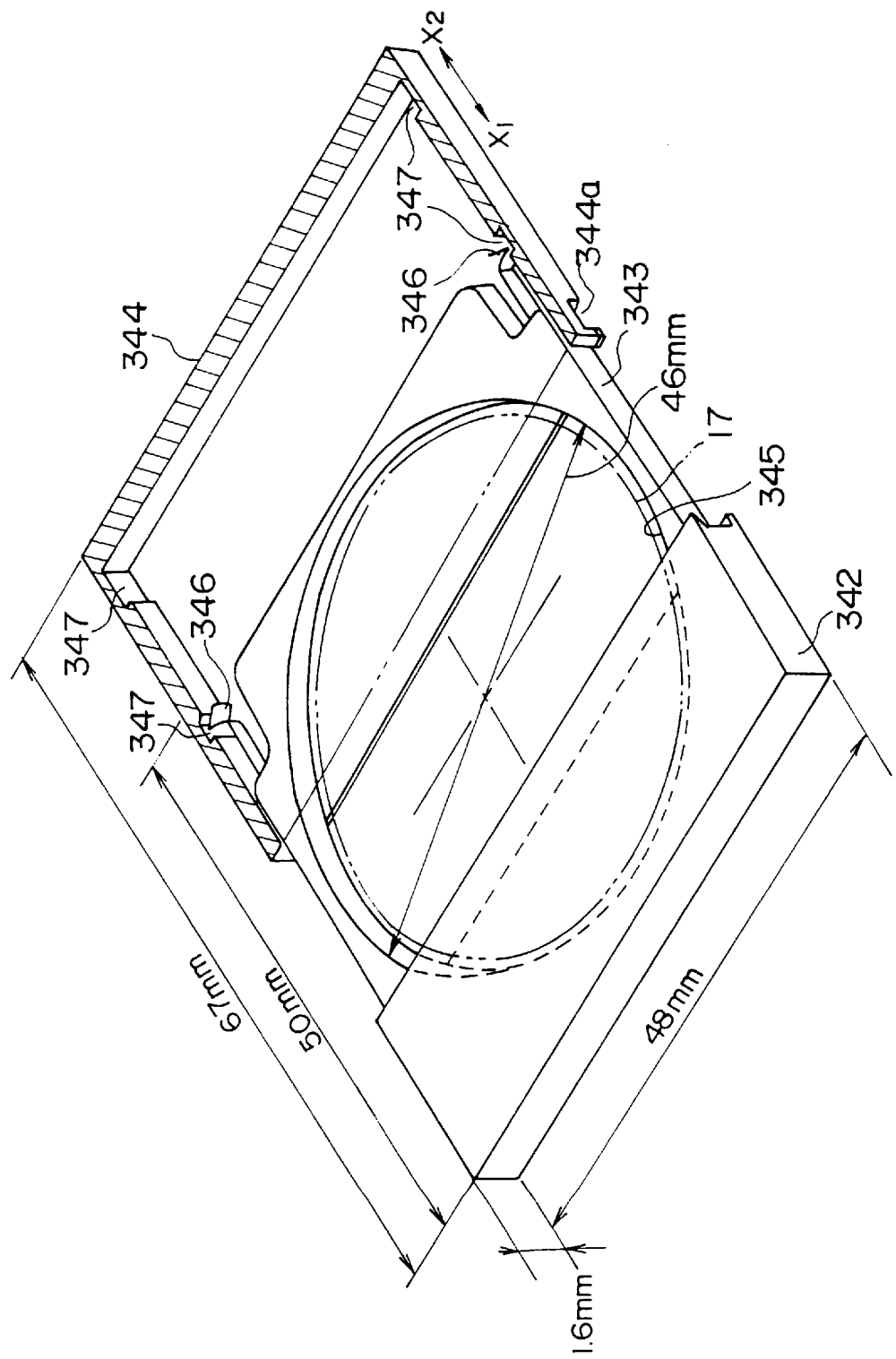
FIG. 46 is a partially removed perspective view illustrating the "open" state of the optical disk cartridge.

The cartridge is "open" when the second half 344 is separated from the first half 342 as shown in FIG. 46. The length then is 67 mm.

The second half 344 is locked temporarily in the "open" or "closed" positions by means of a hoot 346 and a depression 347.

The optical disk cartridge 341 is stored and handled in the "closed" position so that the optical disk 17 is protected from adhesion of dust and from external shock.

A description will be given next of a loading mechanism with reference to FIG. 45.

Figure 47:
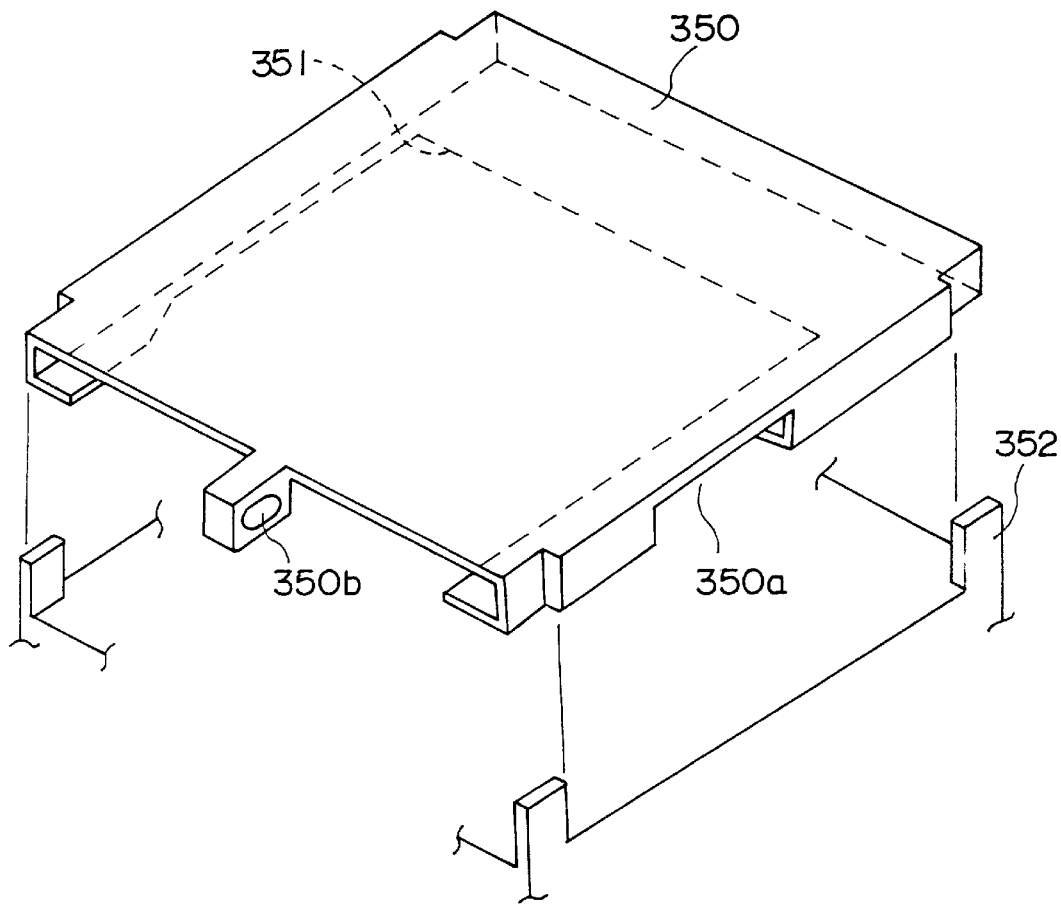
FIG. 47 illustrates the cartridge holder.

350 indicates a cartridge holder; an opening 351 is provided on the underside of the holder, as shown in FIG. 47. The holder is engaged with guide rails 352.

Figure 48:
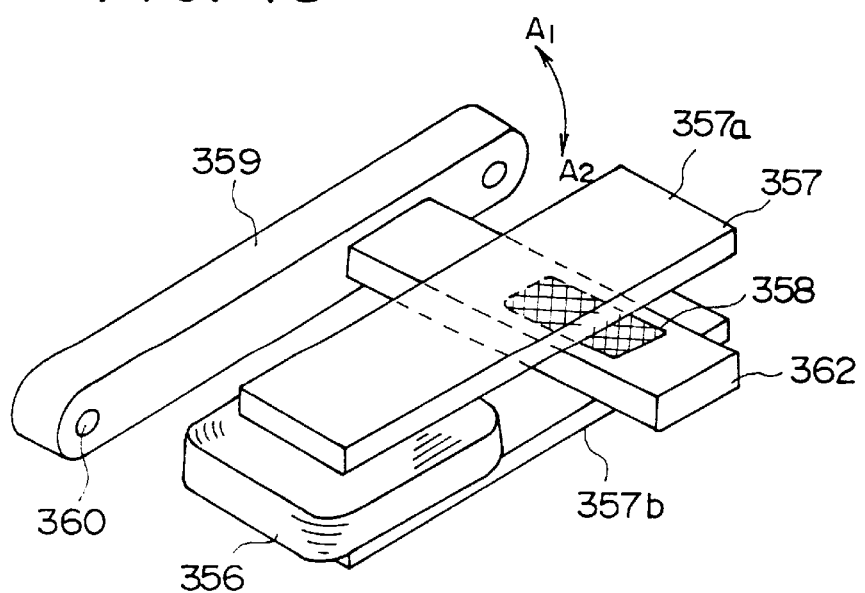
FIG. 48 illustrates the vertical motion mechanism.
Figure 49:
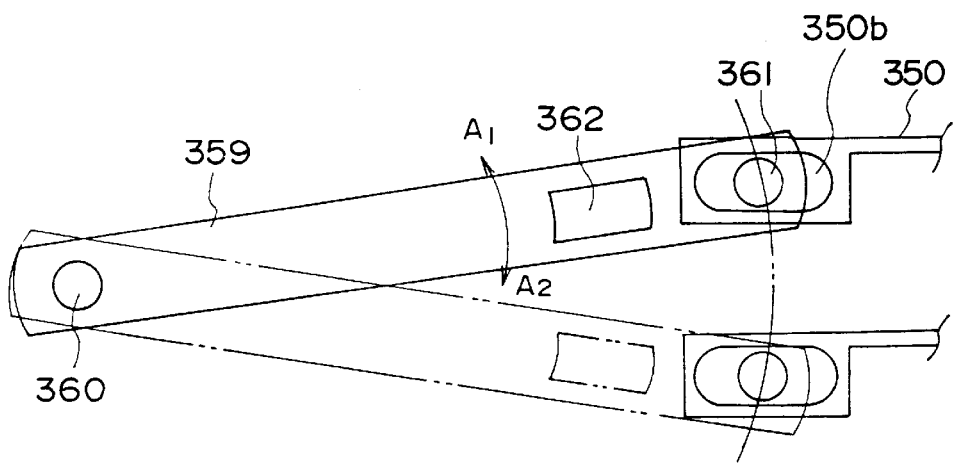
FIG. 49 illustrates the relationship between the arm and the cartridge holder.

As shown in FIGS. 48 and 49, a vertical motion mechanism 355 comprises a coil 356, a yoke 357 consisting of an upper yoke 357a and a lower yoke 357b, a permanent magnet 358, and an arm 359.

The arm 359 is supported by an axle 360 at a base portion thereof; a pin 361 on the end of the arm is engaged with a long hole 350b of the holder 350.

Figure 51A:
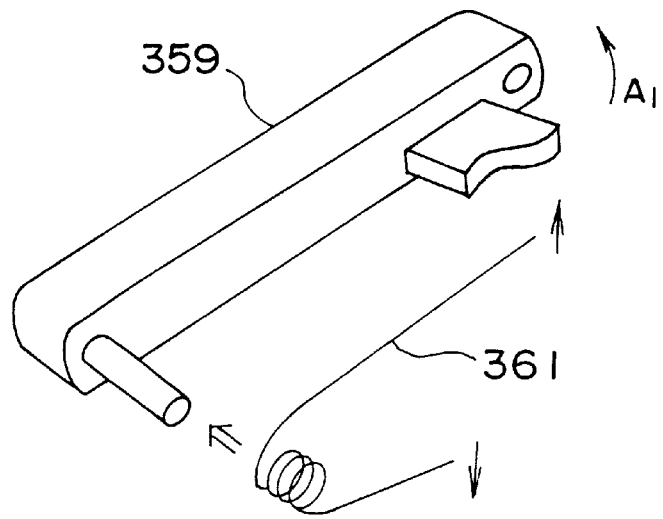
FIGS. 51(A) and 51(B) illustrate the return spring.

The arm 359 is rotatable, in an $A_1$ direction shown by an arrow, by means of a return spring 361 shown in FIG. 51(A); the cartridge holder 350 is positioned high enough to allow the cartridge to be inserted.

An arm portion 362 extends sideways from near the end of the arm 359, and passes between the upper and lower yokes 357a and 357b.

Figure 50:
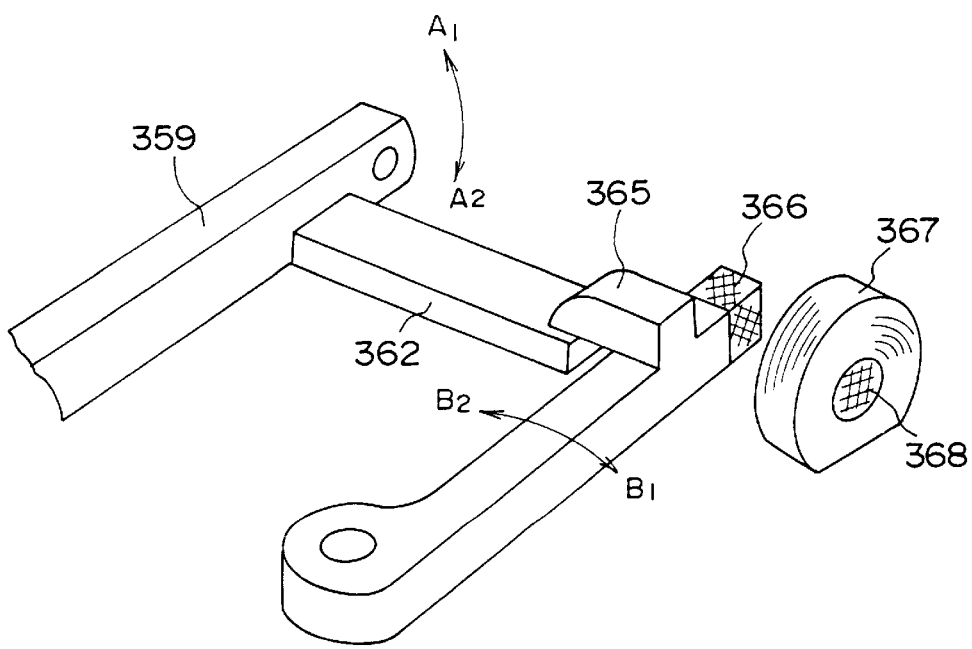
FIG. 50 illustrates the lock mechanism.

A lock mechanism 363 shown in FIG. 50 is provided opposite to the end of this arm portion 362.

Figure 51B:
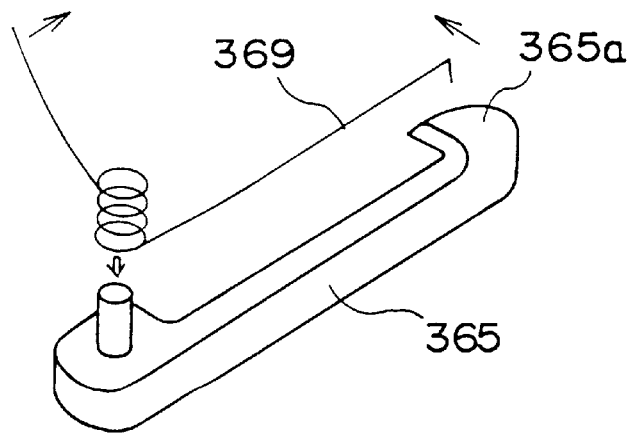

The lock mechanism 363 comprises a look arm 365, a magnetic body piece 366 at the end of this arm, a coil 367 opposite to this magnetic body piece 366, a yoke 368, and a return spring 369 shown in FIG. 51(B).

When the coil 356 conducts temporarily, the permanent magnet 358 is attracted by the lower yoke 357b, so that the arm 359 rotates, against the force exerted by the spring 361, in an $A_2$ direction shown by the arrow, and the holder 350 is lowered.

The arm 359 is locked at the position indicated by the alternate long and two short dashe line in FIG. 49 in a manner such that the end of the arm portion 362 is engaged with a lock claw 365a at the end of the lock arm 365. When the coil 367 conducts temporarily, the look arm 365 temporarily rotates, against the force exerted by the spring 369, in a $B_1$ direction shown by an arrow. This releases the above-mentioned lock, causes the arm 359 to rotate, due to the spring 361, in the $A_1$ direction shown by the arrow, and raises the holder 50.

A description will be given next of a cartridge opening/closing mechanism 370 with reference to FIGS. 52(A) and 52(B).

Figure 52A:
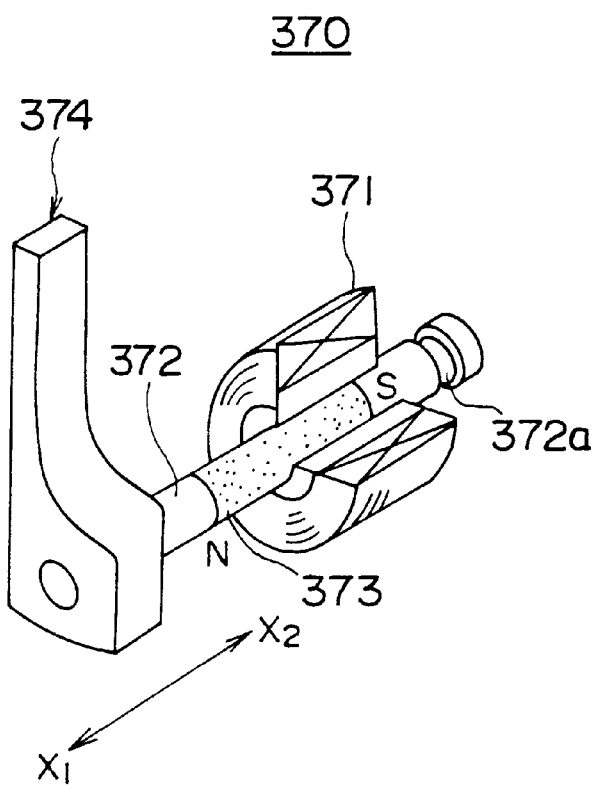
FIGS. 52(A) and 52(B) illustrate the cartridge opening/closing mechanism.

As shown in FIG. 52(A), 371 indicates a coil.

372 indicates a rod, in the middle of which is provided a permanent magnet 373, and a portion of the permanent magnet 373 pierces the coil 371.

A cartridge opening/closing claw 374 is provided on one end of the rod 372. This claw 374 fits within the notch 350a of the holder 350 shown in FIG. 47, and is engaged with the notch 344a in FIG. 46.

When the coil 371 conducts and the rod 371 moves in an $X_2$ direction, the cartridge is open; when the rod 371 moves in an $X_1$ direction, the cartridge is closed.

Figure 52B:
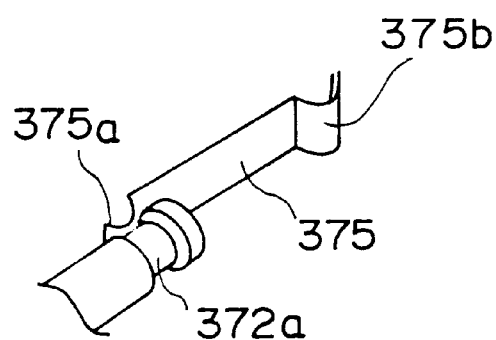

As shown in FIG. 52(B), the rod 372 is temporarily held at a position to which the rod slide in such manner that a groove 372a is engaged with lock portions 375a and 375b of a blade spring 375.

Figure 53A:
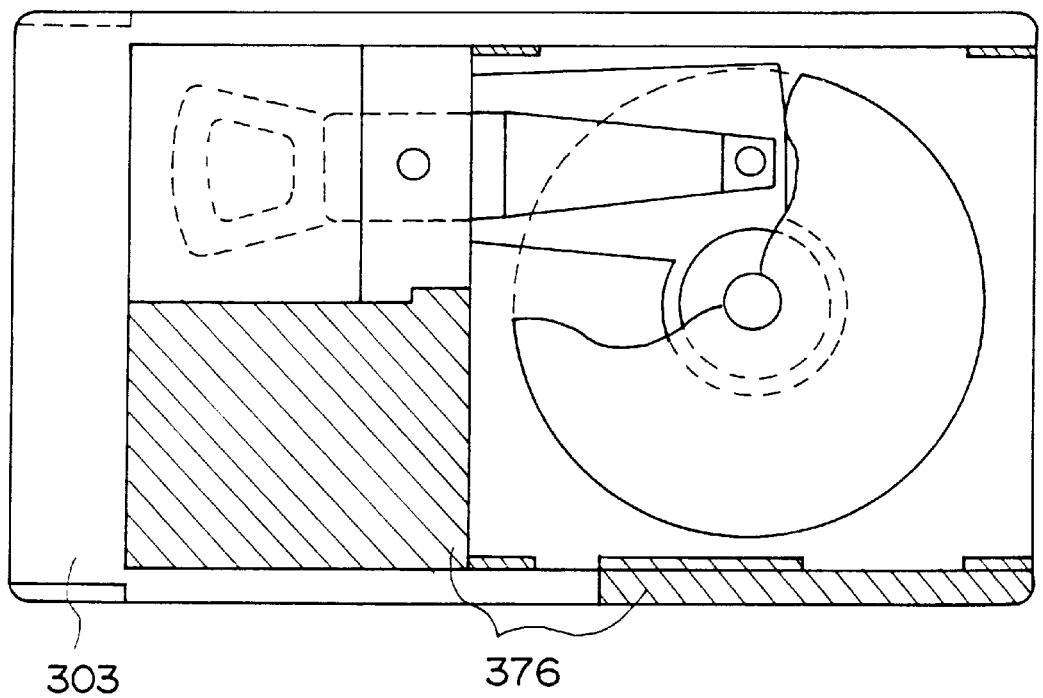
FIGS. 53(A) and 53(B) illustrate the portion occupied by the vertical motion mechanism and the cartridge opening/closing mechanism.
Figure 53B:
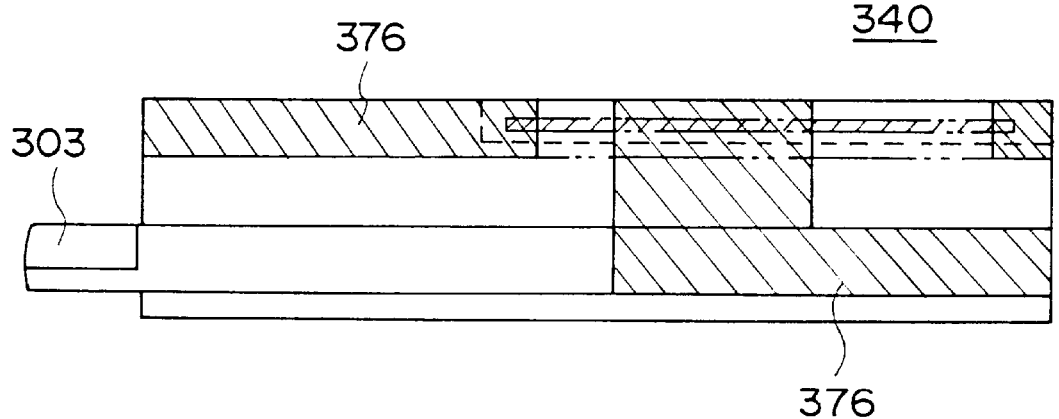

The above-described vertical motion mechanism 355, the lock mechanism 363, and the cartridge opening/closing mechanism 370 are assembled in an area 376 indicated by a cross hatching in FIGS. 53(A) and 53(B).

A description will be given next of a mounting/detaching operation of the optical disk cartridge 341 with reference to FIGS. 54(A) through 54(F).

Figure 54B:
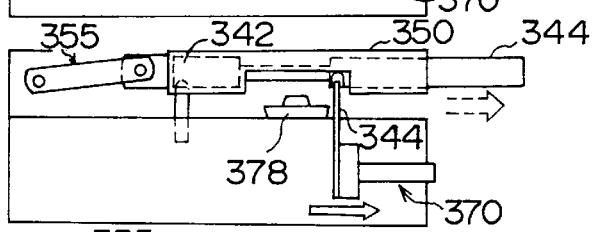
Figure 54C:
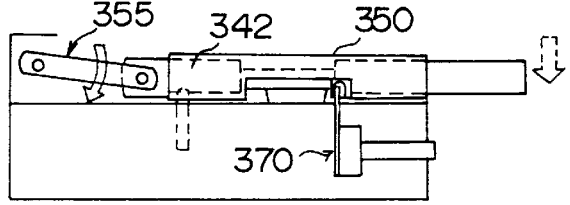
Figure 54D:
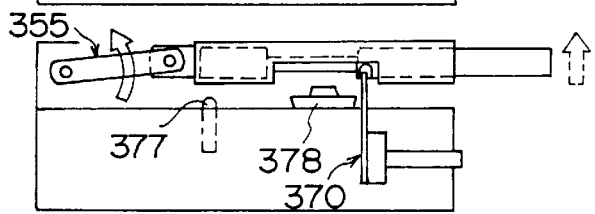
Figure 54E:
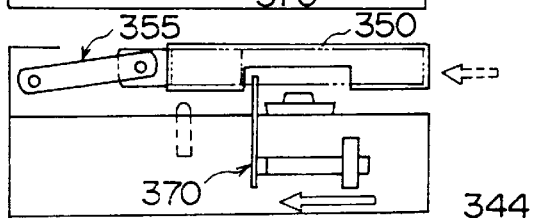
Figure 54F:
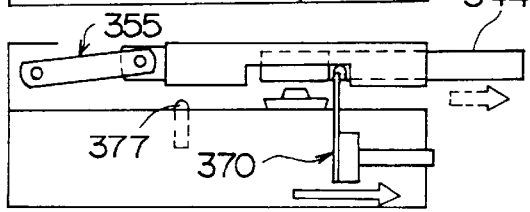

FIGS. 54(A) through 54(C) illustrate a mounting operation, and FIGS. 54(D) through 54(F) illustrate a detaching operation.

The optical disk cartridge 341 is manually inserted into the holder 350 (FIG. 54(A)).

When the cartridge 341 is inserted into the holder 350, a cartridge fixing pin 377 is engaged With a hole (not shown in the figure) of the first half 342, so that the first half 342 is fixed. Then the cartridge opening/closing mechanism 370 begins to operate so that the rod 372 moves in the $X_2$ direction; the second half 345 moves in the same direction due to the claw 374. The cartridge 341 is then closed and the center of the optical disk is exposed. (FIG. 54(B))

Subsequently, the vertical motion mechanism 355 begins to operate; the holder 350 is lowered about 0.3–0.5 mm; and the optical disk 17 is mounted on a turntable 378. (FIG. 54(C))

A detaching of the cartridge is carried out in a manner that is reversed, in sequence, to the above procedure.

That is, the holder 350 is raised as shown in FIG. 54(D), and the cartridge is closed as shown in FIG. 54(E). Finally, the mechanism 370 begins to operate in the same manner as shown in FIG. 54(B). Since the first half 342 is removed from the pin 377, the above-mentioned mechanism 370 causes a part of the cartridge 341 to be ejected. (FIG. 54(F)

When the cartridge 341 is manually removed, the pin 377 is raised so as to be set in a position as shown in FIG. 54(A).

[Sixth embodiment]

Figure 55:
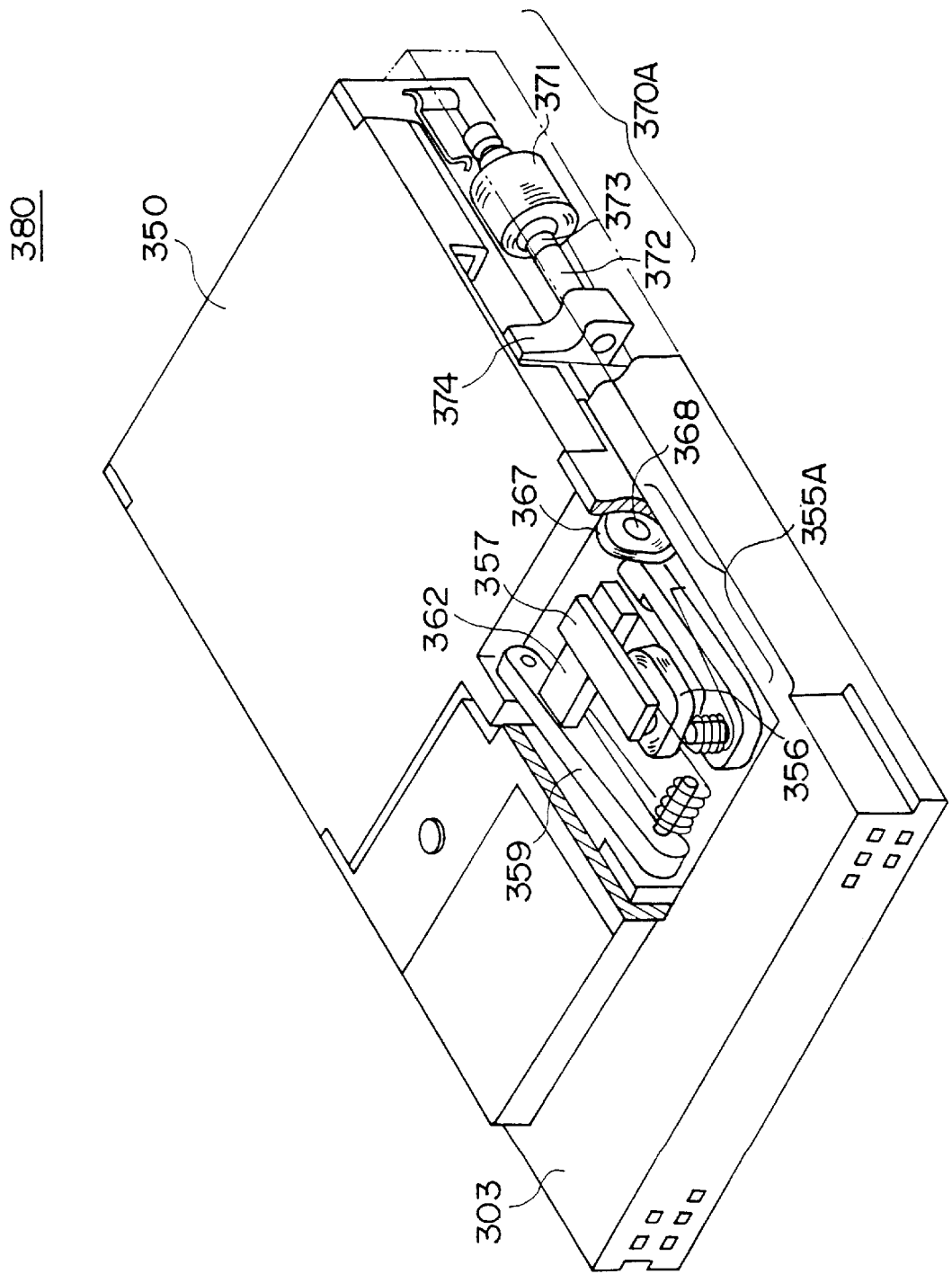
FIG. 55 is a partially removed perspective view of a sixth embodiment of the optical disk apparatus of the present invention.

An optical disk apparatus 380 in FIG. 55 is of a configuration in which a cartridge loading mechanism is added to the optical disk apparatus 330 in FIG. 40.

The vertical motion mechanism 355A and the cartridge opening/closing mechanism 370A are of the same configuration as in the previous embodiments, and the descriptions thereof are omitted.

Figure 56A:
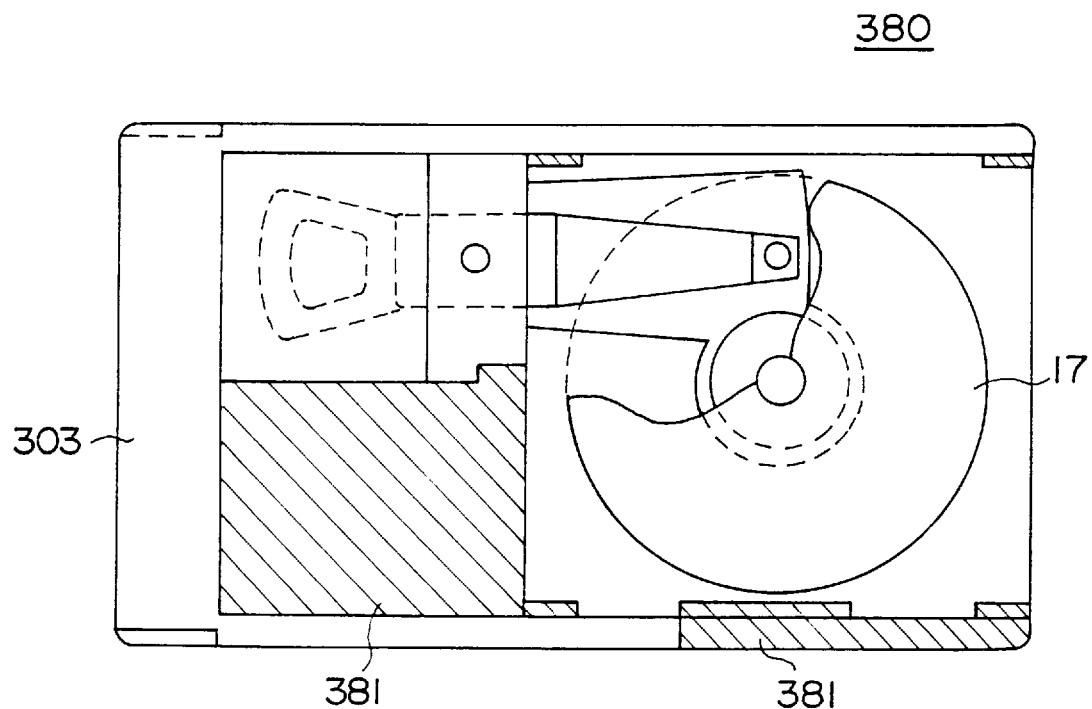
FIGS. 56(A) and 56(B) illustrate the portion occupied by the vertical notion mechanism and the cartridge opening/closing mechanism.
Figure 56B:
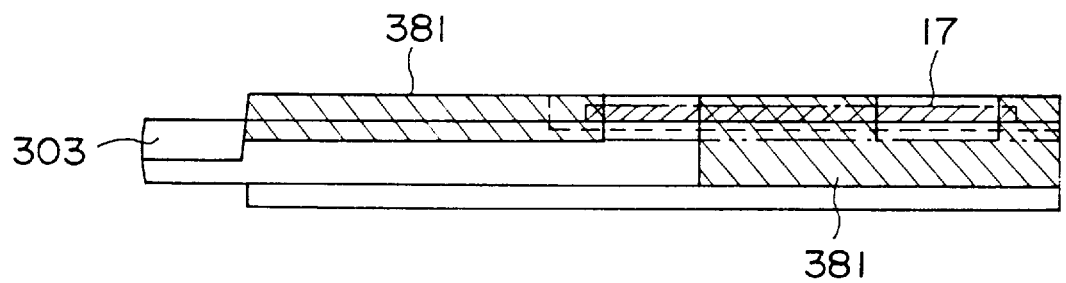

The above-mentioned mechanisms 355A and 370A are assembled in an area 381 in FIGS. 56(A) and 56(B) indicated by a cross hatching.

The optical disk cartridge 341 in FIG. 46 is used and fitted as shown in FIGS. 54(A) through 54(F).

A description of variations of the embodiments will be given below.

The optical disk 17 need not be of a phase-transition type, but can instead be of an optomagnetic type. Only a minor change in the optical part configuration is required to make the apparatus compatible with optical disks of an optomagnetic type. There is no need to change the configuration if optical disks of a read only type or an addition type is employed.

The optical disk 17 need not be of a 1.8 inch type but can instead be of a 1.3 inch type.

The thickness of the optical disk 17 need not be 0.3 mm, but can instead be anywhere between 0.2 and 0.5 mm.

The optical disk 17 need not be of a single plate type but can instead be of a configuration in which two plates are adhesively attached to each other.

The thickness of the cartridge apparatus 341 need not be 1.6 mm, but can instead be anywhere between 1.3 and 1.9 mm.

The block 161 in FIG. 21 can be of a configuration in which a portion for fitting the photodetectors 207 and 208 is added.

[Seventh embodiment]

Figure 58:
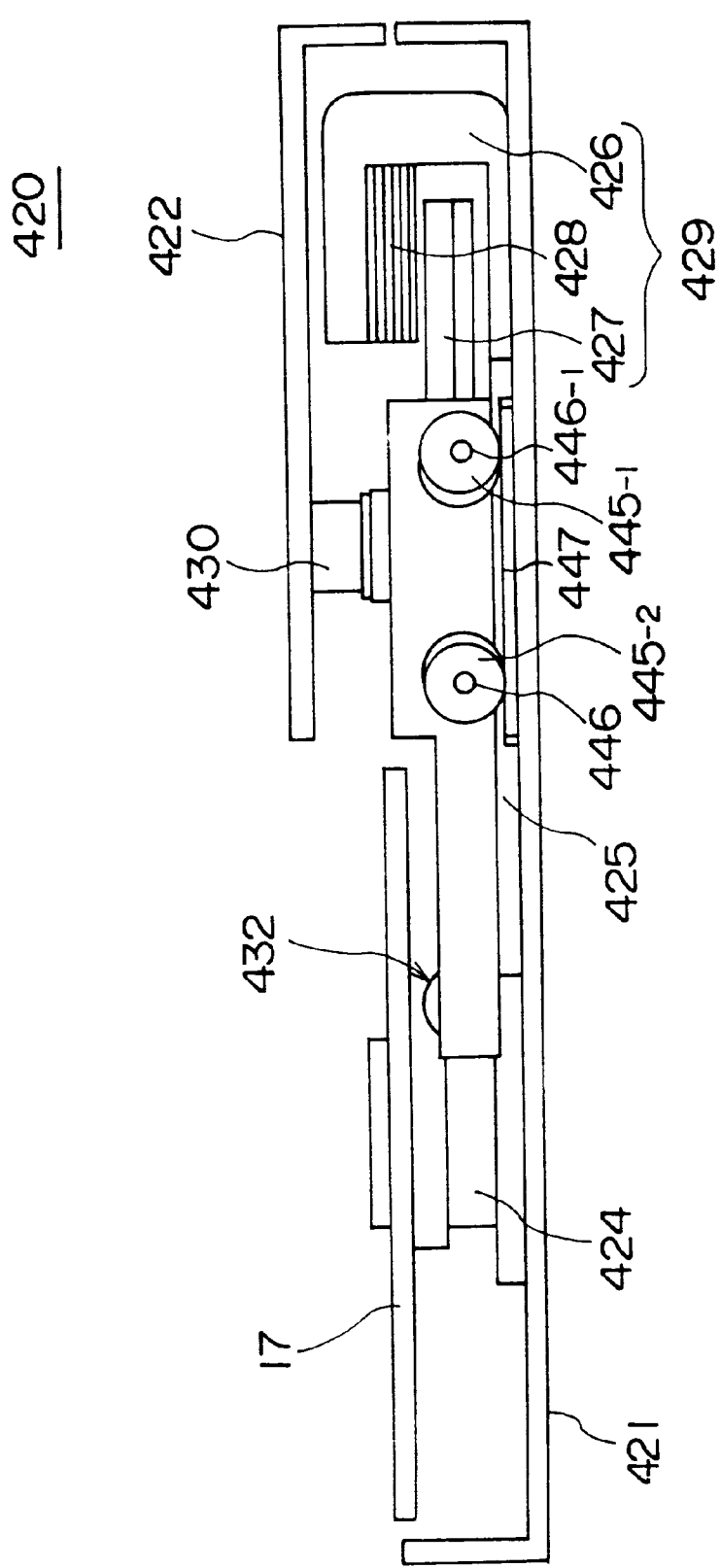
FIG. 58 is a side view of the optical disk apparatus of FIG. 57.

An optical disk apparatus 420 shown in FIGS. 57 and 58 is of the same size as a so-called IC card, and has a height (thickness) of about 5 mm.

421 indicates a bottom cover and 422 indicates a top cover.

The optical disk 17 is caused to rotate at a substantially great speed by means of a spindle motor 424 provided on the bottom cover 421.

A swing-motion type head apparatus 425 is supported as described below, and, by being driven by a motor 429 consisting of a yoke 426, a permanent magnet 427, and a coil 428, is made to swing around a swing motion center stationary axle 430 in a direction shown by an arrow 431.

When the swing-motion type head apparatus 425 is made to swing in the direction shown by the arrow 431, an optical head 432 is made to move underneath the optical disk 17 in a radial direction thereof.

Figure 59:
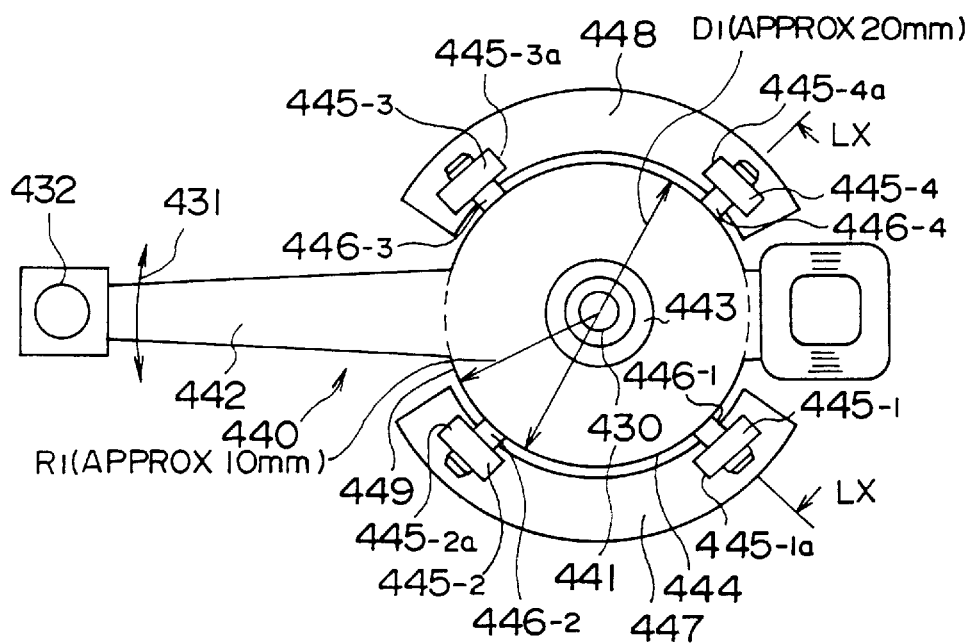
FIG. 59 is a top view of the swing-motion type head apparatus of FIG. 57.
Figure 60:
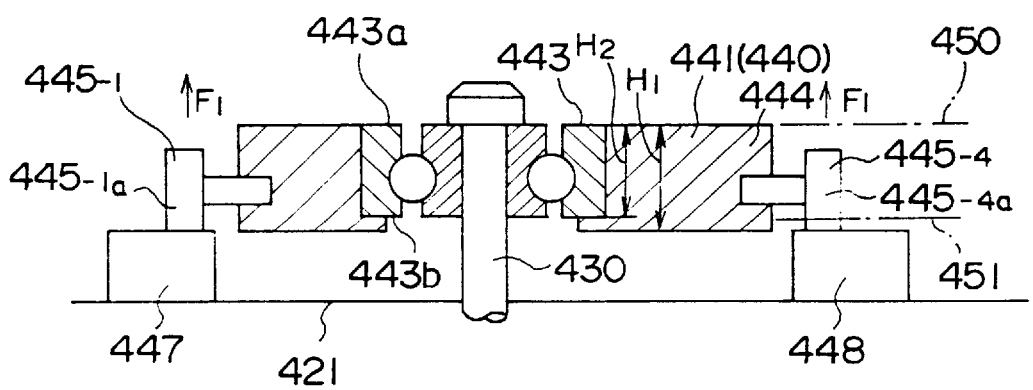
FIG. 60 is a cross-sectional view taken along the line LX—LX of FIG. 59.

A description of the swing-motion type head apparatus 425 will be given with reference to FIGS. 59 and 60.

440 indicates a head main body consisting of a disk portion 441 having a diameter $D_1$ of approximately 20 mm, and an arm portion 442 extending from the disk portion. The optical head 432 is provided at the end of the arm portion 442.

443 indicates a single ball bearing fixed to the above-mentioned axle 430, and secured at the center of the disk portion 441 by being embedded therein.

A peripheral side 444 of the disk portion 441 stands on a circle 449 having a diameter $R_1$ of 10 mm, the center of the circle being the axle 430.

445-1 and 445-4 indicate rolling bearings such as a ball bearing or a roller bearing. The bearings are assembled with axles 446-1 through 446-4 provided on the peripheral side 444 at equal intervals, and are separated from each other by 90° along a circumference of the disk portion 441.

447 and 448 are arc-shaped rails fixed to the bottom cover 421 so as to support outer rings 445-1a–445-4a of the rolling bearings 445-1–445-4.

The height $H_1$ of the disk portion 441 is configured to be slightly greater than the height $H_2$ of the ball bearing 443.

The rolling bearings 445-1–445-4 roughly fit within the vertical range limited by a horizontal plane 450 extended from a topside 443a of the ball bearing 443 and a horizontal plane extended from an underside 443b thereof.

The above ensures that the height of the head main body 440 including the rolling bearings 445-1–445-4 is less than half that of the conventional technology.

A description will be given next of angular rigidity of the above-mentioned swing-motion type head apparatus 420.

The swing-motion type head apparatus 420 is made to swing around the axle 430 as the outer rings 445-1a–445-4a roll on the rails 447 and 448.

The rails 447 and 448 are configured to have dimensions such that the rails give the rolling bearings 445-1–445-4 an upward thrust. That is, the rails are made to be several μm higher than the height at which preload begins to exert itself on the ball bearing 443.

This mechanism ensures that the rails 447 and 448 presses the rolling bearings 445-1–445-4 with a force $F_1$, and, as a result, the ball bearing 443 receives a preload of the force $F_1$.

Figure 61:
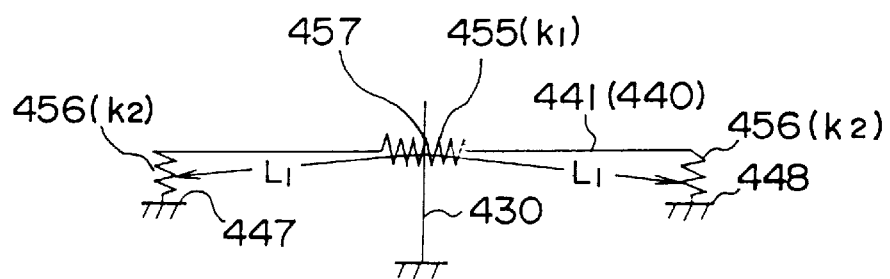
FIG. 61 schematically illustrates how the swing-motion type head apparatus of FIG. 57 is supported.

FIG. 61, which schematically illustrates how the swing-motion type head apparatus 420 is supported while being made to swing at a substantially great speed, shows that the apparatus is supported by the axle 430 via a spring 455 having a spring constant $k_1$, and is also supported by the rails 447 and 448 via a spring 456 having a spring constant $k_2$.

The head main body 440 has a satisfactorily great angular rigidity because a dimension $L_1$, measured from a center 457 of angular displacement of the head main body 440 to the above-mentioned spring 456, is substantially great, and because the spring constant $k_2$ of the spring 456 is made to be substantially large due to the above-mentioned force $F_1$.

A preload supplied to the ball bearing 443 causes the spring constant $k_1$ of the spring 455 to be large. This has an effect of increasing radial rigidity of the head main body 440.

Accordingly, the head main body 440 can be made to swing in a stable manner, and the optical head 432 can be positioned with precision.

Figure 62:
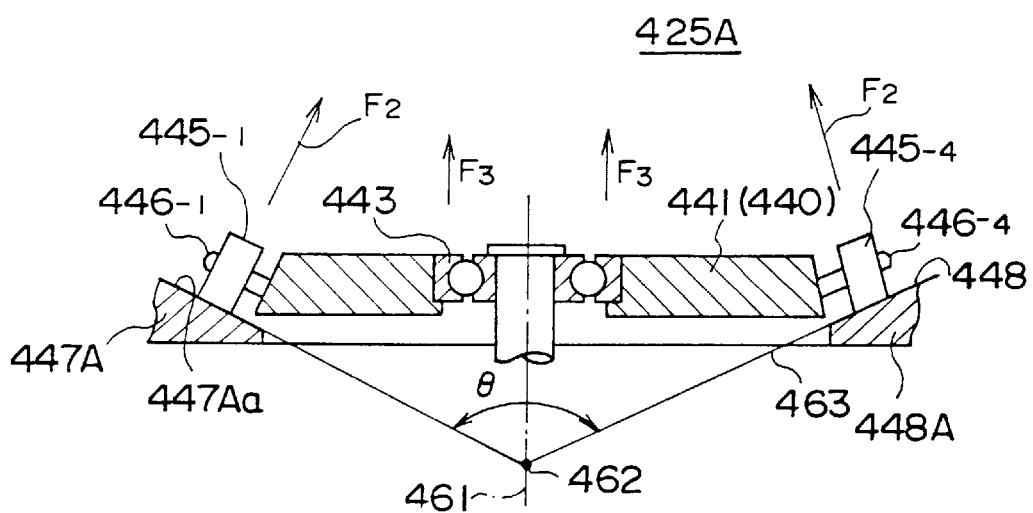
FIG. 62 illustrates a first variation of the swing-motion type head apparatus of FIG. 57.

A description will be given next of a first variation of the above-mentioned swing-motion type head apparatus, with reference to FIG. 62.

Rails 447A and 448A are configured such that surfaces 447Aa and 44BAa thereof are an equivalent of a slope 463 of an inverse cone having an apex at a point 462 on a center line 461 of the axle 430, and an apex angle or θ.

The rolling bearings 445-1–445-4 are fitted diagonally so as to roll on the above-mentioned surfaces 447Aa and 448Aa.

The rails 447A and 448A are configured to have dimensions such that the rails give the rolling bearings 445-1–445-4 an upward thrust.

Figure 63:
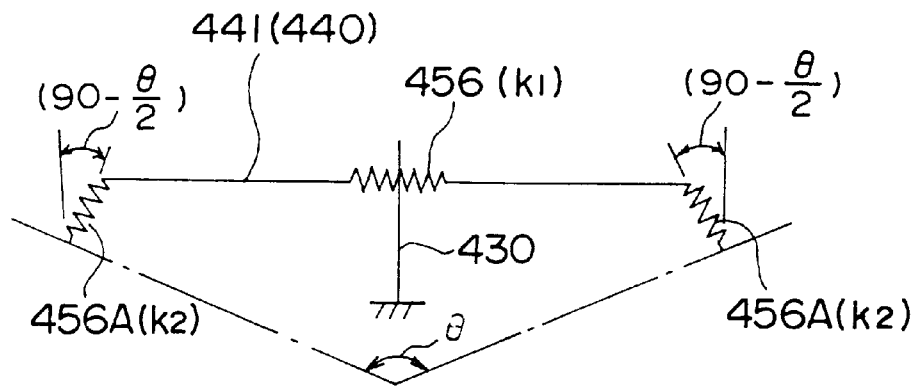
FIG. 63 schematically illustrates how the swing-motion type head apparatus of FIG. 62 is supported.

The above mechanism ensures that the rails 447A and 448A press the rolling bearings 445-1–445-4 with a force $F_2$, and, as a result, the ball bearing 443 receives a preload of a force $F_3$ operating in a thrust direction of the bearing. FIG. 63 schematically illustrates how a swing-motion type head apparatus 425A of the above configuration is supported during operation.

The head main body 440 is supported by the axle 430 via the spring 455 having the spring constant $k_1$, and is also supported by the rails 447A and 448A via a spring 456A having the spring constant $k_2$.

The spring 456A is inclined with respect to a vertical line, at an angle given by the formula below.

$$\left[90° - \frac{\theta}{2}\right]$$

The spring 456A suppresses angular displacement of the head main body 440 as well as suppressing radial displacement of the head main body.

Accordingly, the head main body 440 is supported with a satisfactorily great angular rigidity and a radial rigidity.

Figure 64:
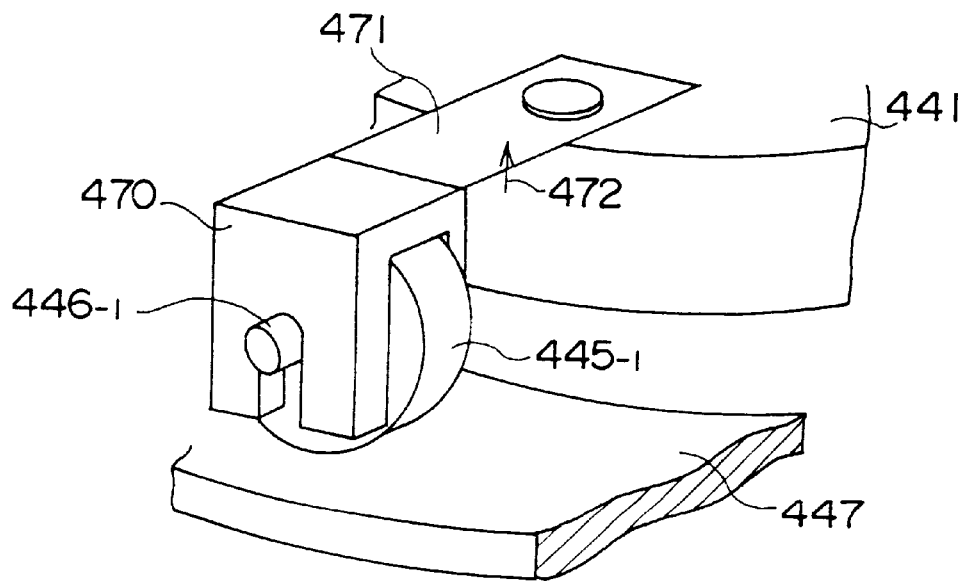
FIG. 64 illustrates a variation of a preload mechanism.

FIG. 64 illustrates a variation of a preload mechanism.

This variation is configured such that a holder 470 for holding an axle 446-1 is assembled with the head main body 440 via a blade spring 471 having an appropriate spring constant.

The blade spring 471 is caused to bend slightly in a direction shown by an arrow 472 so that a preload is supplied to the bearing due to a spring force of the blade spring 471.

This configuration does not require a high precision in the dimensions of the rails 447 and 448.

A description will be given of a swing-motion type head apparatus 480 of the second variation with reference to FIGS. 65 and 66.

First V-shaped grooves 481 and 482 are formed along a circumference of the peripheral side 444 of a disk portion 441A of a head main body 440A.

483 and 484 indicate arc-shaped fixed rails fixed on the bottom cover to be opposite to the above-mentioned peripheral side 444.

Second V-shaped grooves 485 and 486 are formed on the rails 483 and 484.

The grooves 481 and 485 are opposite to each other, and the grooves 482 and 486 are opposite to each other, so that they form a rhombus.

Steel balls 487 and 488, separated from each other by a retainer 489, are engaged between the groove 481 and the groove 485.

Likewise, steel balls 490 and 491, separated from each other by a retainer 492, are engaged between the groove 482 and the groove 486.

The positions of the rails 483 and 484 are controlled so as to supply preload to the steel balls 487, 488, 490, and 491.

The head main body 440A is caused to swing at a substantially great speed on a center 493 of the disk portion 441 in the direction shown by the arrow 431, as the steel balls 487, 488, 490, and 491 roll.

Figure 67:
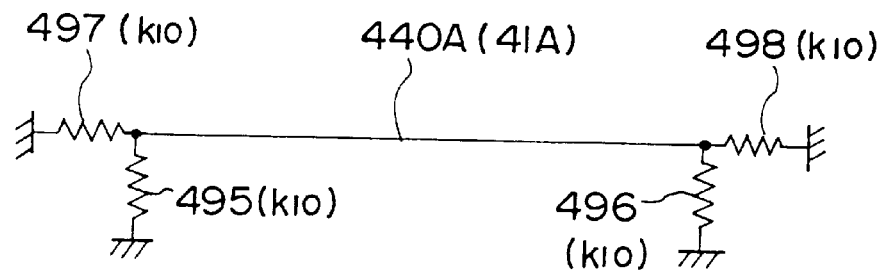
FIG. 67 schematically illustrates how the swing-motion type head apparatus of FIG. 65 is supported.

As is schematically shown in FIG. 67, the head main body 440A (the disk portion 441A) is supported by springs 495, 496, 497, and 498 having a spring constant $k_{10}$.

The springs 495 and 496 serve to improve angular rigidity of the head main body 440A.

This embodiment enables flexible arrangement of optical parts since it does not have the swing motion center stationary axle, and is thus less restrictive in the arrangement of optical parts in the head main body than the embodiments shown in FIGS. 57 through 62.

Figure 68:
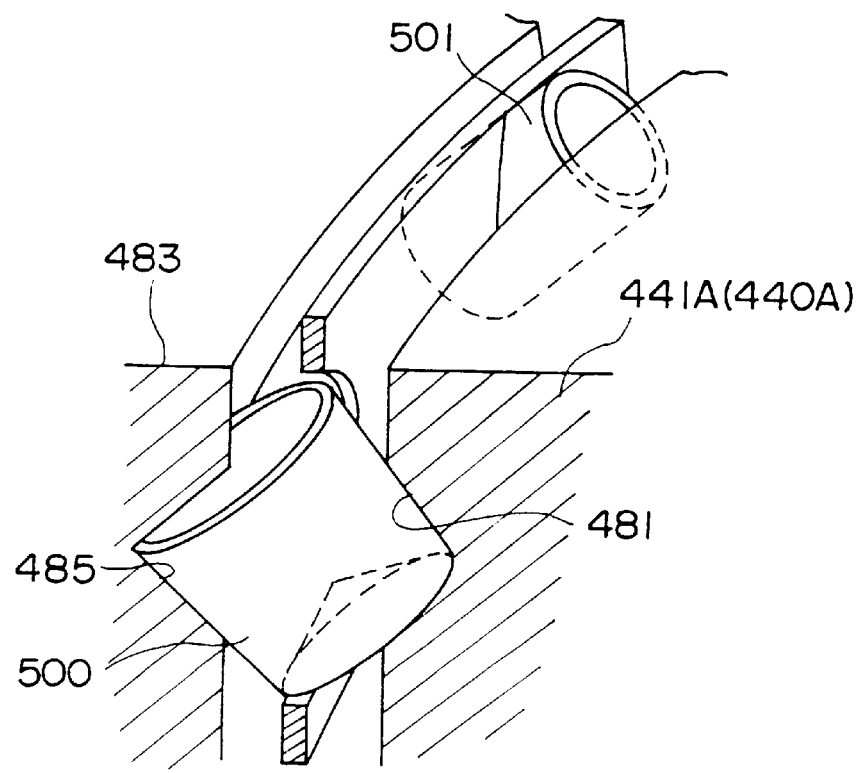
FIG. 68 illustrates a variation of rolling bearings of the swing-motion type head apparatus of FIG. 65.

As shown in FIG. 68, cylindrical rollers 500 and 501 can be used in place of the above-mentioned steel balls 487, for example.

The cylindrical rollers 500 and 501 are disposed such that they are alternately inclined at one of the two angles.

The end face of the cylindrical rollers 500 and 501 are provided with a cone-shaped depression so that a contact area between the end face and the V-shaped groove is small.

The contact between the cylindrical rollers 500 and 501 and the V-shaped grooves 481 and 485 is not a point contact but a line contact, thereby increasing a spring constant of each of the springs 495–498 in FIG. 67.

Figure 65:
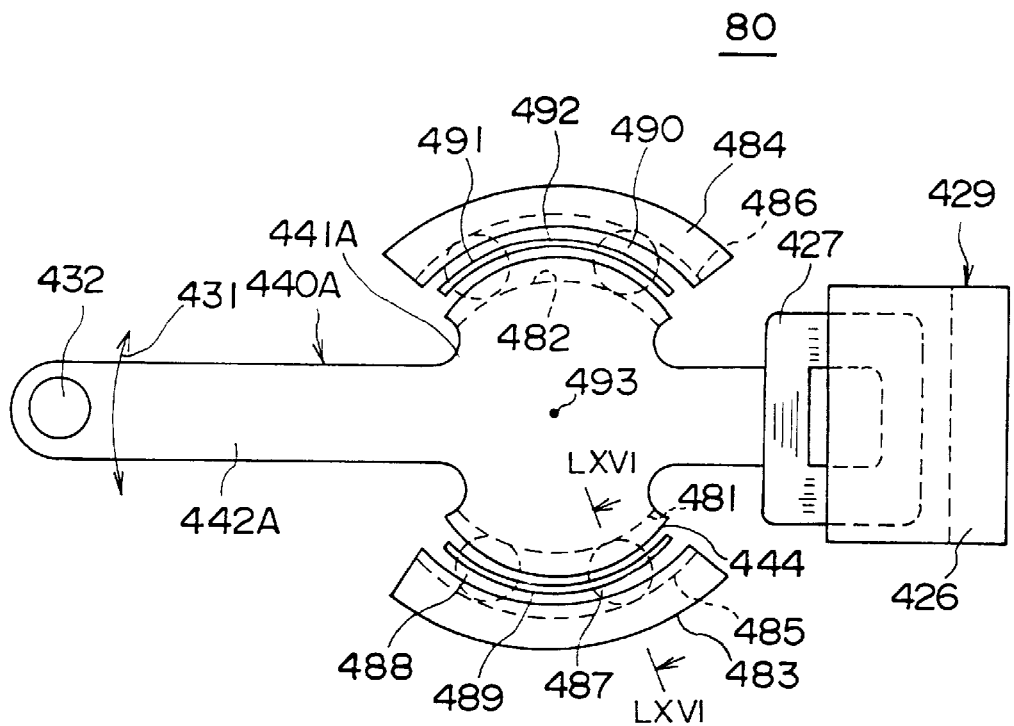
FIG. 65 illustrates a second variation of the swing-motion type head apparatus of FIG. 59.
Figure 66:
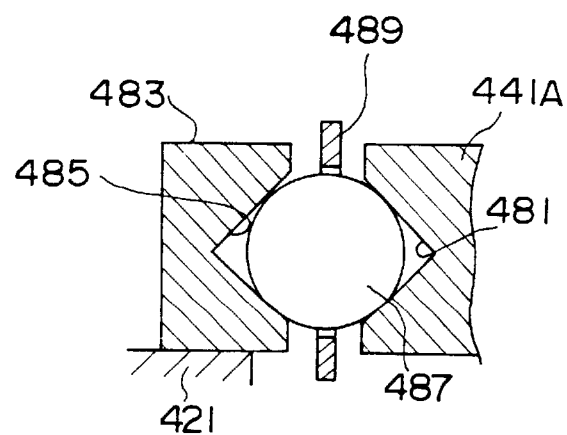
FIG. 66 is a cross sectional view taken along the line LXVI—LXVI of FIG. 65.

Therefore, angular rigidity and radial rigidity of the head main body 440A is greater than that of the head main body shown in FIG. 65.

What is claimed is:

1. An optical disk apparatus for recording and/or reproducing information on and from a recording surface of an optical disk, comprising:

a spindle motor for rotating a mounted optical disk; and an optical head assembly for scanning a recording surface of said mounted optical disk, said optical head assembly including:

an objective lens for focusing an optical beam on said recording surface of said mounted optical disk;

a head main body carrying said objective lens, said head main body being rotatable about a swing axis and swinging in a plane generally parallel to said recording surface of said mounted optical disk, said head main body thereby causing said objective lens to scan over said recording surface of said mounted optical disk;

an axle for supporting said head main body such that said head main body is rotatable about said swing axis; and driving means for causing said head main body to swing about said swing axis;

said head main body further including a semiconductor laser chip emitting the optical beam;

a photodetector detecting the optical beam incident thereto;

said optical beam being emitted by said semiconductor laser chip to said objective lens, said optical beam reflected from said recording surface of said mounted optical disk and incident to said objective lens, and said optical beam travelling from said objective lens to said photodetector along multiple linear optical paths within the head main body; and a finite region being completely defined by segments selected from the group consisting of:

said linear optical paths within the head main body, and virtual lines extending from and along said linear optical paths within said head main body;

said axle is disposed within said finite region, thereby optimizing a balance of moments around the axle resulting from optical elements disposed adjacent to the axle within the head main body.

2. The optical disk apparatus as claimed in claim 1, characterized in that said optical disk is configured such that the outer diameter thereof is about 1.8 inches.

3. The optical disk apparatus as claimed in claim 2, wherein said head main body includes a block portion having a hole through the center thereof, wherein a stationary axle pierces and said bearings engage said hole, and, at the periphery of the block portion, optical part mounting portions for mounting said semiconductor laser chip, first optical parts, and second optical parts, wherein said block portion is supported to embrace said stationary axle in such a manner that the portion is enabled to swing, and in that the optical part mounting portions of the block portion are fitted with said semiconductor laser chip, first optical parts, and second optical parts.

4. The optical disk apparatus as claimed in claim 1, characterized in that said optical disk is configured such that the thickness of a disk base is between 0.2 to 0.5 mm.

5. The optical disk apparatus as claimed in claim 1, characterized in that said optical head assembly is configured such that it is provided with a frame having a shape of an inverse letter U, and a seat for covering the underside of the frame.

6. The optical disk apparatus as claimed in claim 1, wherein said head main body includes a main body portion and an arm portion extending from said main body portion, said head main body is further provided with a parallel blade spring mechanism comprising a pair of blade springs disposed on the topside and the underside of said arm portion in such a manner that the springs are approximately parallel to said arm portion, said springs being secured, at the base thereof, to said main body portion, and being fitted, at an end thereof, with said objective lens.

7. The optical disk apparatus as claimed in claim 1, characterized in that said head main body includes a main body portion and an arm portion extending from said main body portion, said arm portion is configured such that it is provided with, at the end of the arm portion, a perpendicularly reflecting mirror for perpendicularly reflecting a laser light emitted from said main body portion and causing the light to travel toward said objective lens, said perpendicular reflecting mirror being fixed after being subjected to an angle control by which an objective lens incidence angle error is controlled to be within a permissible range.

8. An optical disk apparatus as recited in claim 1, wherein one of said multiple linear paths extends about said swing axis over an angle which is larger than 180°.

9. The optical disk apparatus claimed in claim 1, wherein said extension of said first optical path is from a portion of the first optical path at said semiconductor laser chip, and said extension of said second optical path is from a portion of the second optical path at said photodetector.

* * * * *